United States Patent
Fujimura et al.

(10) Patent No.: US 10,983,743 B2
(45) Date of Patent: Apr. 20, 2021

(54) PROGRAMMABLE DISPLAY AND PROGRAMMABLE LOGIC CONTROLLER SYSTEM INCLUDING THE SAME

(71) Applicant: Keyence Corporation, Osaka (JP)

(72) Inventors: Masato Fujimura, Osaka (JP); Daisuke Maruyama, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/795,614

(22) Filed: Feb. 20, 2020

(65) Prior Publication Data
US 2020/0310733 A1    Oct. 1, 2020

(30) Foreign Application Priority Data

Mar. 29, 2019   (JP) .................................. 2019-068740
Jan. 29, 2020   (JP) ............................. JP2020-012854

(51) Int. Cl.
*G06F 3/14*       (2006.01)
*G06F 3/0488*  (2013.01)
(Continued)

(52) U.S. Cl.
CPC ......... *G06F 3/1407* (2013.01); *G05B 19/054* (2013.01); *G06F 3/0482* (2013.01);
(Continued)

(58) Field of Classification Search
None
See application file for complete search history.

(56) References Cited

U.S. PATENT DOCUMENTS 6,229,536 B1 *   5/2001   Alexander ............ G06T 11/206
                                                                    345/440.1
10,423,669 B2 *   9/2019   Seo ....................... G06T 11/206
(Continued)

FOREIGN PATENT DOCUMENTS

JP       2003029829 A    1/2003
JP          6636355 B2    1/2020

OTHER PUBLICATIONS

P. Xu, H. Mei, L. Ren and W. Chen, "ViDX: Visual Diagnostics of Assembly Line Performance in Smart Factories," in IEEE Transactions on Visualization and Computer Graphics, vol. 23, No. 1, pp. 291-300, Jan. 2017, doi: 10.1109/TVCG.2016.2598664. (Year: 2017).*

(Continued)

*Primary Examiner* — Nurun N Flora
(74) *Attorney, Agent, or Firm* — Kilyk & Bowersox, P.L.L.C.

(57) ABSTRACT

A programmable display includes a display data generator that generates display data for pages corresponding to their page identifier, a display portion that displays a page corresponding to the page identifier on its display screen based on the display data that is generated by the display data generator, and a touch detector that detects touch operations on the display screen of the display portion. The display portion generates display data for displaying the device wave of the device that is specified by the subject device settings based on the chronological data, which is stored in the PLC, when the touch detector detects a predetermined second touch operation on the display screen. The display portion displays a second page or a device wave on the display screen based on the display data that is generated by the display data generator.

17 Claims, 47 Drawing Sheets

(51) Int. Cl.
*G06F 3/0482* (2013.01)
*G05B 19/05* (2006.01)
*G06F 3/0483* (2013.01)

(52) U.S. Cl.
CPC ........ *G06F 3/0483* (2013.01); *G06F 3/04883* (2013.01); *G06F 2203/04808* (2013.01)

(56) References Cited

U.S. PATENT DOCUMENTS

| | | | | |
|---|---|---|---|---|
| 2002/0059040 | A1* | 5/2002 | Jones | G01R 31/31914 |
| | | | | 702/120 |
| 2003/0115510 | A1* | 6/2003 | Takayama | G05B 23/0283 |
| | | | | 714/47.1 |
| 2010/0026713 | A1* | 2/2010 | Goto | G01R 13/029 |
| | | | | 345/629 |
| 2018/0259947 | A1* | 9/2018 | Mioki | G05B 19/418 |
| 2020/0209838 | A1* | 7/2020 | Kawakami | G05B 19/418 |

OTHER PUBLICATIONS

Mustafha, Muhamad Danial Amzar, et al. "An IoT-based production monitoring system for assembly line in manufacture." International Journal of Integrated Engineering 12.2 (2020): 38-45. (Year: 2020).*

* cited by examiner

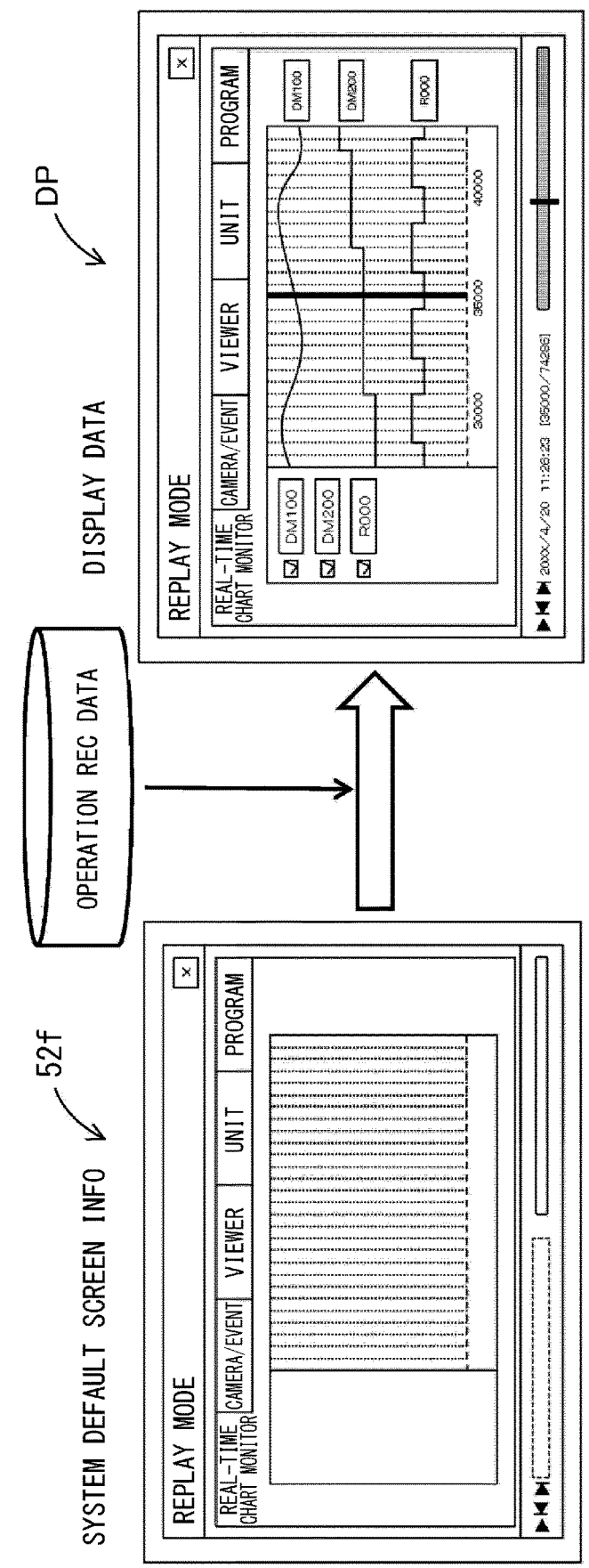

PROGRAMMABLE DISPLAY AND PROGRAMMABLE LOGIC CONTROLLER SYSTEM INCLUDING THE SAME

CROSS-REFERENCE TO RELATED APPLICATIONS

The present application claims priority under 35 U. S. C. § 119 to Japanese Patent Application No. 2019-068,740, filed on Mar. 29, 2019, and No. 2020-012,854, filed on Jan. 29, 2020, the content of which is incorporated herein by references in their entirety.

BACKGROUND OF THE INVENTION

1. Field of the Invention

This disclosure relates to a programmable display and a programmable logic controller system including the programmable display.

2. Description of the Related Art

In factory automation (FA), programmable logic controllers (hereinafter also referred to as "PLCs" are used as a controller which controls input/output devices such as sensor, electric motor, and actuator. When building up a FA system, system designers consider which sequence can be used to properly operate input/output devices, and create a ladder program which can realize the sequence. Such a ladder program is designed using a general-purpose personal computer which is installed with a programing application program for ladder program. System designers create their ladder program after designing and debugging, and then transmit the created ladder program to a PLC. The PLC executes the program.

The statuses of the input/output devices under operation of the PLC can be monitored on site by using a programmable display which is connected to the PLC. Various functional components such as lamps and switches are arranged in a display screen of the programmable display. Various functions are assigned to the functional components. Data to be displayed in the display screen is designed by using a general-purpose personal computer which is installed with a programing application program for display data. Generally, on-site engineers who maintain the FA system on side know the sequence used to properly operate input/output devices similarly to the aforementioned system designers. However, various types of description methods of the ladder program which efficiently realizes the sequence exist. For this reason, average on-site engineers will expend time to understand the description of the ladder program.

If a trouble occurs during operation of a production line in which the FA system is built up, and the production line may be brought down. If such a trouble occurs, typical programmable displays turn on or blink an alarm lamp (component icon) which is arranged in the display screen to inform such an on-site engineer of the trouble occurrence.

However, the on-site engineer often cannot diagnose the cause of the trouble when checking only the alarm lamp. Even in this case, the trouble can be sometimes easily eliminated on site. It is important for on-site engineers to immediately eliminate such an easy trouble and to quickly recover the system.

It is one object to provide a programmable display that allows engineers to easily eliminate troubles which occur on FA sites and a programmable logic controller system including the programmable display.

SUMMARY OF THE INVENTION

A programmable display according to a first aspect of the present invention is connected to a programmable logic controller that saves chronological data relating to device values of a device as a storage area to be referred by a user program based on previously defined save conditions. The programmable display includes a setting storage, a display data generator, a display portion, and a touch detector. The setting storage stores component settings, page settings, and subject device settings. The component settings assign the devices to their corresponding one of a plurality of components which are arranged on one screen of image as page to monitor or change a status of the device of the programmable logic controller. The page settings manage the component settings page by page by using a page identifier which identifies a plurality of pages. The subject device settings specify a subject device that has a device value to be stored in the programmable logic controller as chronological data to be shown in a wave form as device wave. The display data generator generates display data for the pages corresponding to the page identifier page by page based on the component settings and the page settings which are stored in the setting storage. The display portion includes a display screen, and displays a page corresponding to the page identifier on the display screen based on the display data that is generated by the display data generator. The touch detector detects touch operations on the display screen of the display portion. The display data generator generates display data that changes image of the display screen from a current page to another page based on the page settings when the touch detection portion detects a predetermined first touch operation. Also, the display data generator generates display data for displaying the device wave of the device that is specified by the subject device settings based on the chronological data, which is stored in the programmable logic controller, when the touch detector detects a predetermined second touch operation on the display screen. The display portion displays the another page or the device wave on the display screen based on the display data that is generated by the display data generator. According to this programmable display, page-switching operation which switches the screen from one page to another page, and device-wave showing operation which shows the device waves of chronological data that is saved in the programmable logic controller can be selectively performed by such a touch operation on the programmable display. In this case, the device wave can be seen on the display screen of the programmable display, information useful to immediately eliminate troubles which occur on FA sites can be easily provided.

In a programmable display according to a second aspect of the present invention, in addition to of the aforementioned aspect, the setting storage stores default screen information representing a previously defined default screen that has a format to display the device wave. In addition, the display data generator superposes the chronological data on the default screen based on the default screen information and the chronological data to generate the display data for displaying the device wave of the device that is specified by the subject device settings when the touch detector detects the predetermined second touch operation on the display screen.

In a programmable display according to a third aspect of the present invention, in addition to any of the aforementioned aspects, when the display portion displays the device wave on the display screen and the touch detector detects a change operation (e.g., sliding operation of time designation cursor) for changing the display part of the device wave that has been displayed, the display data generator extracts a part of the chronological data that corresponds to a display part of the device wave that is requested by the change operation and generates new display data for displaying the requested display part of the device wave.

In a programmable display according to a fourth aspect of the present invention, in addition to any of the aforementioned aspects, the component settings, which are stored in the setting storage, further include setting of a wave display component for displaying the device wave. In addition, the second touch operation is a touch operation on the wave display component which is arranged on the first page displayed on the display screen.

In a programmable display according to a fifth aspect of the present invention, in addition to any of the aforementioned aspects, the second touch operation is a particular touch operation on a non-component-arrangement section in which no display component is arranged on the first page displayed on the display screen.

In a programmable display according to a sixth aspect of the present invention, in addition to any of the aforementioned aspects, the particular operation is any one of long press, flick, pinch-in, and pinch-out on the non-component-arrangement section.

In a programmable display according to a seventh aspect of the present invention, in addition to any of the aforementioned aspects, the component settings, which are stored in the setting storage, further include setting of an acquisition device that repeatedly acquires chronological data of the device values that are temporarily recorded in a temporary recording portion of the programmable logic controller, and setting of a real-time display component for successively displaying the chronological data of the acquisition device. In addition, when the touch operation on the real-time display component is detected, based on the chronological data of the device values of the acquisition device that are temporarily recorded in the temporary recording portion of the programmable logic controller, the display data generator generates display data for sequentially displaying the device values on the display screen.

In a programmable display according to an eighth aspect of the present invention, in addition to any of the aforementioned aspects, the programmable logic controller can associate image data that is provided from an external camera, which can be connected to the programmable logic controller, with information on acquisition time of capture of the image data, and temporarily store the image data which is associated with the information on acquisition time when previously defined save conditions are satisfied, and wherein the programmable display requests the programmable logic controller system to send the operation record data, and displays images corresponding to the image data included in the operation record data on the display portion based on the information on the acquisition time that is included in the operation record data.

In a programmable display according to a ninth aspect of the present invention, in addition to any of the aforementioned aspects, when the previously defined save conditions are satisfied, the programmable logic controller can associate the operation record data with the user program which is executed at the satisfaction of the previously defined save conditions, and saves the user program which is associated with the operation record data. In addition, the programmable display requests the programmable logic controller to send the saved operation record data, and, based on information on the acquisition time included in the operation record data, superposes the device values that are acquired at the acquisition time on the user program that is included the operation record data on the display portion.

In a programmable display according to a tenth aspect of the present invention, in addition to any of the aforementioned aspects, in the case the programmable logic controller collects event data corresponding to a plurality of events which occur in the programmable logic controller or controlled device to be controlled by the programmable logic controller, and associates the event data with occurrence time of the events and stores the event data which is associated with the occurrence time of the events in chronological order, when the previously defined save conditions are satisfied, the programmable logic controller saves the stored event data in the operation record data so that the stored event data can be associated with the operation record data. In addition, the programmable display requests the programmable logic controller to send the stored operation record data, and displays the events corresponding to the event data included in the operation record data on the display portion based on the occurrence time included in the operation record data.

In a programmable display according to an eleventh aspect of the present invention, in addition to any of the aforementioned aspects, the programmable display can display a selection screen which allows selection of the subject device as an initial display image when the device wave is displayed on the display screen.

In a programmable display according to a twelfth aspect of the present invention, in addition to any of the aforementioned aspects, when the device wave is displayed on the display screen, based on identification information for specifying one or more subject devices that have their device values to be shown as the device wave, the programmable display can display the one or more subject devices. According to this programmable display, if a trouble occurs in actual operation of an FA system, device waves of devices that are likely to relate to the cause of the trouble are selectively displayed. That is, the programmable display can show useful information to diagnose the cause of the trouble. As a result, the programmable display can be useful to quickly recover the system.

In a programmable display according to a thirteenth aspect of the present invention, in addition to any of the aforementioned aspects, the programmable display can display a setting screen which allows selection of one or more subject devices and representation styles of the one or more subject devices when their device waves are displayed on the display screen. According to this programmable display, if a trouble occurs in actual operation of an FA system, device waves of devices that are likely to relate to the cause of the trouble are selectively displayed. That is, the programmable display can show useful information to diagnose the cause of the trouble. As a result, the programmable display can be useful to quickly recover the system.

In a programmable display according to a fourteenth aspect of the present invention, in addition to any of the aforementioned aspects, a display-side communication portion that can communicate with the programmable logic controller is further included.

In a programmable display according to a fifteenth aspect of the present invention, in addition to any of the aforementioned aspects, a display-side device portion is further included. The display-side device portion communicates with the programmable logic controller through the display-side communication portion, and holds device values that are synchronized with the device values of the programmable logic controller.

In a programmable display according to a sixteenth aspect of the present invention, in addition to any of the aforementioned aspects, a guidance information storage is further provided. The guidance information storage stores guidance information which is associated with the device that is specified by the subject device settings and shows how to eliminate an error event which occurs when the save conditions are satisfied. The display data generator generates display data for displaying the guidance information which is stored in the guidance information storage and is associated with the device that is specified by the subject device settings when the touch detection portion detects the predetermined second touch operation on the display screen.

A programmable logic controller system according to a seventeenth aspect of the present invention includes a programmable logic controller that saves chronological data relating to device values of a device as a storage area to be referred by a user program based on previously defined save conditions, and a programmable display that is connected to the programmable logic controller. The programmable logic controller includes a program-execution portion, a device portion, a temporary recording portion, and a save memory. The program-execution portion repeatedly executes the user program. The device portion includes a device as a storage area to be referred by the program-execution portion. The temporary recording portion collects device values of the device that are stored in the device portion, and associates the device values with information on collection time of the device values and temporarily records the device values associated with the information on collection time in chronological order in the temporary recording portion. The save memory saves the chronological data relating to the device values that are temporarily recorded in the temporary recording portion as operation record data, when the previously defined save conditions are satisfied. The programmable display includes a setting storage, a display data generator, a display portion, and a touch detector. The setting storage stores component settings, page settings, and subject device settings. The component settings assign the devices to their corresponding one of a plurality of components which are arranged on one screen of image as page to monitor or change a status of the device of the programmable logic controller. The page settings manage the component settings page by page by using a page identifier which identifies a plurality of pages. The subject device settings specify a subject device that has a device value to be stored in the programmable logic controller as chronological data to be shown in a wave form as device wave. The display data generator generates display data for the pages corresponding to the page identifier page by page based on the component settings and the page settings which are stored in the setting storage. The display portion includes a display screen, and displays a page corresponding to the page identifier on the display screen based on the display data that is generated by the display data generator. The touch detector detects touch operations on the display screen of the display portion. The display data generator generates display data that changes image of the display screen from a current page to another page based on the page settings when the touch detection portion detects a predetermined first touch operation. Also, the display data generator generates display data for displaying the device wave of the device that is specified by the subject device settings based on the chronological data, which is stored in the programmable logic controller, when the touch detector detects a predetermined second touch operation on the display screen. In addition, the display portion displays the another page or the device wave on the display screen based on the display data that is generated by the display data generator. According to this programmable display, page-switching operation which switches the screen from one page to another page, and device-wave showing operation which shows the device waves of chronological data that is saved in the programmable logic controller can be selectively performed by such a touch operation on the programmable display. In this case, the device wave can be seen on the display screen of the programmable display, information useful to immediately eliminate troubles which occur on FA sites can be easily provided.

In a programmable logic controller system according to an eighteenth aspect of the present invention, in addition to the aforementioned aspect, the component settings, which are stored in the setting storage, further include setting of a wave display component for displaying the device wave. In addition, the second touch operation is a touch operation on the wave display component which is arranged on the first page displayed on the display screen.

In a programmable logic controller system according to a nineteenth aspect of the present invention, in addition to any of the aforementioned aspects, the second touch operation is a particular touch operation on a non-component-arrangement section in which no display component is arranged on the first page displayed on the display screen.

In a programmable logic controller system according to a twentieth aspect of the present invention, in addition to any of the aforementioned aspects, the particular operation is any one of long press, flick, pinch-in, and pinch-out on the non-component-arrangement section.

In a programmable logic controller system according to a twenty-first aspect of the present invention, in addition to any of the aforementioned aspects, the setting storage of the programmable display stores acquisition device settings for specifying an acquisition device that has a device value as chronological data that is temporarily recorded by the record control portion. In addition, if a touch operation on a component for displaying the chronological data of the acquisition device that is specified by the acquisition device settings is detected, the display data generator generates display data for sequentially displaying the device value of this acquisition device based on the device value chronological data that is temporarily recorded by the record control portion.

In a programmable logic controller system according to a twenty-second aspect of the present invention, in addition to any of the aforementioned aspects, the programmable logic controller further includes an external interface that is connected to an external camera, and receives image data from the camera, an image recorder that temporarily records the image data received from the camera through the external interface, and a camera unit processor that collects the image data that is received from the camera through the external interface, and associates the image data with information on time of the image data acquisition, and temporarily stores the image data associated with the information on time in the image recorder. If save conditions are satisfied, the save memory saves the image data that is temporarily stored by the camera unit processor in the image recorder which is associated with the operation record data. The programmable display acquires the operation record data that is saved in the save memory, and displays an image corresponding to the image data that is included in the operation record data on the display portion based on the information on the acquisition time that is included in the operation record data.

In a programmable logic controller system according to a twenty-third aspect of the present invention, in addition to any of the aforementioned aspects, if the save conditions are satisfied, the programmable logic controller associates a user program that is currently executed by the program-execution portion at the satisfaction of the save conditions with operation record data, and saves the user program associated with the operation record data into the save memory. The programmable display requests the programmable logic controller to send the operation record data that is saved in the save memory, and, based on information on the acquisition time included in the operation record data, superposes the device values that are acquired at the acquisition time on the user program that is included the operation record data on the display portion.

In a programmable logic controller system according to a twenty-fourth aspect of the present invention, in addition to any of the aforementioned aspects, the programmable logic controller further includes an event collection portion that collects event data relating to a plurality of events which occur in the programmable logic controller or controlled devices which are controlled by the programmable logic controller. The collection portion associates the event data with the occurrence time of the events, and stores the event data associated with the occurrence time of the events in the temporary recording portion in chronological order. If save conditions are satisfied, the save memory saves the event data that is collected by the event collection portion associated with the operation record data so that the event data is included in the operation record data. The programmable display acquires the operation record data that is saved in the save memory, and displays an event corresponding to the event data that is included in the operation record data on the display portion based on the information on the occurrence time that is included in the operation record data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 34B is a schematic diagram showing data structure of screen data of a system screen;

DESCRIPTION OF EMBODIMENTS

Figure 1:
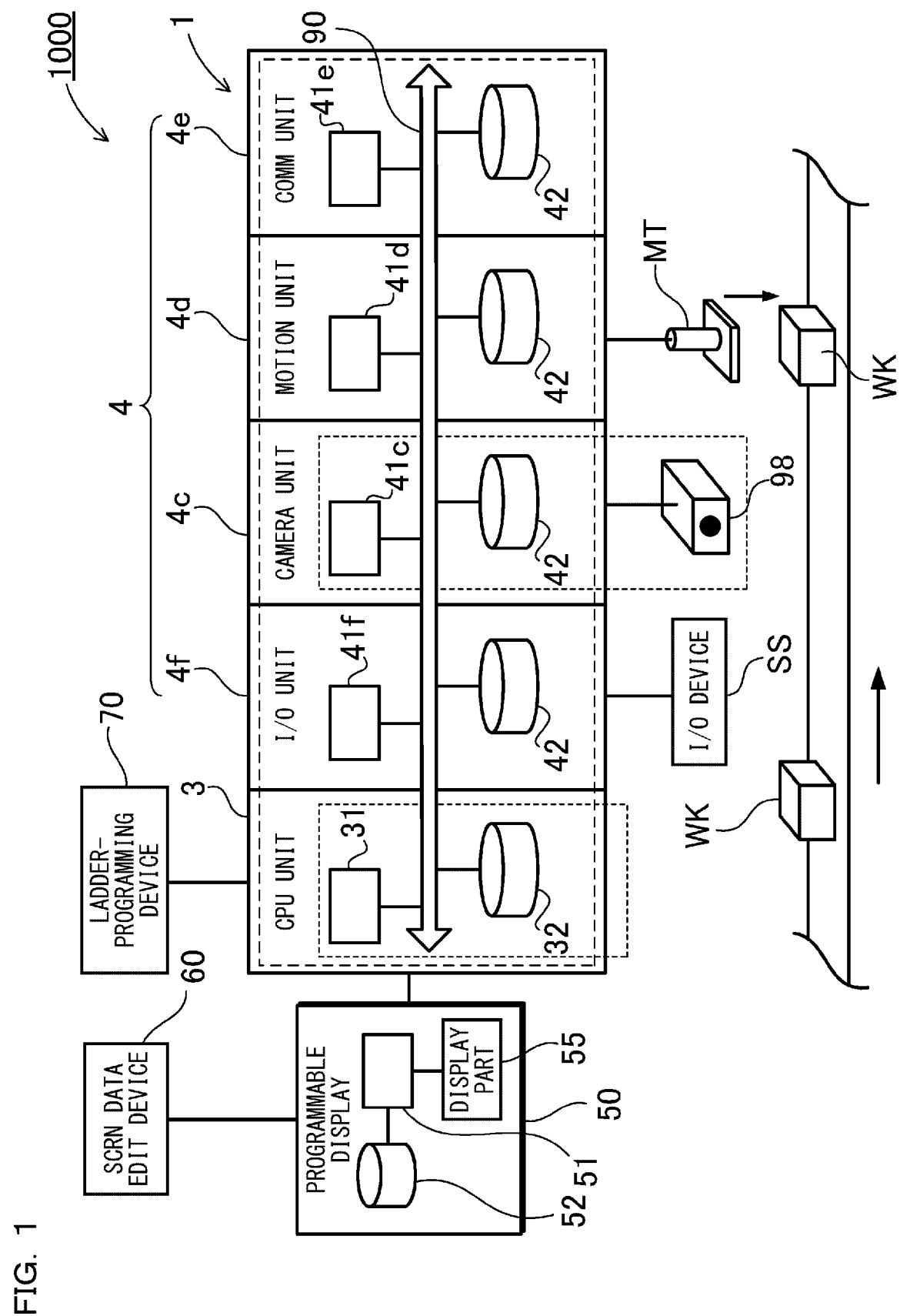
FIG. 1 is a functional block diagram showing a programmable-logic-controller system.

The embodiments will now be described with reference to the accompanying drawings, wherein like reference numerals designate corresponding or identical elements throughout the various drawings. It should be appreciated, however, that the embodiments described below are illustrations of a programmable display and a programmable logic controller system including the programmable display to give a concrete form to technical ideas of the invention, and a programmable display and a programmable logic controller system including the programmable display of the invention are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this invention are attached with the same designation and the same reference numerals and their description is omitted. In addition, a plurality of structural elements of the present invention may be configured as a single part that serves the purpose of a plurality of elements, on the other hand, a single structural element may be configured as a plurality of parts that serve the purpose of a single element.

First Embodiment

FIG. 1 is a schematic diagram of a programmable-logic-controller system 1000. In the illustrated programmable-logic-controller system 1000 is an exemplary system which captures images of objects WK which are conveyed along a production line by using a camera 98. The objects WK are machined by an electric motor MT. Subsequently, the objects WK are inspected by an input/output device SS such as a sensor. The programmable logic controller system 1000 includes a programmable logic controller 1, a programmable display 50, a programming device 70, and a screen data edition device 60. The programmable logic controller (hereinafter also referred to as "PLC") 1 is connected to the programming device 70. The programming device 70 creates or edits user programs to be executed in the PLC 1 (e.g., ladder programs). The programmable display 50 is connected to the screen data edition device 60. The screen data edition device 60 makes settings of screens to be displayed on the programmable display 50, for example, selection of components to be arranged and layout setting for every page to be displayed in a display screen. The programming device 70 and the screen data edition device 60 can be a special-purpose device or realized by software installed in a general-purpose PC.

[System Configuration of PLC]

The PLC system includes the PLC 1, the programming device 70, the programmable display 50, and the screen data edition device 60. The programming device 70 centrally controls input/output devices that are arranged a factory or the like. The programming device 70 creates ladder programs which operates PLC 1. The programmable display 50 monitors or changes the statuses of devices of PLC 1. The screen data edition device 60 creates screen data to generate display data in the programmable display 50.

The "devices" of the PLC refers to storage areas in the PLC 1 to be referred by ladder programs. Device values of the device indicate an input or output status provided from the input/output devices, or a status of an internal relay (auxiliary relay), a timer or a counter which is defined in ladder programs. Device values can be categorized into bit and word types. Bit devices store one bit of device value. Word devices store one word of device value.

Broadly speaking, the PLC 1 is constructed of a CPU-mounted unit 3 and expansion units 4. The expansion units 4 are functional expansion units which expand the functions of the CPU-mounted unit 3. An I/O unit 4f, a camera unit 4c, and a motion unit 4d are illustratively shown as the expansion units 4 in FIG. 1. The input/output devices including input devices (e.g., sensors) and output devices (e.g., alarm lamps) can be connected to the I/O unit 4f. Cameras that capture images of workpiece which are conveyed along a production line at predetermined timing can be connected to the camera unit 4c. Electric motors that drive the production line or a robot can be connected to the motion unit 4d. The motion unit 4d is also referred to as a positioning unit, and controls the positions (also called axes) of the object to be controlled. Generally, a driving source such as an electric motor is provided for each axis. The CPU-mounted unit 3 collects data from the expansion units 4, and controls the expansion unit 4 by executing required computation by executing a ladder program.

The programming device 70 can create a ladder programs, and edit and correct the created ladder program. Also, the programming device 70 can edit the construction of one or more expansion units 4 which are connected to the CPU-mounted unit 3, and operation parameters of the expansion units 4. Data that includes a ladder program and unit configuration information is referred to as project data. The programming device 70 creates project data based on user's inputs, and converts the created project data into mnemonic code. After the conversion, the ladder program is transmitted to the CPU-mounted unit 3.

The CPU-mounted unit 3 converts the ladder program into machine code, and repeatedly and periodically executes the ladder program of the machine code during operation of the PLC 1. When periodically executing the ladder program, the CPU-mounted unit 3 collects device values which are stored in the devices, and associates the device values with the collection time and temporarily records the device values associated with the collection time in a temporary recording portion 91a such as a ring buffer. If the ring buffer becomes full, the oldest device value is overwritten with the latest device value. That is, a certain amount of chronological data of device values corresponding to a certain period is temporarily stored depending on the memory capacity of the ring buffer. If previously defined save conditions are satisfied, for example, if a trouble occurs on the production line, the chronological data of a device that is previously selected as a to-be-saved device by the programming device 70 is automatically stored as log data in a save memory 36 such as a flash memory or SD card (discussed below with reference to FIG. 6).

In this case, image data that is collected in series by the camera unit 4c is stored as the log data together with the chronological data of the device. In addition, the ladder program which is executed by the CPU-mounted unit 3 when the save conditions are satisfied and the unit configuration information in this case are saved and associated with the log data. Thus, if the previously defined save conditions are satisfied, the log data including the chronological data of the device and a series of image data (chronological image data), the ladder program, and the unit configuration information are associated with each other and saved in the save memory 36, for example, by management of them by using a common identifier to identify a group of files or the like. Hereinafter, the group of files is referred to as "operation record data". In this embodiment, the contents of operation record data can be checked not only by the programming device 70 but also by the programmable display 50. The details will be discussed later.

[System Configuration of Programmable Display 50]

Figure 2:
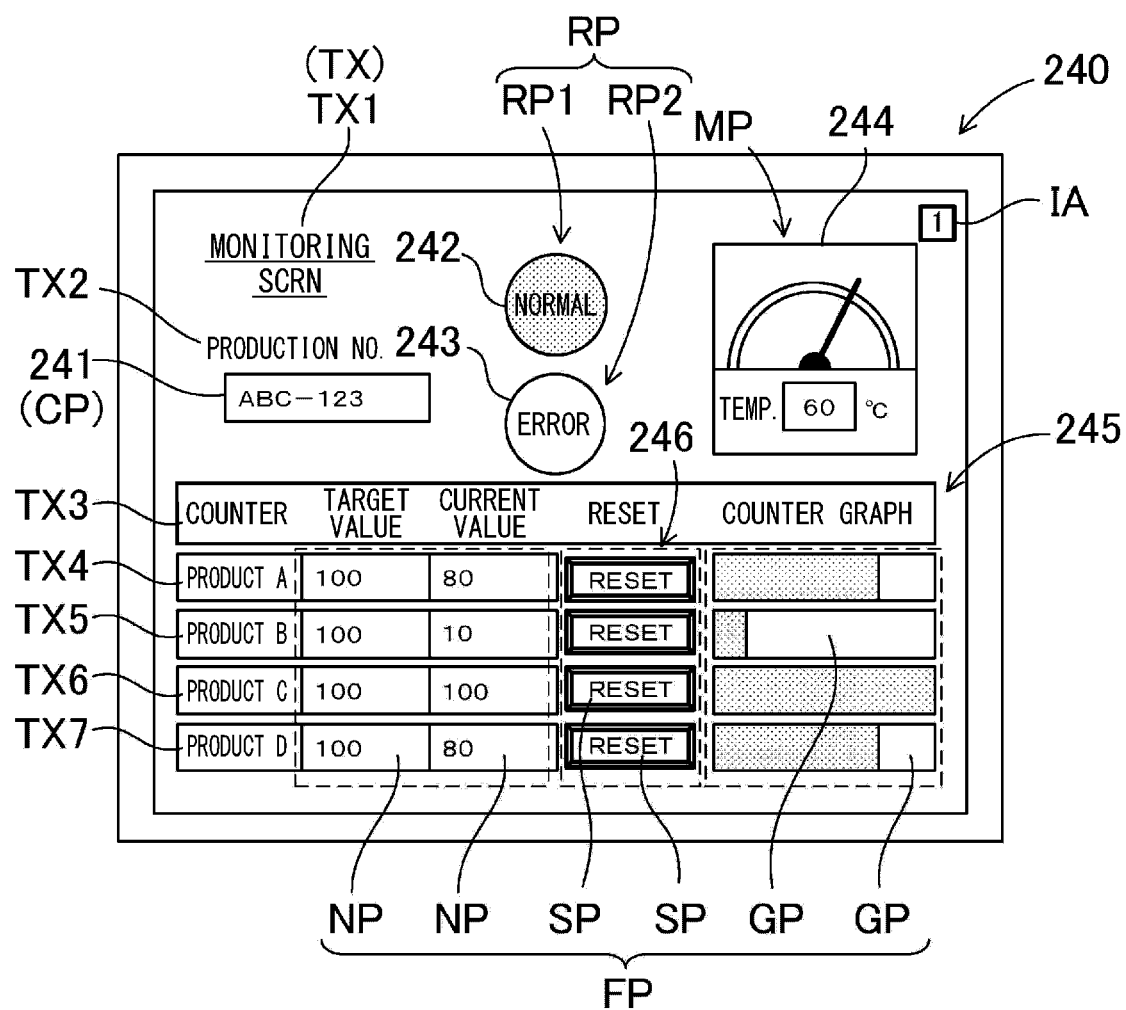
FIG. 2 is a schematic view showing an exemplary user screen displayed on a programmable display.

The programmable display 50 is connected to the PLC 1 by a communication cable. Device values that are stored by devices of the PLC 1 are transmitted to the programmable display 50 through the communication cable. As shown in FIG. 2, various functional components FP such as lamps and switches are arranged in a display screen of the programmable display 50. Devices are assigned to the functional components FP. Generally, one screen of image in which one or more components of the various function components FP are arranged is referred to as a page. Two or more pages are managed by unique screen IDs. The programmable display 50 displays a page corresponding to a screen ID on the display screen. The screen ID may be displayed on the display screen. A screen ID display box IA is arranged in the upper right part of the exemplary display screen shown in FIG. 2. The screen ID display box IA may not be constantly displayed but also be displayed only when requested. For example, such screen ID display can be called by right-clicking on non-specified areas in the display screen. Alternatively, such a display screen ID may be superposed in a large size on display screen by flicking to switch one page to another.

The components shown in FIG. 2 are now described in more detail. On the screen shown in FIG. 2, not only the aforementioned function components FP but also other various components are arranged. A text "1" shown in the aforementioned "screen ID display box 1A" and a text "monitoring screen" in the upper left part are so-called text components TX. Generally, no device is assigned to text components TX.

A text component TX2 "product number" is arranged under the text component TX1 "monitoring screen". A numerical display box 241 as a character display component CP is arranged under the text component TX2. Particular devices (which can be an internal device in the programmable display 50 or an external device in the PLC 1; the same goes for the following sections) are assigned to character display components CP. A character or a series of characters that defines its corresponding device is displayed on a character display component CP. A series of characters "ABC-123" is displayed as a character display component CP in the numerical display box 241 in the exemplary display screen shown in FIG. 2.

Lamp components RP (the lamp component is one of the functional component FP) which indicate "normal" and "error" are arranged on the right of the text component TX1 "monitoring screen". Particular devices are assigned to lamp components RP. Component icons that indicate light-on and light-off status are selectively displayed depending on a device value of their corresponding device. The component icon which indicates the light-on status is displayed in the area of the lamp component RP1, which indicates "normal", and the component icon which indicates the light-off status is displayed in the area of the lamp component RP2, which indicates "error" in the exemplary display screen shown in FIG. 2.

A meter component MP that corresponds to a "temperature meter" is arranged on the right of the lamp components RP. A particular device is assigned to the meter component MP. The angular position of a pointer of the meter component MP dynamically swings depending on a device value of its corresponding device. FIG. 2 shows the status in which the device value is 60.

Text components TX3 "counter setting-value current-value reset counter-graph" is arranged in the central part of FIG. 2. Text components TX4, TX5, TX6, and TX7 of "product A", "product B", "product C", and "product D" are arranged under the text components TX3. Numerical display components NP that indicate setting value and current value of their corresponding product are arranged in the right of the text components TX4, TX5, TX6, and TX7. Particular devices are assigned to the numerical display components NP. A device value of the device is displayed in the area of its corresponding numerical display component NP. In the exemplary display screen shown in FIG. 2, numerical display components NP "100" and "80" are arranged on a row corresponding to the product A. Also, numerical display components "100" and "10" are arranged on a row corresponding to the product B. Also, numerical display components "100" and "100" are arranged on a row corresponding to the product C. Also, numerical display components "100" and "80" are arranged on a row corresponding to the product D.

Switch components SP in which "RESET" is written are arranged as RESET switches 246 on the right of the numerical display components NP. Similarly, particular devices are assigned to the switch components SP. Switch ON and the switch OFF icons in the area of the switch components SP are switched from one to another depending on a device value of their corresponding device. In the case of FIG. 2, a status of an assigned particular device can be switched to another status by a touch operation on the RESET switch 246 (for example, from 1 to 0). This touch operation on the switch can reset a current value of their corresponding product to 0 (in other words, a device value of a device that is assigned to the touched numerical display component NP can be rewritten 0).

Graph components GP that indicate their corresponding counter graph are arranged on the right of the switch components SP as the RESET switches 246. Similarly, particular devices are assigned to the graph components GP. The length of a bar of a bar graph dynamically varies depending on a device value of its corresponding device. In the case of FIG. 2, the length of a bar varies depending on a current value of its corresponding product (in other words, a device assigned to the numerical display component NP that indicates the current value is the same as a device assigned to the graph component GP that indicates the counter graph).

As discussed above, various types of components that can be arranged on one screen of image (one page) identified by its corresponding screen ID include components to which their corresponding device is assigned, a component to which their corresponding device is not assigned, a components to which their corresponding component icon/image is assigned, and components to which their corresponding component icon/image is not assigned. Data structure of one screen of image will be discussed in more detail later.

The programmable display 50 includes a touch panel that is arranged on the display screen and detects user's touch operation. When a user touches any of the functional components FP, a status of a device assigned to this functional component FP can be changed. For example, when a functional component of a switch is touched, an ON/OFF status of a device assigned to the switch will be changed. Accordingly, the touch panel can realize the function of a switch. User's touch operation can be detected by a touch detector 53 discussed later with reference to FIG. 11.

(PLC 1)

The construction of the PLC 1 is now described. The PLC 1 shown in FIG. 1 includes a plurality of units connected to each other. The units can communicate with each other via a unit-to-unit bus 90. Broadly speaking, the unit is constructed of a CPU-mounted unit 3 and expansion units 4. The CPU-mounted unit 3 is also referred to as a main unit or a basic unit, and performs the elementary actions of the PLC 1. The expansion unit 4 is a functional expansion unit which expands the functions of the CPU-mounted unit 3. In the exemplary system shown in FIG. 1, the expansion units 4 are a camera unit 4*c*, a motion unit 4*d*, a communication unit 4*e*, and an I/O unit 4*f*. The camera unit 4*c* which is one type of the expansion units 4 is connected to the camera 98 so that images of the objects WK are captured based on predetermined timing. The camera input expansion unit 4*c* provides the images to the CPU-mounted unit 3. The motion unit 4*d* is also referred to as a positioning unit, and controls the positions (also called axes) of the object to be controlled. Generally, a driving source such as an electric motor is provided for each axis. The communication unit 4*e* includes a communication unit processor 41*e*, and can communicate with external equipment. The I/O unit 4*f* includes an I/O unit processor 41*f* to which an input/output device SS such as a sensor is connected. The CPU-mounted unit 3 collects data from the expansion units 4, and controls their required operations.

[System Configuration of PLC System]

For better understanding of a person skilled in the art about the PLC 1, a typical configuration of the PLC 1 and its operations are now described.

Figure 3:
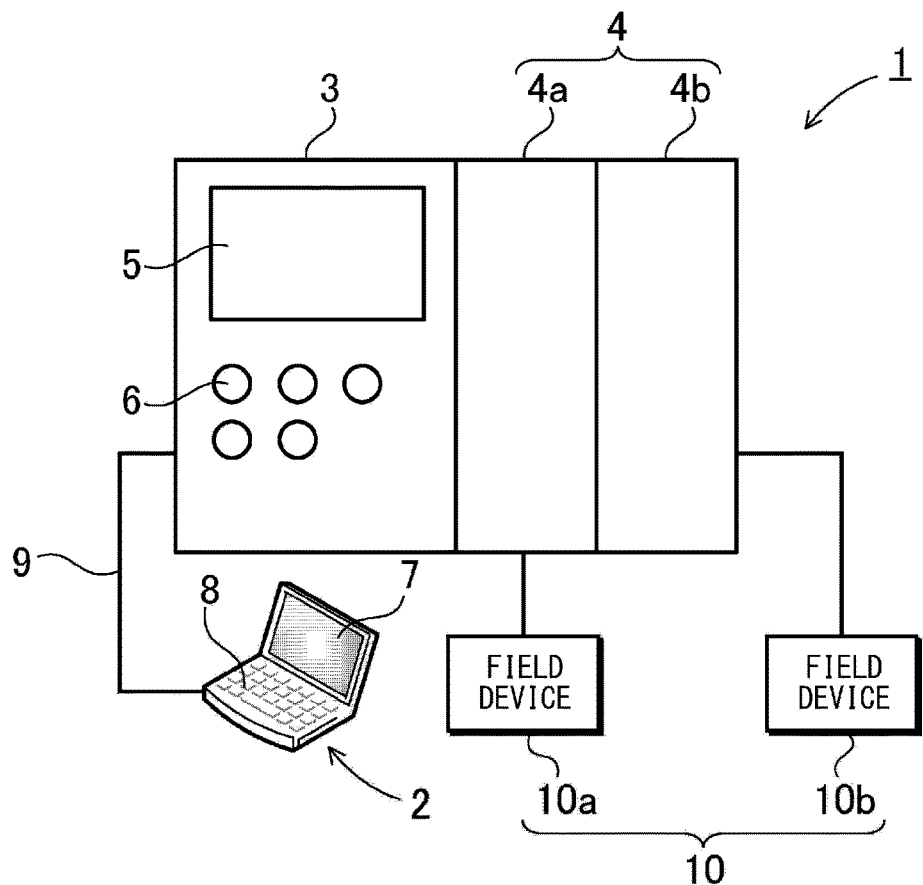
FIG. 3 is a functional block diagram showing the programmable-logic-controller system.

FIG. 3 shows an exemplary configuration of a programmable-logic-controller system according to an embodiment of the present invention. As shown in FIG. 3, the programmable logic controller system includes the PC 2 which can edit user programs such as ladder programs, and the PLC 1 which performs control over various types of controlling devices installed in a factory or the like. PC is the abbreviated name for a personal computer. The user programs may be written by using ladder language, graphical programming languages such as a motion program in flowchart format (e.g., SFC (sequential function chart)), or high-level programming languages such as C language. Hereinafter, a ladder program is illustratively used as the user program for ease of explanation. However, a user program according to the present invention is not limited such a ladder program.

The PLC 1 is constructed of the CPU-mounted unit 3 which includes a CPU, and one or more expansion units 4. One or more expansion units 4 are detachably mounted to the CPU-mounted unit 3. For example, the expansion unit 4*a* can be a positioning unit that drives an electric motor (field device 10*a*) and positions a workpiece, while the expansion unit 4*b* can be a counter unit. The counter unit counts signals from an encoder (field device 10*b*) such as a manual pulser. Letters a, b, c, . . . which are attached to the last digit of reference signs are occasionally omitted. The system which includes PLC 1 and PC 2 can be called a programmable-logic-controller system.

The CPU-mounted unit 3 includes a PLC-side display portion 5 and a PLC-side console 6. The PLC-side display portion 5 can display the operation status and the like of the expansion units 4 mounted to the CPU-mounted unit 3. The PLC-side display portion 5 can change its screen in accordance with user's inputs on the PLC-side console 6. The PLC-side console 6 can be buttons or the like which are integrally incorporated in the CPU-mounted unit 3, or an external input unit such as console, mouse, a keyboard, or the like. Alternatively, the PLC-side display portion 5 can be a touch panel which also serves as the console.

The PLC-side display portion 5 usually displays current values of the device (device values) in the PLC 1, error information on errors which occur in the PLC 1, and the like. The device refers to an area which is provided in a memory to store a device value (device data). The device can be called a device memory. The device value is information which indicates the input status provided from the input device, the output status provided to output equipment, or the status of an internal relay (auxiliary relay), a timer, a counter or a data memory which is defined in the user program. Device values can be categorized into bit and word types. Bit devices store one bit of device value. Word devices store one word of device value.

The expansion units 4 are prepared to expand the functions of the PLC 1. The field devices (devices to be controlled) 10 corresponding to the functions of the expansion units 4 are connected to their corresponding expansion unit 4. As a result, the field devices 10 are connected to the CPU-mounted unit 3 through their expansion units 4. The field devices 10 can be input equipment such as a sensor or a camera, or output equipment such as an actuator. Two or more field devices 10 can be connected to one expansion unit 4.

(Programming Device 70)

The PC 2 realizes the programming device 70. The programming device 70 is a device which is connected to the PLC 1 and performs setting, control during actual operations, confirmation of the operations, and the like. Also, the PLC engineering tool can create various types of programs which instruct operations of the PLC 1 or the programmable-logic-controller system including the PLC 1, and edit and correct the created program. In this sense, the programming device 70 is also referred to as program-writing support device, engineering tool for programmable logic controllers, and the like. The programming device 70 can produce the operations of the devices based operation record data which records past operations of the programmable-logic-controller system. The operation record data includes project data including a user program such as a ladder program and setting data such as unit configuration information of units, and log data as actual operation data including device values of devices and image data of a camera during actual operations. The programming device 70 may read the project data in the operation record data, and edit the project data. In this sense, the programming device 70 is called a project data editing program.

For example, the PC 2 is a portable note or tablet type personal computer, includes a display portion 7 and a PC-side console 8. A ladder program as an exemplary user program for controlling the PLC 1 is written by using the PC 2. The written ladder program is translated into mnemonic code in the PC 2. The PC 2 is connected to the CPU-mounted unit 3 of the PLC 1 via a communication cable 9 such as USB (Universal Serial Bus), and provides the CPU-mounted unit 3 with the ladder program which is translated into the mnemonic code. The CPU-mounted unit 3 translates the ladder program into machine code, and stores the machine code in a memory which is included in the CPU-mounted unit 3. Although mnemonic code is provided to the CPU-mounted unit 3 in this embodiment, the present invention is not limited to this. For example, the PC 2 may translate the mnemonic code into intermediate code, and provide the intermediate code to the CPU-mounted unit 3.

The PC-side console 8 of the PC 2 can include a pointing device such as a mouse which is connected to the PC 2. The PC 2 may be removably connected via another communication cable 9 other than USB to the CPU-mounted unit 3 of the PLC 1. The PC 2 may be wirelessly connected to the PLC 1 without any physical cable such as the communication-cable 9 or the like.

(Ladder Program)

Figure 4:
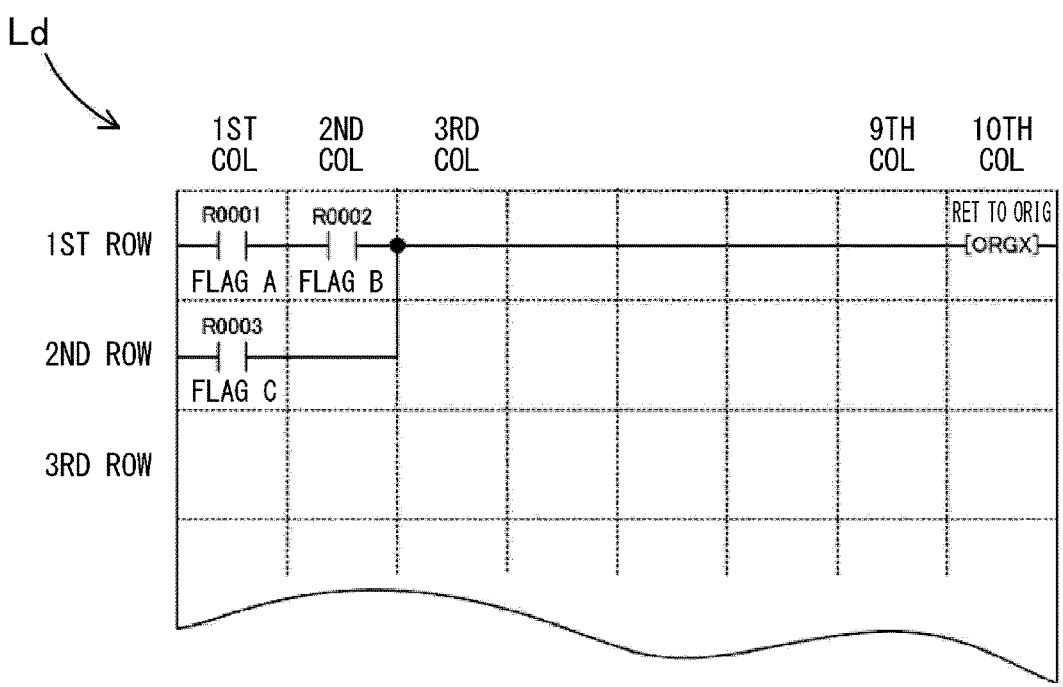
FIG. 4 is a schematic diagram of a ladder program.

FIG. 4 is a diagram showing an example of ladder diagram Ld which will be displayed on the display portion 7 of the PC 2 when the ladder program is written. The PC 2 displays a number of cells arranged in a matrix shape on the display portion 7. A symbol of a virtual device can be arranged in the cell. The symbol indicates an input relay, an output relay, or the like. A relay circuit is formed by such a number of symbols. For example, the ladder diagram Ld has ten columns and N rows of cells (N is an arbitrary natural number). A symbol of a virtual device can be suitably arranged in the cell in each row.

The relay circuit shown in FIG. 4 is formed by suitably connecting three symbols of virtual devices (hereafter called "input devices") which are turned ON/OFF based on input signals from input equipment and a symbol of a virtual device (hereafter called an "output device") which is turned ON/OFF in order to control operation of output equipment to each other.

Alphanumeric characters ("R0001", "R0002", and "R0003") which are indicated above the symbols of the input devices represent the device names (address names) of the input devices. Letters ("flag 1", "flag 2", and "flag 3") which are indicated under the symbols of the input devices represent device comments correlated with these input devices. Letters ("return-to-origin") which are indicated above the symbols of the output devices represent a label as text which indicates the function of the output device.

In the example shown in FIG. 4, the two symbols of the input devices corresponding to the device names "R0001" and "R0002" are connected in series to each other so that an AND circuit is formed. In addition, the symbol of the input device corresponding to the device name "R0003" is connected in parallel to the AND circuit, which is formed by the two symbol of the input devices, so that an OR circuit is formed. That is, in this relay circuit, when both the input devices corresponding to the two symbols in the first row are turned ON, or when the input device corresponding to the symbol in the second row is turned ON, the output device corresponding to the symbol of the first row is only turned ON.

(Programming Device 70)

Figure 5:
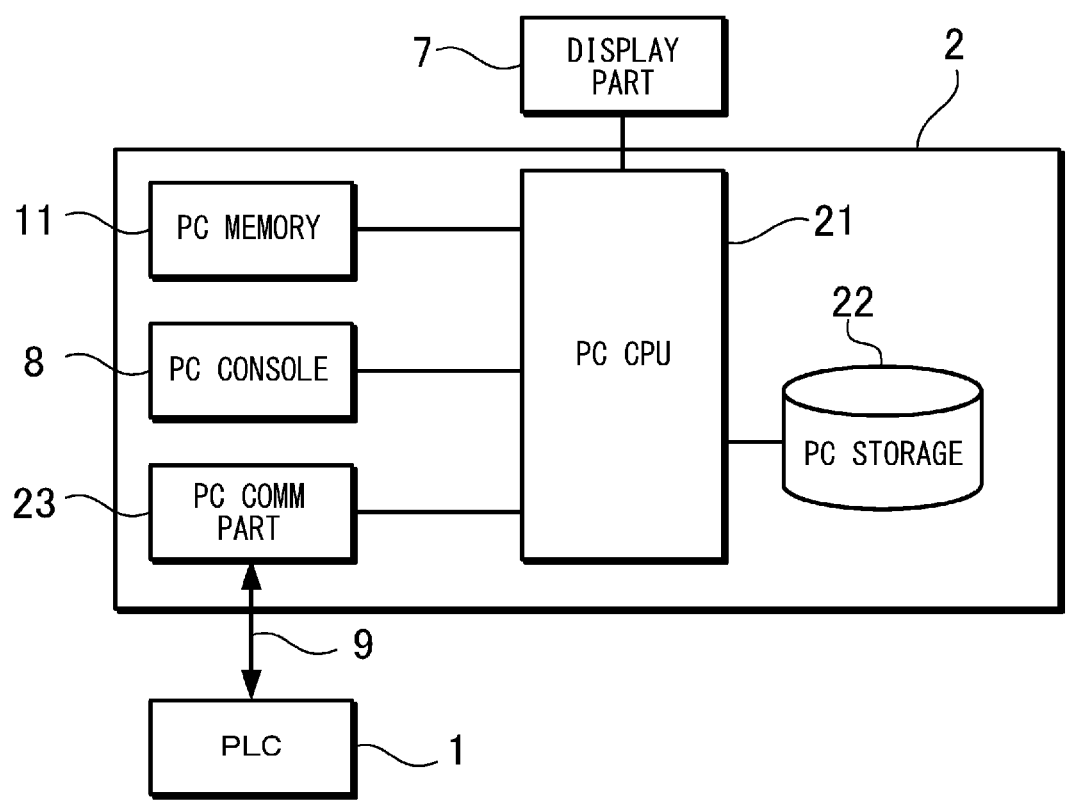
FIG. 5 is a functional block diagram of a programming device.

FIG. 5 is a block diagram of the PC 2 which realizes the programming device 70. The PC 2 includes a PC-side memory portion 11, a PC-side CPU 21, the display portion 7, the PC-side console 8, a PC-side storage device 22, and the PC-side communication portion 23 as shown in FIG. 5. The display portion 7, the PC-side console 8, the PC-side storage device 22, and the PC-side communication portion 23 are electrically connected to the PC-side CPU 21.

The PC-side memory portion 11 is a scratch-pad memory which provides work space for processing of the PC-side CPU 21, and is typically constructed of a RAM or the like. The operation record data includes project data.

The PC-side storage device 22 can include a hard disk drive, a semiconductor memory, ROM and the like, and may additionally include a removable memory card. CPU is the abbreviated name for a central processing unit. ROM is the abbreviated name for a read only memory. RAM is the abbreviated name for a random access memory.

Users run editing software as a computer program stored in the PC-side storage device 22 on the PC-side CPU 21 whereby editing the project data by operating the PC-side console 8. This editing software corresponds to a project-data editing program to be executed by the PC2.

(Project Data)

The project data includes one or more user programs (e.g., ladder programs), unit configuration information on the CPU-mounted unit 3 and the expansion units 4, and the like. The project data may include program configuration information which represents what types of program parts form the user program. The unit configuration information includes the connection points of the expansion units 4 to the CPU-mounted unit 3, information representing the functions of the CPU-mounted unit 3 (e.g., communication function and positioning function), information representing the functions and the like of the expansion units 4 (e.g., image-capturing function).

Project data editing includes project data creation and modification. The project data created by using the project data editing program is stored in the PC-side storage device 22. Users can read the project data stored in the PC-side storage device 22, and modify the project data by using the project data editing program if necessary. The PC 2 is connected to the CPU-mounted unit 3 via the communication cable 9, and can communicate with the CPU-mounted unit 3 through the PC-side communication portion 23. The PC-side CPU 21 transmits the project data to the CPU-mounted unit 3 through the PC-side communication portion 23.

The project data editing program includes editing, monitoring, and hysteresis modes. The editing mode is also called an edit mode, and the like. The project data can be edited in the editing mode. Simulations run in the monitoring mode for user program debugging, and the like. Also, real-time display which indicates variation of the device value of a device to be controlled in FA system operation can be performed in the monitoring mode. The hysteresis mode is also called a replay mode, time-machine reproduction, and the like. Hysteresis can be reproduced in the hysteresis mode. The editing, monitoring, and hysteresis modes can be switched from one to another by a mode switcher.

(PLC 1)

Figure 6:
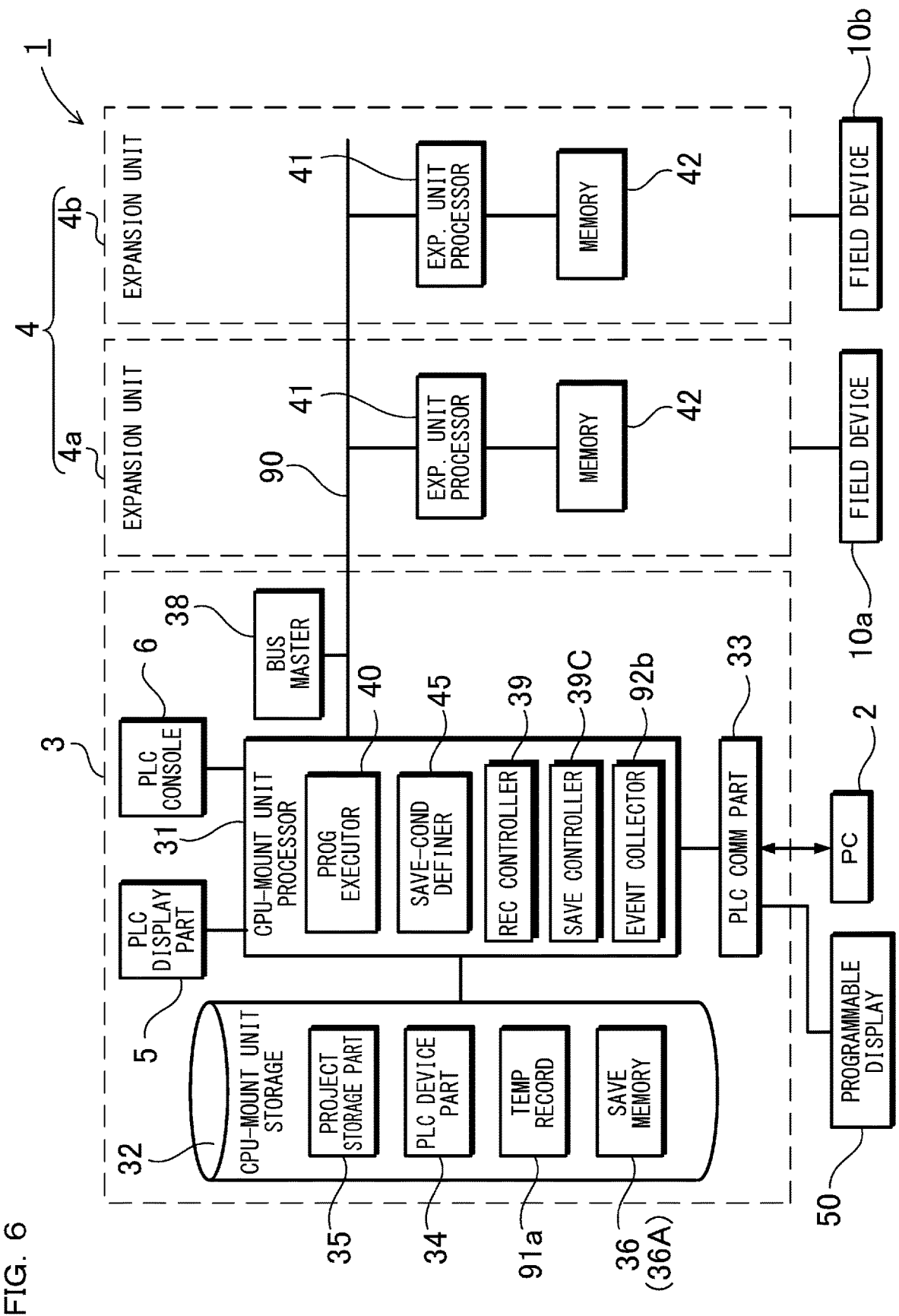
FIG. 6 is a functional block diagram of a PLC.

FIG. 6 is a functional block diagram of the PLC 1. As shown in FIG. 6, the CPU-mounted unit 3 includes a CPU-mounted-unit processor 31, a PLC-side display portion 5, a PLC-side console 6, a CPU-mounted-unit storage 32, and a PLC-side communication portion 33. The PLC-side display portion 5, the PLC-side console 6, the CPU-mounted-unit storage 32, and the PLC-side communication portion 33 are electrically connected to the CPU-mounted-unit processor 31.

(CPU-Mounted-Unit Storage 32)

The CPU-mounted-unit storage 32 includes a project storage portion 35, a PLC-side device portion 34, a temporary recording portion 91a, and a save memory 36.

The project storage portion 35 stores the project data provided from the PC 2. Also, the CPU-mounted-unit storage 32 stores a control program for the CPU-mounted unit 3.

The PLC-side device portion 34 includes bit and word devices, and the like. Each device stores a device value. The PLC-side device portion 34 serves as a device memory which stores device values of the devices. The device portion 34 may also serve as a storage area to be referenced based the user program.

The temporary recording portion 91a records the device values stored in the PLC-side device portion 34 in chronological order. The temporary recording portion 91a can be constructed of a ring buffer, or the like.

The save memory 36 saves the device values that are recorded in the temporary recording portion 91a in chronological order. The save memory 36 is constructed as a nonvolatile memory of an internal memory 37, a removable memory card 36A, or the like.

The CPU-mounted-unit storage 32 has a plurality of storage areas. The CPU-mounted-unit storage 32 may also include a RAM, ROM, memory card, or the like. For example, in the example shown in FIG. 6, the save memory 36 is constructed of the removable memory card 36A which is an SD card (trade name).

(CPU-Mounted-Unit Processor 31)

The CPU-mounted-unit processor 31 includes a program-execution portion 40, a save-condition setting portion 45, a record control portion 39, a save control portion 39C, and an event collection portion 92b. The program-execution portion 40 repeatedly executes a user program. The PLC-side device portion 34 which is a storage area to be referred by the program-execution portion 40 based on the user program stores device values of the devices.

The save-condition setting portion 45 is a component which defines various types of conditions. In this embodiment, the save-condition setting portion 45 defines first and second trigger conditions, and a buffer record period. The first trigger conditions relate to a record trigger for triggering the temporary recording portion 91a to record device values. The second trigger conditions relate to a save trigger for triggering the save memory 36 to save the device values. The buffer record period relates to a period for which the temporary recording portion 91a temporarily records the device values. The buffer record period includes at least one of the period to a reference time and the period from the reference time. The reference time is determined by the record trigger.

The save-condition setting portion 45 can define conditions of the record start trigger for starting the recording of device values into the temporary recording portion 91a as the first trigger conditions. Also, the save-condition setting portion 45 can define a certain period from the reference time determined by the record start trigger as the buffer record period.

If the first trigger conditions relating to the record trigger are satisfied, the record control portion 39 records chronological device values corresponding to the buffer record period, which is a certain period from the reference time determined by the record trigger, as log data into the temporary recording portion 91a. The record control portion 39 holds the recorded log data in the temporary recording portion 91a until earlier time that the second trigger conditions relating to the save trigger are satisfied or the first trigger conditions relating to the record trigger are satisfied again. If the first trigger conditions relating to the record trigger are satisfied again, the record control portion 39 records chronological device values corresponding to the buffer record period, which is a certain period from the reference time determined by a new record trigger, as log data in the temporary recording portion 91a.

The save control portion 39C saves, into the save memory 36, the log data which is held by the record control portion 39 in the temporary recording portion 91a, if the second trigger conditions relating to the save trigger are satisfied. At that time, when the second trigger conditions relating to the save trigger are satisfied so that a new save trigger is generated, the save control portion 39C preferably saves, into the save memory 36, log data that is held by the record control portion 39 in the temporary recording portion 91a and corresponds to the latest record trigger before this new save trigger is generated. In this case, the save control portion 39C holds the log data which is recorded during the buffer record period even after the buffer record period has elapsed, and then saves the log data that is held corresponding to the latest record trigger if the new save trigger is generated. It should be noted that log data that is held in the record control portion 39 is not limited to the log data that is held corresponding to the latest record trigger but can be log data that is held corresponding to the second or third latest record trigger.

The event collection portion 92b collects event data relating to a plurality of events which occur in the PLC 1 or devices to be controlled (field devices 10) controlled by the PLC 1. The collection portion 92b associates device values with their corresponding occurrence time of the events, and stores the device values which are associated with their corresponding occurrence time of the events in the temporary recording portion 91a in chronological order.

As shown in FIG. 6, the CPU-mounted unit 3 and the expansion unit 4 are connected via the unit-to-unit bus 90 which is one type of expansion bus. The communication functions relating to the unit-to-unit bus 90 may be included as a part of the PLC-side communication portion 33. In addition, the PLC-side communication portion 33 may have a network communications circuit. The CPU-mounted-unit processor 31 may transmit log data and the like to the PC 2, Cloud, and the like through the PLC-side communication portion 33.

The unit-to-unit bus 90 is now further described. The unit-to-unit bus 90 is a bus in which input/output refresh or the like is performed as discussed below. The communication control in the unit-to-unit bus 90 is realized by a so-called bus master 38. The bus master may be provided as a part of the PLC-side communication portion 33, or the bus master 38 may be formed as a part of the CPU-mounted-unit processor 31. The bus master 38 is a control circuit which controls the communication via the unit-to-unit bus 90, and performs communication such as later-discussed input/output refresh or the like between the expansion units 4 based on a communication request from the CPU-mounted-unit processor 31.

The expansion unit 4 includes an expansion unit processor 41 and an expansion unit memory 42. The expansion unit processor 41 controls the field device 10 based on the instruction (device value), which is stored in the device, from the CPU-mounted unit 3. The expansion unit processor 41 stores the control result of the field device 10 in the device which is called a buffer memory. The control result stored in the device is transmitted to the CPU-mounted unit 3 in the input/output refresh. The control result stored in the device is transmitted to the CPU-mounted unit 3 based on a read instruction from the CPU-mounted unit 3 even if it is not the timing of input/output refresh. The expansion unit memory 42 includes a RAM, a ROM, and the like. In particular, RAMs can surely provide a storage area to be used as a buffer memory. Also, the expansion unit memory 42 may have a buffer which temporarily holds the data (e.g., still image data and moving-image data) acquired by the field device 10.

(Scan Time of CPU-Mounted Unit 3)

Figure 7:
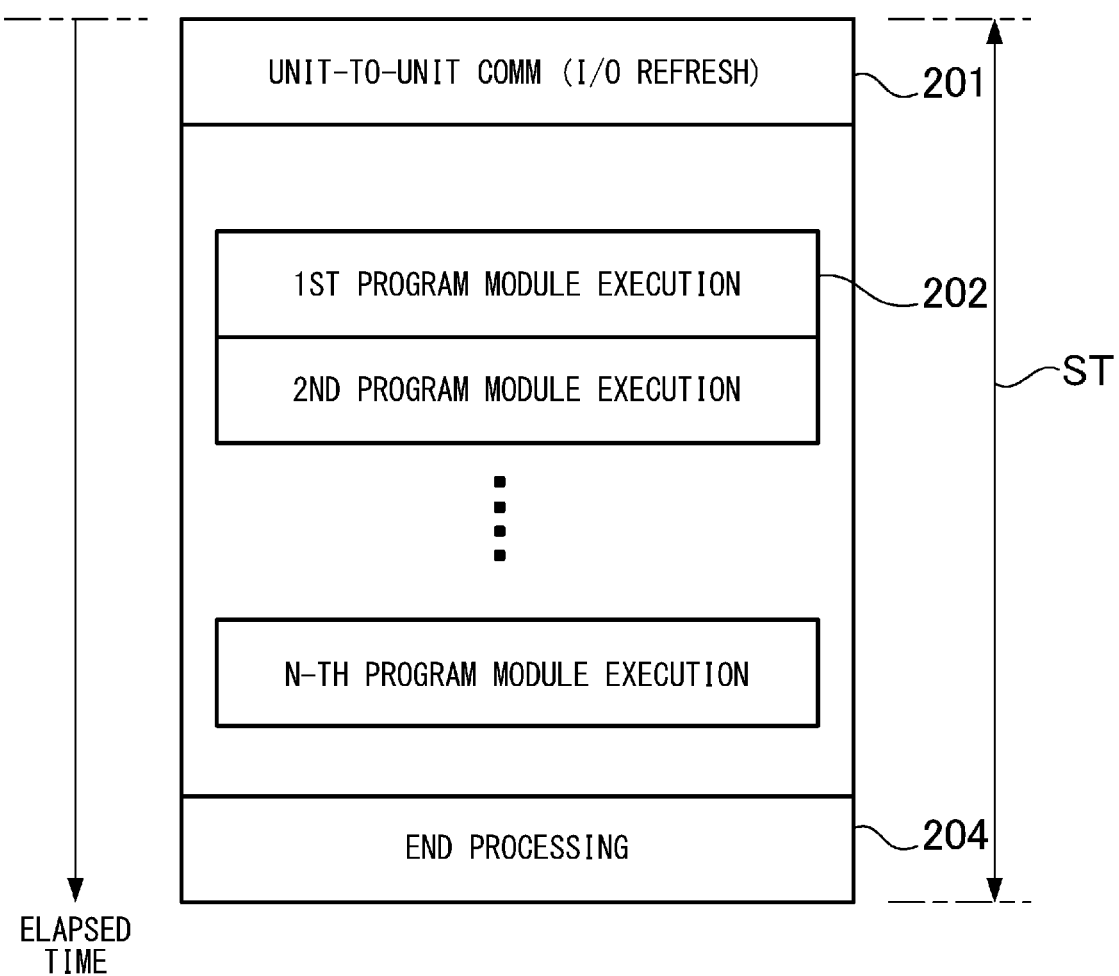
FIG. 7 is a schematic diagram illustrating a scan of the ladder program.

Scan time of the CPU-mounted unit 3 is shown in a schematic diagram of FIG. 7. As shown in FIG. 7, a single cycle of scan time ST is formed of unit-to-unit communication 201 for input/output refresh, program execution 202, and END processing 204. In the unit-to-unit communication 201, the CPU-mounted unit 3 transmits output data obtained by executing the ladder program from the CPU-mounted-unit storage 32 in the CPU-mounted unit 3 to the external equipment such as the expansion units 4. Also, the CPU-mounted unit 3 receives input data from the external equipment such as the expansion units 4, and stores the input data into the CPU-mounted-unit storage 32 in the CPU-mounted unit 3. In other words, the device of the expansion unit 4 is changed to the device value stored in the PLC-side device portion 34 of the CPU-mounted unit 3 by output refresh. Similarly, the device of the CPU-mounted unit 3 is changed to the device value stored in the device of the expansion unit 4 by input refresh. Similarly, the device of the CPU-mounted unit 3 is changed to the device value stored in the device of the programmable display 50 (display side device portion 56a discussed later with reference to FIG. 11) by input refresh. As a result, the device of the CPU-mounted unit 3 and the device of the expansion unit 4 are synchronized with each other by input/output refresh, that is, so-called mirroring is realized.

It should be noted that another manner may be used which can exchange device values between units to update the device values (unit-to-unit synchronization) other than the refresh timing. However, the CPU-mounted unit 3 rewrites the device of the CPU-mounted unit 3 at any time, while the expansion units 4 rewrite the devices of the expansion units 4 at any time. That is, the device of the CPU-mounted unit 3 is accessible at any time by the internal elements of the CPU-mounted unit 3. Similarly, the devices of the expansion units 4 are accessible at any time by the internal elements of the expansion units 4. Device values are basically exchanged in the refresh between the CPU-mounted unit 3 and the expansion units 4 to update the device values so that the CPU-mounted unit 3 and the expansion units 4 can be synchronized with each other.

At timing of the program execution 202 shown in FIG. 7, the CPU-mounted unit 3 executes the program (computing) by using the updated input data. As shown in FIG. 7, in the program execution 202, a plurality of program modules or ladder programs can be executed based on the project data. The program module refers to one of program parts that constitute a user program. For example, such program modules include main ladder programs and sub ladder programs. Program modules are also referred to as function blocks which are divided from a program based in their functions. The CPU-mounted unit 3 computes data by executing such programs.

The END processing 204 refers to general processing relating to peripheral servicing such as data communication with external equipment such as the programmable display 50 connected to the PC 2 or the CPU-mounted unit 3, and system error checking.

As discussed above, the PC 2 creates the ladder program through to user's inputs, and transmits the created ladder program to the PLC 1. The input/output refresh, the ladder program execution, and the END processing form one cycle (one scan). The PLC 1 periodically executes this cycle, in other words, repeatedly executes this cycle in a cyclic manner. This periodic scan execution can control various types of output equipment (motors etc.) based on timing signals from various types of input devices (sensors etc.). In addition, the CPU-mounted unit 3 and the expansion units 4 have an internal-control cycle in addition to the scan cycle. The CPU-mounted unit 3 and the expansion units 4 control the functions of field devices 10 and the like with reference to the internal-control cycle.

(Logging)

Device values which were acquired when the PLC executed the user program often help users to improve or correct the user program. To this end, the PLC acquires device values that are previously specified, and creates log data. Here, devices which are managed by the PLC 1 include not only devices that are used by the user program but also devices that are not used by the user program. Also, some devices can help users to improve or correct the user program, while other device may not be helpful. Generally, thousands of devices are managed by PLCs. Accordingly, selection of necessary devices is a burden to users. For this reason, the PC analyzes the user program, and extracts devices that are used by or described in the user program as logging subjects. As a result, user's burden can be reduced.

If all the devices which are managed by the PLC are extracted as logging subjects, scan time will be long. The reason is that logging is performed as one of the user programs or is performed in the input/output refresh. There may be cases where delay caused by logging disturbs users' desired operation of user program. Therefore, it is necessary to properly restrict the number of devices to be extracted as logging subjects.

As discussed above, a user program may include a plurality of program parts. It may be sufficient for users to selectively log devices relating to program parts that are intended to be corrected by users from the plurality of program parts. Also, users may desire to withdraw specific program parts from the subjects to be extracted, or add other specific program parts to the subjects to be extracted. Therefore, it may be convenient for users to select one or more program parts so as to add or withdraw devices relating to the selected program parts to/from the logging subjects.

Figure 8:
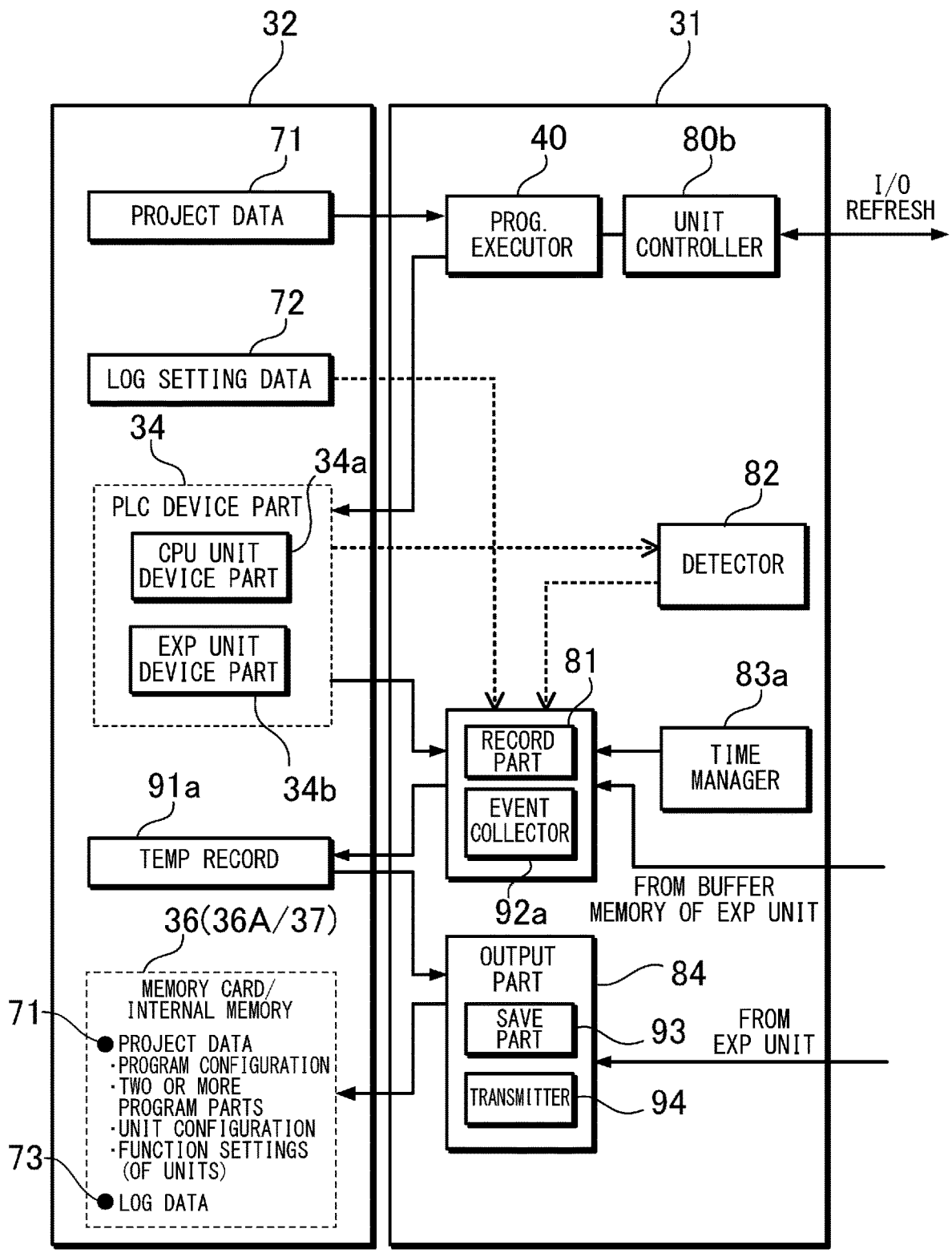
FIG. 8 is a functional block diagram of a CPU-mounted unit.

FIG. 8 is a detailed functional block diagram showing the CPU-mounted-unit processor 31 of the CPU-mounted unit 3. The components same as to the aforementioned components are attached with the same reference signs, and their description is omitted. The CPU-mounted-unit processor 31 will be described to store project data 71 and log setting data 72 which are received from the PC 2 in the CPU-mounted-unit storage 32. The device portion 34 of the CPU-mounted-unit storage 32 includes a CPU-mounted-unit device portion 34a and an expansion unit device portion 34b.

The CPU-mounted-unit side processor 31 shown in FIG. 8 includes the program-execution portion 40, a unit control portion 80b, a detection portion 82, a recording portion 81, the event collection portion 92a, a time management portion 83a, and an output portion 84. The detection portion 82 detects device-value rewriting operation of external equipment into any of devices included in the PLC-side device portion 34. When the user program execution is terminated, or when a predetermined output condition is satisfied such as when a save-trigger relay for the memory card is turned ON, the output portion 84 writes the project data 71, the log data 73, and image data into the memory card 36A, which corresponds to save memory 36, or the internal memory 37. The log data 73 is sequentially recorded in a memory (e.g., ring buffer) until the predetermined output condition is satisfied. If the capacity of the memory becomes full, the oldest log data item 73 will be erased so that a new log data item 73 is additionally recorded into the memory (log data is recorded in so-called FIFO manner). The memory card 36A can be removed from the CPU-mounted unit 3, and mounted to a mount portion of the PC 2. Accordingly, the log data 73 can be displayed on the display portion 7 of the PC 2. The output portion 84 can transmit the log data 73 to the PC 2, Cloud, and the like through the PLC-side communication portion 33.

As discussed above, the program-execution portion 40 repeatedly executes a user program. The unit control portion 80b controls the program-execution portion 40, and performs input/output refreshment between the unit control portion 80b and the expansion unit 4. The program-execution portion 40 repeatedly executes the user program included in the project data 71 whereby controlling the expansion unit 4 based on the user program. The program-execution portion 40 writes device values into output-type devices which will be held in the CPU-mounted-unit device portion 34a of the PLC-side device portion 34, and reads device values from input-type devices which are held in the CPU-mounted-unit device portion 34a based on the user program.

Based on the log setting data 72, the recording portion 81 reads device values from the PLC-side device portion 34 (CPU-mounted-unit device portion 34a and expansion unit device portion 34b) and device values from a buffer memory of the expansion unit 4, and writes the read device values into the temporary recording portion 91a (for example, ring buffer). The recording portion 81 performs logging based on predetermined timing in END processing or the like as discussed above. The log data 73 and the project data 71 are written into the save memory 36 (e.g., memory card 36A and internal memory 37).

The event collection portion 92a reads device value that is designated by the log setting data 72 from the device values that are held in the PLC-side device portion 34 from the device portion, and acquires time information from the time management portion 83a if predetermined save conditions or collection start conditions for data collection are satisfied. The event collection portion 92a stores the device value and its corresponding time information which are associated with each other in the temporary recording portion 91a. The event collection portion 92a can acquire the device values and their corresponding time information, and stores them into the temporary recording portion 91a at every collection cycle (e.g., scanning cycle) which is designated by the log setting data 72.

A ring buffer is suitably used as the temporary recording portion 91a. The reason to use a ring buffer is that all the data stored in the ring buffer is not saved as the log data 73 into the save memory 36. For example, if predetermined save conditions are satisfied, a saving portion 93 can read a device value and time information from the temporary recording portion 91a constructed of a ring buffer, and can create the log data 73. The saving portion 93 can save the created log data 73 into the save memory 36. Also, if predetermined save conditions are satisfied, the saving portion 93 may read mass data including a large number of device values and time information from the expansion unit 4, and can create and save the log data 73 into the save memory 36.

The saving portion 93 saves the aforementioned device values and time information, and the aforementioned mass data and time information correlated with each other (in a correlated manner). Here, the "correlated manner" saving refers to saving which allows easy reproduction in the PC 2, and may be file management which correlates a number of files with each other for example. Specifically, in the case where first and second subfolders which stores device values and their time information, and mass data and its time information respectively are placed under a specific folder in the save memory 36, a path to the specific folder (directory path) serves as a common flag, and files in the first and second subfolders can be saved in the "correlated manner" by using the common flag. In the case where another folder is placed on the same level (directory) as the aforementioned specific folder, the another folder means data package which is saved at another instant (different timing). Needless to say, similar subfolders can be placed under this another folder. Accordingly, the saving portion 93 can store the aforementioned device values and time information, and the aforementioned data (mass data) and time information in a number of files identified by the common flag (predetermined directory path), and save the files. Also, a filename may be used as the common flag, and the device values and their time information, and the data and its time information may be saved in the "correlated manner" by creating their files which have the common filename or correlated filenames, for example. In addition, the device values and the data may be correlated with each other by using time information of the device values and the data (mass data) as keys, and be listed and then stored in a single file. In this case, the device values and their time information, and the data and its time information may be saved in the "correlated manner".

Needless to say, although the mass data is conceived as an example of data from monitoring equipment in this embodiment, the data from monitoring equipment can be continuous data such as motion data, communication data, and audio data. A transmission portion 94 may transmit the log data 73 to the PC 2, Cloud, and the like. If the temporary recording portion 91a constructed f a ring buffer becomes full, the event collection portion 92a overwrites the oldest information which has been held in the ring buffer with the latest information. Although a ring buffer is used as an example of buffer for the temporary recording portion 91a, this is only illustrative. FIFO type buffers will work well as a buffer for the temporary recording portion 91a. The aforementioned record portion 81 and event collection portion 92a can be separated parts or be constructed integrally with each other as a single part.

As discussed above, the CPU-mounted unit 3 and the expansion unit 4 have one or more functions. Various types of devices are assigned to the functions. Therefore, it may be convenient for users to select one or more functions so as to add or withdraw devices assigned to the selected functions to/from the logging subjects. For example, if an undesirable event occurs which relates to the communication function of the CPU-mounted unit 3, users can easily solve the undesirable event by referencing device values of the devices relating to the communication function of the CPU-mounted unit 3.

(Camera Unit 4c)

Cameras can be connected to the PLC 1. To this end, the expansion units 4 which constitute the PLC 1 can include the camera unit 4c to which a camera can be connected. This PLC 1 is shown in a functional block diagram of FIG. 9. This illustrated PLC 1 includes an external-directed interface 97, an image recorder 520, and a camera unit processor 41c. The external-directed interface 97 is connected to an external camera, and receives image data from this camera. The image recorder temporarily records the image data received from the camera through the external-directed interface 97. The camera unit processor 41c collects the image data that is received from the camera through the external-directed interface 97, and associates this image data with information on time of the image data acquisition and temporarily stores this image data associated with the information on time in the image recorder.

If save conditions are satisfied, the PLC 1 associates the image data that is temporarily stored by the camera unit processor 41c in the image recorder with the operation record data, and saves the image data associated with the operation record data. The image data associated with the operation record data can be saved into the save memory 36 in the CPU-mounted unit 3, or a camera-setting information storage portion 530 in the camera unit, for example.

The programmable display 50 acquires the operation record data that is saved in the save memory 36, and displays an image corresponding to the image data that is included in the operation record data on the display portion based on the information on the acquisition time that is included in the operation record data.

Figure 10:
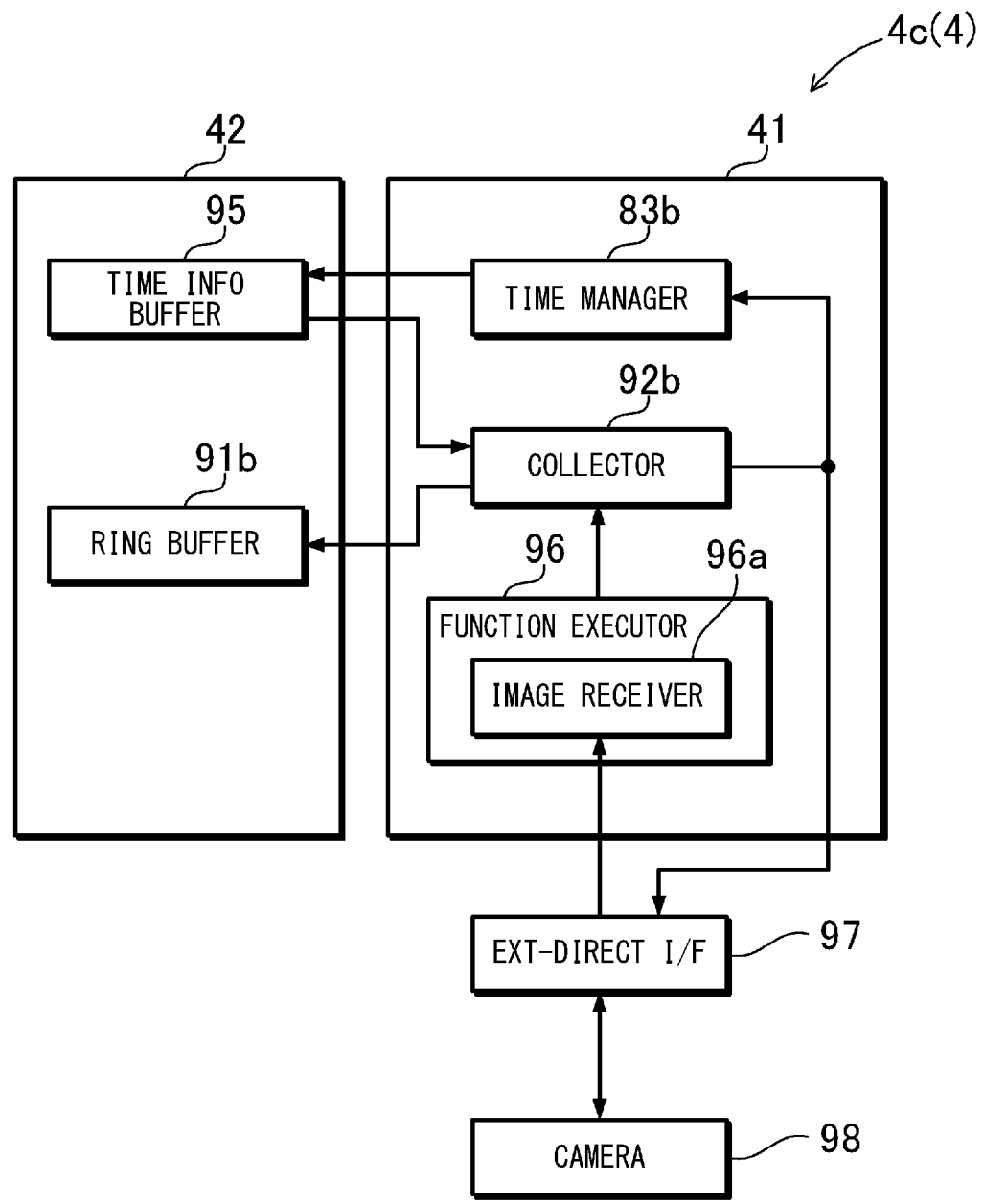
FIG. 10 is a functional block diagram of an expansion unit.

The function of the expansion unit processor 41 of the camera unit 4c which is one of the expansion units 4 having camera input function is now described with reference to a functional block diagram of FIG. 10. The clock of the time management portion 83b is synchronized with the clock of the time management portion 83a of the CPU-mounted unit 3 shown in FIG. 8. For example, the time management portion 83a of the CPU-mounted unit 3 transmits time information to the time management portion 83b in the END processing. The time management portion 83b synchronizes the clock of the time management portion 83b with the clock of the time management portion 83a of the CPU-mounted unit 3 based on the received time information. The clock may be realized by a counter which counts time based on the time information. For example, the event collection portion 92b will periodically provide a trigger signal if a predetermined collection condition is satisfied (e.g., a predetermined relay device is turned ON). The time management portion 83b acquires, from the clock, the time information corresponding to the instant when receiving the trigger signal, and stores it into a time-information buffer 95. The expansion unit memory 42 includes the time-information buffer 95 and the temporary recording portion 91a. The external-directed interface 97 is an interface for connecting the camera 98 to the camera unit 4c. The external-directed interface 97 periodically provides the trigger signal which is issued by the event collection portion 92b to the camera 98, or provides an image reception portion 96a with image data that is provided by the camera 98. The image data is an example of mass data. The external-directed interface 97 is an example of an interface which is connected to monitoring equipment such as the camera 98 and is provided with data (image data) from the monitoring equipment. The image reception portion 96a is the whole or a part of a function execution portion 96 which performs image capture function which includes reception of the image data from the camera 98 via the external-directed interface 97. In this embodiment, the function execution portion 96 (image reception portion 96a) controls the camera 98 based on imaging parameters such as exposure time, gain, white balance, and contrast (examples of setting information). These imaging parameters are specified by providing desired parameter values in the PC 2, and are transmitted to the function execution portion 96 through the PLC-side communication portion 33 and the CPU-mounted-unit side processor 31 of the CPU-mounted unit 3 shown in FIG. 6. From this viewpoint, the PLC-side communication portion 33 shown in FIG. 6 is another example of an interface which receives the setting information from external setting equipment such as the PC 2 and a display. In addition, the PLC-side communication portion 33 receives the user program created in the PC 2 as discussed above. The camera 98 captures an image based on the trigger signal, and provides image data corresponding to the captured image. The image reception portion 96a transfers the image data to the event collection portion 92b. The event collection portion 92b associates the time information that is held in the time-information buffer 95 and the image data that is provided from the image reception portion 96a with each other, and stores the associated time information and image data into the ring buffer 91b. If the ring buffer 91b becomes full, the event collection portion 92b overwrites the oldest information which has been held in the ring buffer 91b with the latest information. Although the event collection portion 92b automatically and periodically provides an image-capture trigger signal to the camera 98 in this embodiment, the present invention is not limited to this. The event collection portion 92b may provide the image-capture trigger signal to the camera 98 based on the instruction from the user program, for example.

The CPU-mounted unit 3 communicates with the expansion units 4 by using one of the refresh communication performed in every scan, direct communication that can be performed at any time, and message communication performed by best effort at the time of occurrence of an event. For example, the saving portion reads the image data and its corresponding time information from the ring buffer 91b of the expansion unit 4 by using the direct communication, and adds these image data and time information to the log data 73. A plurality of direct communications with priority levels may be installed as the direct communication. In this case, the direct communication relating to the user program can have a relatively high priority level, while the direct communication relating to the logging can have a relatively low priority level. This priority assignment can reduce an influence of the logging on execution of the user program.

As discussed above, FIG. 9 shows the functional block diagram of the programmable logic controller system including the camera unit 4c. In this illustrated programmable-logic-controller system, the PLC 1 is constructed of the CPU-mounted unit 3, the camera unit 4*c*, and another expansion unit 4. The CPU-mounted unit 3, the camera unit 4*c*, and the expansion unit 4 are connected via the unit-to-unit bus 90 to each other. The PC 2 is connected to the CPU-mounted unit 3 via a communication line CL. The camera 98 is connected to the camera unit 4*c* via the image-capture-trigger line. The camera 98 includes a camera-setting recording portion 575. The CPU-mounted unit 3 includes the device portion. Setting information on the camera 98 is recorded in the camera-setting recording portion 575.

Figure 9:
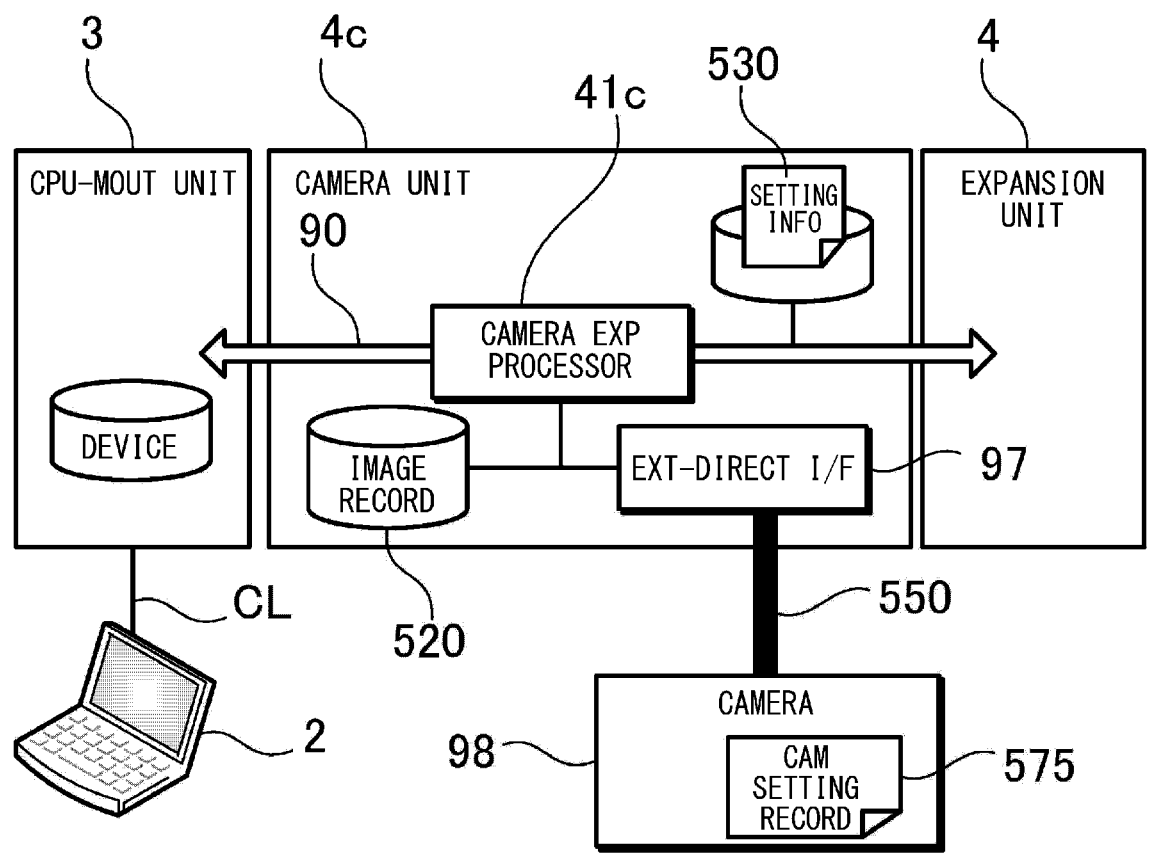
FIG. 9 is a functional block diagram showing the programmable-logic-controller system including a camera unit.

The camera unit 4*c* shown in FIG. 9 is connected via the unit-to-unit bus 90 to the CPU-mounted unit 3 which is a basic unit. The image-capture-trigger line and an image-communication line are connected to an external interface 97 which connects the camera 98 to the camera unit 4*c*. The synchronization timing in the unit-to-unit bus 90 can be extended even to the camera 98 by transmitting an ON/OFF signal which defines the image-capture trigger for the camera 98 via the image-capture-trigger line. As a result, the record time of a device value and the acquisition time of camera image data can be precisely synchronized with each other.

(Camera Unit 4*c*)

The camera unit 4*c* is electrically connected to the CPU-mounted unit 3 via the unit-to-unit bus 90. The camera unit 4*c* is a unit for connection to the camera 98 which can capture an image of a predetermined area based on the image capture trigger from the PLC 1 and generate image data corresponding to the captured predetermined area. The camera unit 4*c* shown in FIG. 9 includes the external-directed interface 97, a camera-setting-information storage portion 530, a camera unit processor 41*c*, and an image-recorder 520.

The camera-setting-information storage portion 530 stores the setting information on the camera 98 including the conditions of the image capture trigger. The setting information on the camera 98 which is stored in the camera-setting-information storage portion 530 includes the setting information that is created by the programming device 70 and received through the CPU-mounted unit 3. The user program which is executed by the CPU-mounted unit 3 is written in the programming device 70 which can be connected to the CPU-mounted unit 3.

The camera unit processor 41*c* generates an ON/OFF signal for defining the image capture trigger based on the setting information of the camera 98, which is stored in the camera-setting-information storage portion 530. Based on the ON/OFF signal as the image capture trigger, the camera unit processor 41*c* acquires the image data which is generated by the camera 98.

The image-recorder 520 records the image data which is acquired by the camera unit processor 41*c*. The image-recorder 520 records the image data which is acquired by the camera unit processor 41*c* and the information on time of its corresponding image data acquisition which are associated with each other in chronological order. In addition, the image-recorder 520 provides the CPU-mounted unit 3 with the image data and the information on time of its corresponding image data acquisition based on instruction from the CPU-mounted unit 3.

The external-directed interface 97 is provided between the camera unit processor 41*c* and the camera 98. The external-directed interface 97 has the image-capture-trigger line and the image-communication line.

The image-capture-trigger line is an interface for providing the camera 98 with the ON/OFF signal which is generated in the camera unit processor 41*c* and defines the image capture trigger for triggering the camera 98 to capture an image. The image-capture-trigger line is preferably a non-communication line. In this case, since the image capture trigger is provided not by communications but by I/O of ON/OFF, the image capture trigger can be provided at a very high speed as compared with transmission of an image capture command by communications.

The external-directed interface 97 and the image-capture-trigger line are bundled together and form a camera connection cable that connects the image-capture interface and the camera 98 to each other. Accordingly, transmission/reception of all the electric signals for operating the camera 98 can be performed only by connecting the camera unit 4*c* and the camera 98 to the external-directed interface 97. As a result, wiring can be simple. Therefore, the structure of the programmable logic controller can be simplified.

The camera-setting-information storage portion 530 stores the setting information on the camera 98 which is received via the unit-to-unit bus 90 from the CPU-mounted unit 3. Examples of the setting information of the camera can be provided by various types of information such as framerate, image quality, rotation, exposure, gain, exposure time, white balance, contrast, gamma, sharpness, and an anti-flicker. The camera unit processor 41*c* is connected to the CPU-mounted unit 3 or the expansion unit 4 via the unit-to-unit bus 90. The camera unit processor 41*c* receives image data from the camera 98 via the external-directed interface 97 based on the setting information on the camera 98 which is stored in the camera-setting-information storage portion 530. The image-recorder 520 collects the image data acquired by the camera 98, and records this image data and the information on time of the image data acquisition which are associated with each other. Accordingly, the programmable logic controller can obtain precise time synchronization with device records relating to the captured image data generated by the camera 98. In particular, since the ON/OFF signal is transferred through the dedicated image-capture trigger line not through the communication line and without command interpretation, time delay can be avoided by such precise time synchronization.

(Chronological Data)

Functions which save device values as chronological data, and display a device wave on the programmable display 50 in the programmable logic controller system shown in FIG. 1 are now described. The PLC 1 saves chronological data relating to device values of a device as a storage area to be referred by a user program based on previously defined save conditions. The PLC 1 includes the CPU-mounted-unit side processor 31 and the CPU-mounted-unit storage as shown in FIG. 6. The CPU-mounted-unit side processor 31 includes the program-execution portion 40 which repeatedly executes a user program, the record control portion 39, and the save control portion 39C. The CPU-mounted-unit storage includes the device portion which includes devices are storage areas to be referred by the program-execution portion 30, the temporary recording portion 91*a*, and the save memory 36. The temporary recording portion 91*a* is controlled by the record control portion 39 in recording. The temporary recording portion 39 collects device values of the device stored in the device portion, and associates the device values with information on collection time of the device values and temporarily records the device values associated with the information on collection time in chronological order in the temporary recording portion 91*a*. The save memory 36 is controlled by the save control portion 39C in saving. The save control portion 39C save the chronological data relating to the device values that are temporarily recorded in the temporary recording portion 91a as operation record data into the save memory 36, when the previously defined save conditions are satisfied.

Figure 11:
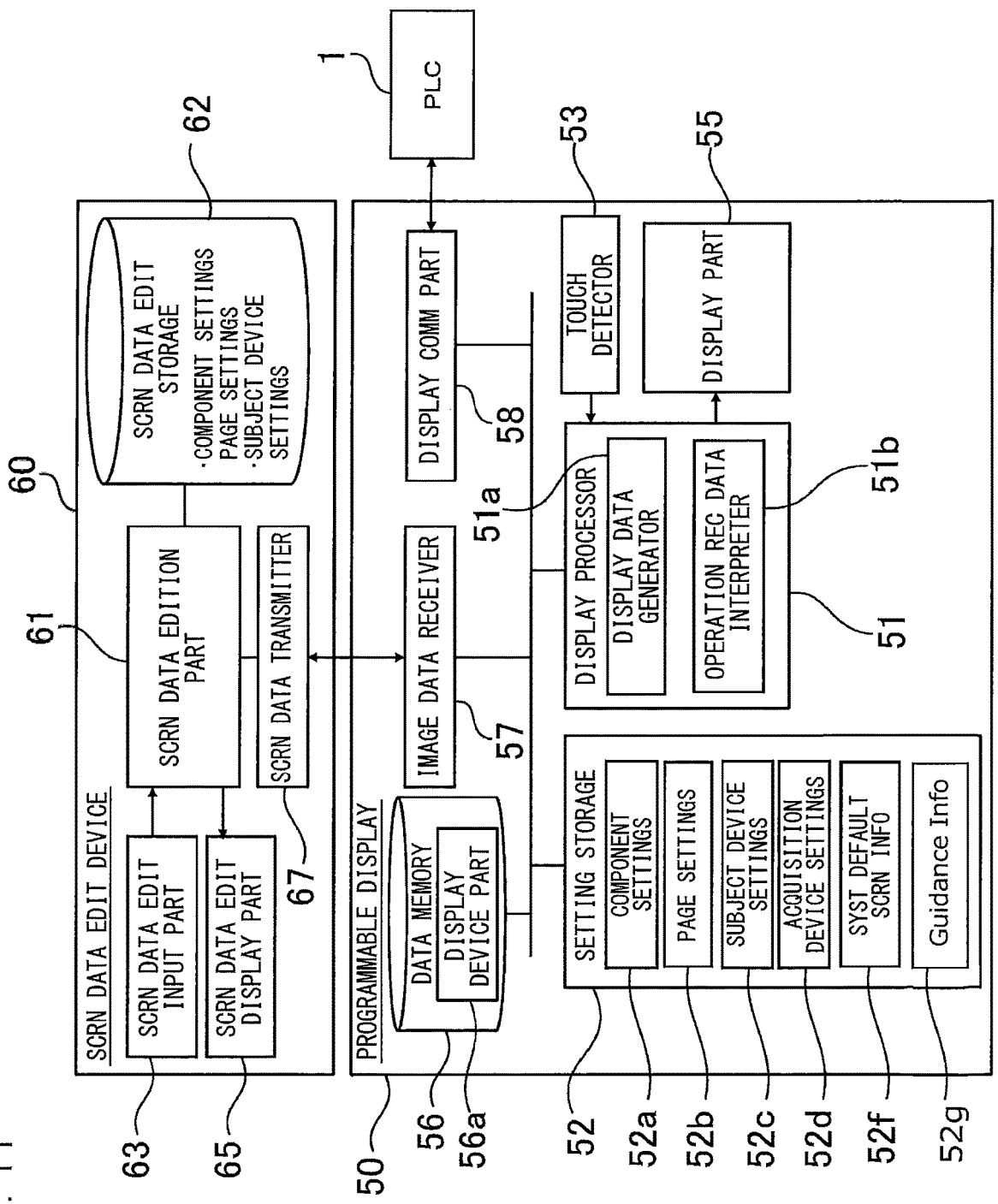
FIG. 11 is a functional block diagram of a programmable display.

The programmable display 50, which is connected to the PLC 1, displays a display screen that is previously defined by the screen data edition device 60 on the display portion 55. FIG. 11 is a functional block diagram of the programmable display 50, which is connected to the screen data edition device 60. The screen data edition device 60 can be connected to the programmable display 50 as shown in the FIG. 11. The various types of screen data to be displayed by the programmable display 50 are created by using the screen data edition device 60. The following description will describe the screen data edition device 60.

(Screen Data Edition Device 60)

The screen data edition device 60 can be realized by executing a graphic editing program which runs on an information-processing terminal such as personal computer. Users create a plurality of pages which include various function components FP arranged in desired layout. The screen data edition device 60 sends screen data corresponding to the plurality of pages that are created based on the users' input to the programmable display 50. The programmable display 50 stores the sent screen data in its flash memory or the like, and displays a page identified by its screen ID based on user's touch operation. In an exemplary case, a page corresponding to screen ID1 is displayed on the display screen of the display portion 55 of the programmable display 50, and a switching component for switching this page to a page corresponding to screen ID2 in arranged on this page. In this case, when a touch operation on the switching component is detected, display data of the page corresponding to screen ID2 is generated, and the page corresponding to screen ID2 is displayed based on the generated display data.

Users can check the contents of operation record data that is saved in the PLC 1 by the programmable display 50 according to this embodiment as discussed above. For example, a page corresponding to screen ID1 is displayed on the display screen of the display portion 55 of the programmable display 50, and wave display components which indicate device waves in a form of chronological data of devices included in the operation record data are arranged on this page. When a user touches one of the wave display components, its operation record data is read from the CPU-mounted unit 3 of the PLC 1, display data is generated to display the device wave. The device wave of the device to be displayed is displayed on the system screen based on the generated display data.

Devices to be displayed can be defined by subject device settings 52c discussed later. The subject device settings 52c can define subject devices whose device waves are displayed. A large number of devices are included in log data of the operation record data. The types and number of device waves of devices to be displayed on the programmable display 50 depend on sites where the programmable display 50 is provided. To address this, the programmable display 50 according to this embodiment stores devices that are previously defined by users using the screen data edition device 60 as the subject device settings 52c. When a user touches one of the wave display components, the programmable display 50 can display suitable types and number of device waves of devices in the operation record data that is saved by the PLC 1 depending on the sites. As a result, troubles which occur on FA sites can be immediately easily eliminated.

(Programmable Display 50)

The programmable display 50 is now described. The programmable display 50 shown in FIG. 11 includes a setting storage 52, a display processor 51, the touch detector 53, the display portion 55, a data memory 56, a screen data receiver 57, and a display-side communication portion 58.

(Setting storage 52)

The setting storage 52 stores various types of screen data which is required to generate display data in the programmable display 50 such as component settings 52a, page settings 52b, subject device settings 52c, acquisition device settings 52d, system default screen information 52f, and guidance information 52g. The guidance information 52g is associated with the device that is specified by the subject device settings, and shows how to eliminate an error event which occurs when the save conditions are satisfied. The setting storage 52 which stores the guidance information 52g serves as a guidance information storage.

The component settings 52a assign devices to their corresponding one of a plurality of components which are arranged on one screen of image as page to monitor or change a status of the device of the PLC 1. For example, assignment of devices to components which are arranged on the display screen, and functions which are performed upon a touch operation on their corresponding component are defined as the component settings 52a. In addition, component images corresponding to the components are included in the component settings 52a. For example, the component images include images which indicate light-on and light-off status of a lamp and the like.

The page settings manage the component settings 52a page by page by using a page identifier which identifies a plurality of pages. The page identifier can be screen IDs which indicate their corresponding page number, for example. A plurality of pages each of which corresponds to one screen of image on which one or more components are arranged be the page can be managed page by page by unique screen IDs based on the page settings 52b.

The subject device settings 52c specify a subject device that has a device value to be stored in the PLC 1 as chronological data to be shown in a wave form as device wave. A subject device that has a device wave in the operation record data to be shown on the programmable display 50 is defined by the subject device settings 52c based on selection.

The acquisition device settings 52d specify a device that has a device value to be acquired as a device wave to be displayed on a real-time chart monitor in a monitoring mode discussed later. The system default screen information 52f is information on a previously prepared system default screen.

The display processor 51 can be realized by a CPU and software as program, hardware such as FPGA and ASIC, or combination of software and hardware. Needless to say, a plurality of CPUs and a plurality of hardware devices may be used for the display processor 51. In other words, the display processor 51 can be constructed of any structure. The display processor 51 includes a display data generator 51a and an operation-record-data interpretation portion 51b.

The display data generator 51a can generate display data for the pages corresponding to the page identifier page by page based on the component settings 52a and the page settings 52b which are stored in the setting storage 52. Display data to be displayed on the display screen of the display portion 55 is generated by the display data generator 51a. In this embodiment, the touch detector 53 detects user's touch operation. When a touch operation is detected, the display data to be displayed is changed in accordance with this touch operation. Specifically, the display data generator determines whether a component (e.g., switch component SP etc.) that has an assigned function is located on the position of the display screen which is pointed by user's touch operation. If any component is located on the touches position, the function corresponding to the component is performed. More specifically, for example, in the case in which a switch component SP is located on the touches position, a status of a device that is assigned to the switch component SP is changed, and a component icon (e.g., component icon which indicates a switch ON or switch OFF status) is displayed in accordance with the changed status of the device on the display screen.

If touch operation is not detected, the display data generator 51a generates display data to be used for device monitoring. The display data generator 51a generates display data for monitoring statuses of devices of the PLC 1 so that the page shown in FIG. 2 is displayed under operation of the PLC 1, for example. Specifically, the display data generator 51a read device values of the device to be used in the display data from the data memory 56 at fixed intervals, and rewrites values of display data to generate new display data. The display portion 55 displays a page based on to the generated, new display data on the display screen. Values in the data memory 56 are synchronized with device values of devices which are selected from the devices of the PLC 1 to be used for display data, that is, so-called mirroring is realized by the display-side communication portion 58 discussed later. Accordingly, statuses of devices in the PLC 1 can be monitored or changed in real time. The basic processing in the device monitoring will be discussed later.

The operation-record-data interpretation portion 51b reads management information data in the operation record data, and determines types of data that are included in the operation record data (details will be discussed later).

(Touch Detector 53)

The touch detector 53 detects a touch operation on the display screen of the display portion 55. This touch detector 53 detects such a touch operation on the display screen using a touch panel. Examples of touch operations can be provided by long tapping (long press), double tap, flick, pinch-in, pinch-out, and the like.

(Display Portion 55)

The display portion 55 includes the display screen. Based on display data that is generated by the display-data generation portion 51a, a page corresponding to a page identifier is displayed on the display portion 55 in accordance with the display data. The display portion 55 can be constructed of a LCD, organic electroluminescence, or the like which ha a touch-panel function, for example.

(Data Memory 56)

The data memory 56 holds various types of settings. In this embodiment, the data memory 56 includes the display-side device portion 56a which holds device values. The display-side device portion 56a stores device values of devices in the devices of the PLC 1 to be used for display data. Values in the display-side device portion 56a are suitably updated by the display-side communication portion 58 discussed later.

(Screen Data Receiver 57)

The screen data receiver 57 is an interface which receives screen data that is created and sent by the screen data edition device 60. The display processor 51 stores the screen data received through the screen data receiver 57 into the setting storage 52.

(Display-Side Communication Portion 58)

The display-side communication portion 58 is a communication interface which communicates with an external device, for example, with the PLC 1. The display-side communication portion 58 repeatedly communicates with the PLC 1 at predetermined intervals (e.g., 10 ms) so that values in the data memory 56 and device values of devices in the devices of the PLC 1 to be used for display data are synchronized with each other (mirroring). For example, in the case in which one scan of a ladder program is about 100 μs, and the communication interval between the PLC 1 and the programmable display 50 is 10 ms, the programmable display 50 will read devices in the PLC 1 at every 100 scans of the ladder program. Also, the display-side communication portion 58 can perform protocol conversion and the like if necessary.

(Display-Data Generation Portion 51a)

When the touch detector 53 detects a first touch operation on a page switching component 131 that is arranged on a first page displayed on the display screen, the display-data generation portion 51a generates second page display data corresponding to a second page identifier be based on the page settings 52b.

Also, the display-data generation portion 51a generates display data for displaying a device wave of a device that is specified by the subject device settings 52c based on the chronological data, which is stored in the PLC 1, when the touch detector 53 detects a predetermined second touch operation on the display screen. Then, the display portion 55 displays the second page or the device wave on the display screen based on the display data that is generated by the display data generator 51a.

Figure 12:
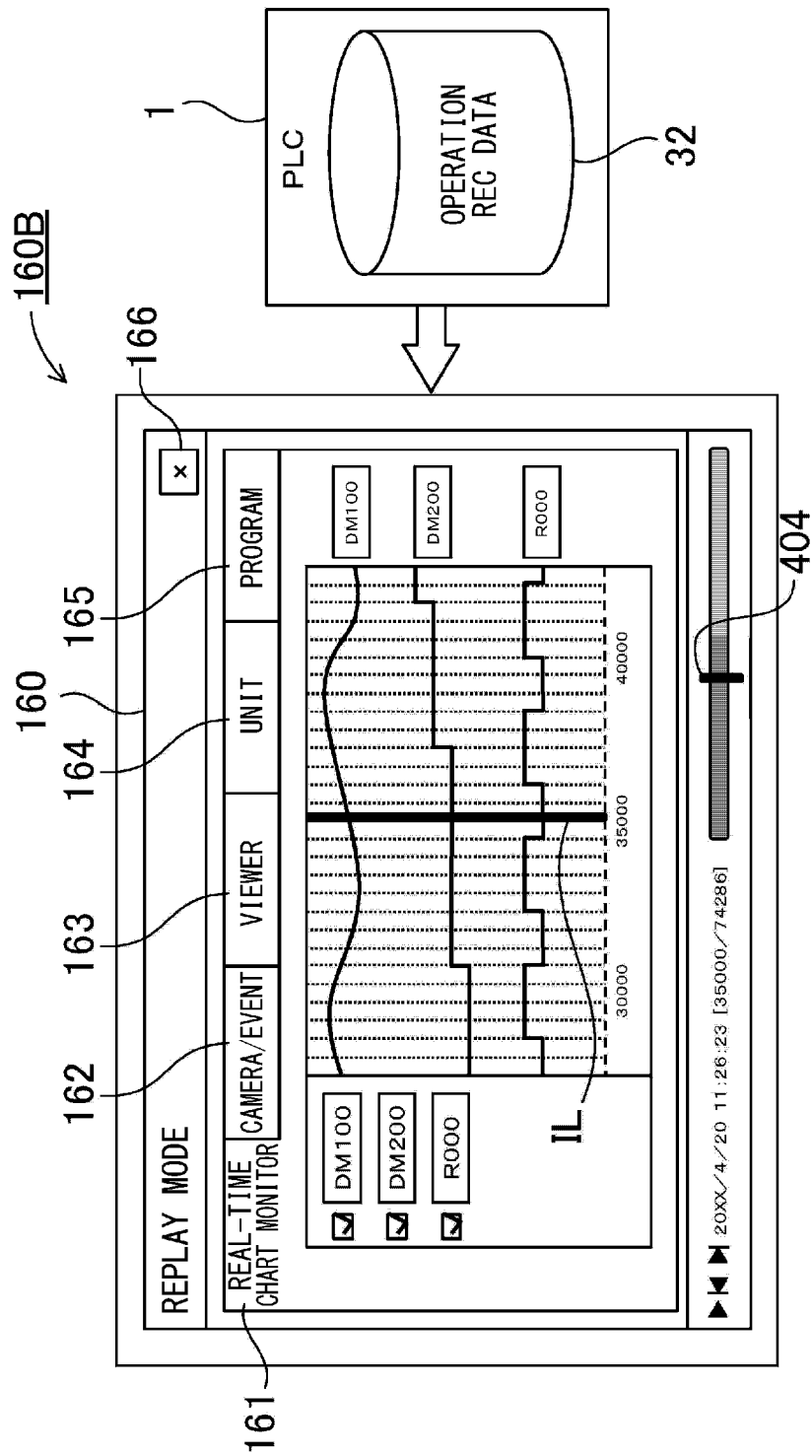
FIG. 12 is a schematic view showing a device wave display screen in a replay mode.

For example, in a device wave display screen 160 shown in FIG. 12, device waves of predetermined devices are displayed on the display screen. In the exemplary image of FIG. 12, devices DM100, DM200, and R000 are displayed in graph. On/off switching of the check boxes which are arranged on the left of the devices enables/disables the showing of their corresponding device waves.

According to this arrangement, page-switching operation which switches the screen from one page to another page, and device-wave showing operation which shows the device waves of chronological data that is saved in the PLC 1 can be selectively performed by such a touch operation on the programmable display 50. In this case, the device wave can be seen on the display screen of the programmable display 50, information useful to immediately eliminate troubles which occur on FA sites can be easily provided.

The device wave display screen 160 shown in FIG. 12 is one type of the system screen of the programmable display 50. If a touch operation on an "X" button (cross button) 166 at the upper right in FIG. 12 is detected, the display screen returns from the system screen to a normal monitoring screen (screen which is created by users in the screen data edition device 60). The device wave display screen 160 shown in FIG. 12 can be realized by superposing chronological data that is read from the operation record data on the system default screen (so-called default template) which is previously prepared by system designers of the programmable display 50. Data structure of system screen will be discussed in more detail later.

Although it has been described that the screen is switched from one page to another page by touching the page switching component (first touch operation), such a page-switcher is not limited to a component which is dedicated to page switching. Needless to say, the screen is switched from one page to another page by a predetermined touch operation such as flicking, for example. In this case, the predetermined operation which switches the screen from one page to another page is used as the first touch operation.

(Functional Block Diagram of Screen Data Edition Device 60)

The screen data edition device 60 is now described. The screen data edition device 60 shown in FIG. 11 includes a screen data edition input portion 63, a screen data edition display portion 65, a screen data edition portion 61, a screen data edition storage portion 62, and a screen data transmission portion 67.

The screen data edition input portion 63 is an input device such as mouse and keyboard. The user operates the screen data edition device 60 through the screen data edition input portion 63 to design a layout of components on a page or to assign devices to the components.

The screen data edition display portion 65 is a display or the like which is connected to the screen data edition device 60. The edited screen data can be seen on the screen data edition display portion 65.

The screen data edition portion 61 edits screen data including the component settings 52a, the page settings 52b, and the subject device settings 52c based on user's inputs through the screen data edition input portion 63. The edited screen data is displayed on the screen data edition display portion 65. The user can check the edited screen data on the screen data edition display portion 65.

The screen data edition storage portion 62 stores the screen data including the component settings 52a, the page settings 52b, and the subject device settings 52c.

The screen data transmission portion 67 reads the screen data that is edited by the screen data edition portion 61 from the screen data edition storage portion 62, and transmits the edited screen data to the programmable display 50.

(User Interface Screen of Screen Data Edition Device 60)

Figure 13:
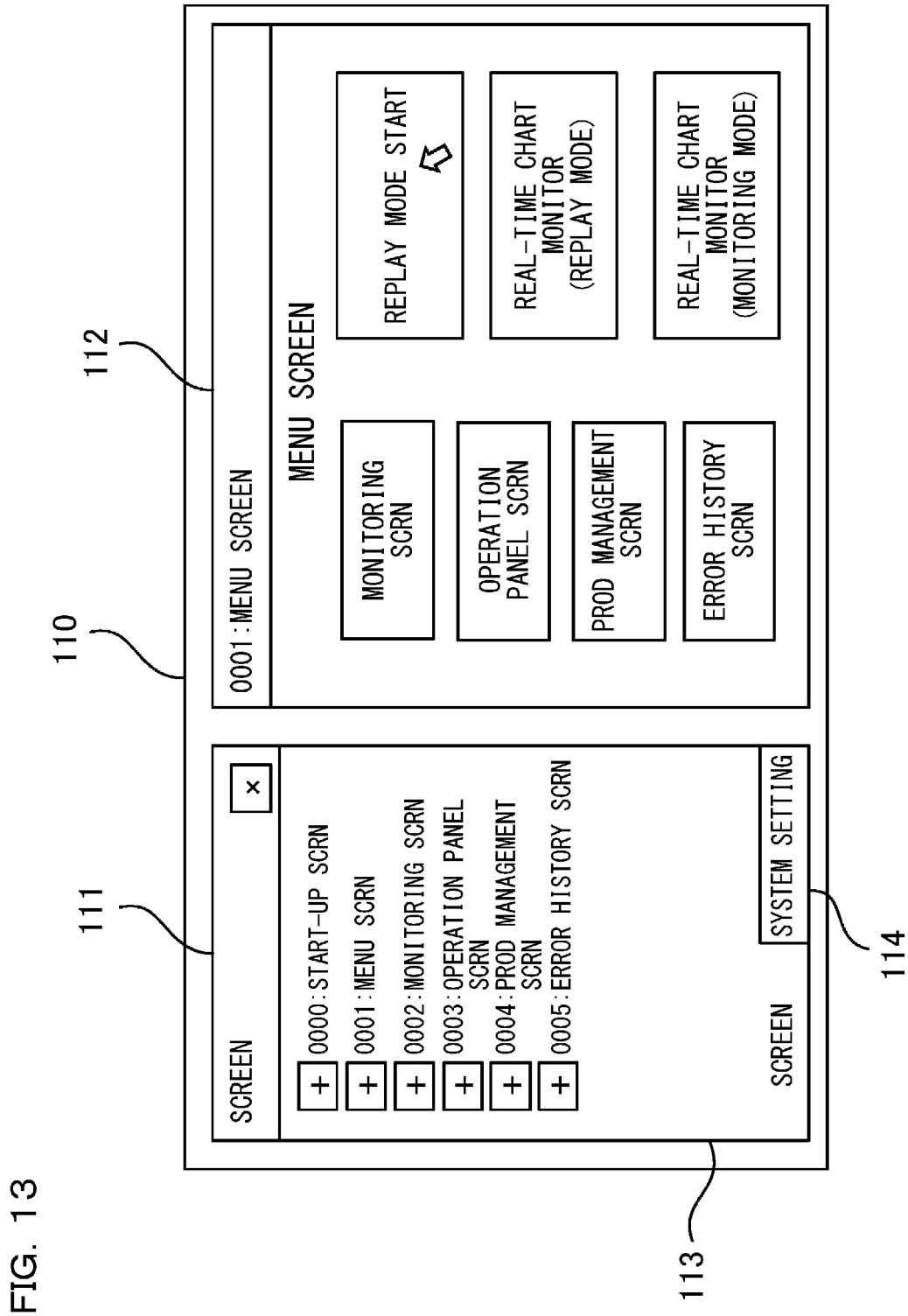
FIG. 13 is a schematic view showing a page-setting screen of a screen data edition device.

FIGS. 13 to 16 show exemplary user interface screens of the screen data edition device 60. FIG. 13 shows a page-setting screen 110 which can define a menu screen or the like. A user can create buttons which are arranged on a screen image (page) of the programmable display 50, and define functions of the button through the page-setting screen 110. A screen selection box 111 which shows screens that can be edited by users is arranged on the left area of the page-settings screen 110. A screen-display box 112 is arranged on the right area of the page-settings screen 110. The editable screens are listed together with their screen IDs as page identifiers in the screen selection box 111. A screen selected from the screen selection box 111 is displayed in the screen-display box 112. In FIG. 13, a menu screen (screen ID 0001) is selected. Also, a "screen" tab 113 and a "system setting" tab 114 are arranged in the lower area of the screen selection box 111. When the "system setting" tab 114 is selected, the display screen switched to a system setting screen 130 shown in FIG. 16. Display components such as switch to be arranged in the screen-display box 112 can be specified by the switch setting screen 120 shown in FIG. 14. When a user selects one of the switches is selected or right-clicks on one of the switches and then selects property in the screen-display box 112 of the page-settings screen 110 of FIG. 13, the display screen is switched to the switch setting screen 120 shown in FIG. 14.

Figure 14:
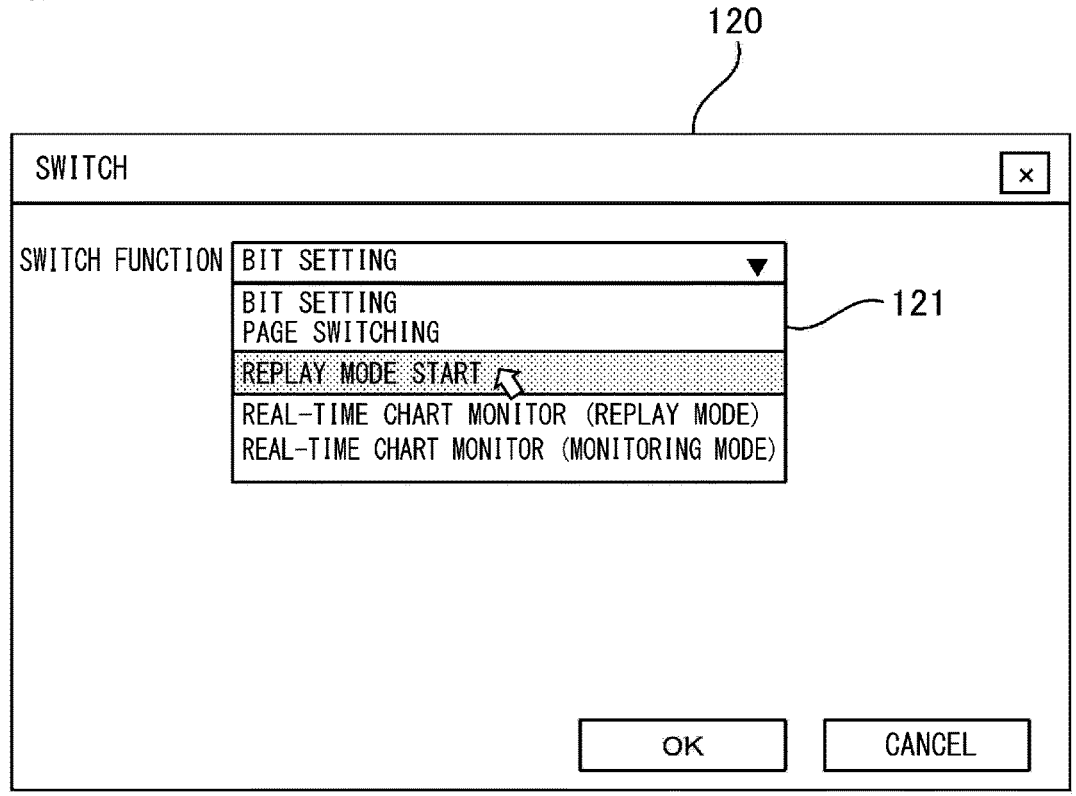
FIG. 14 is a schematic view showing a switch-setting screen of the screen data edition device.
Figure 15:
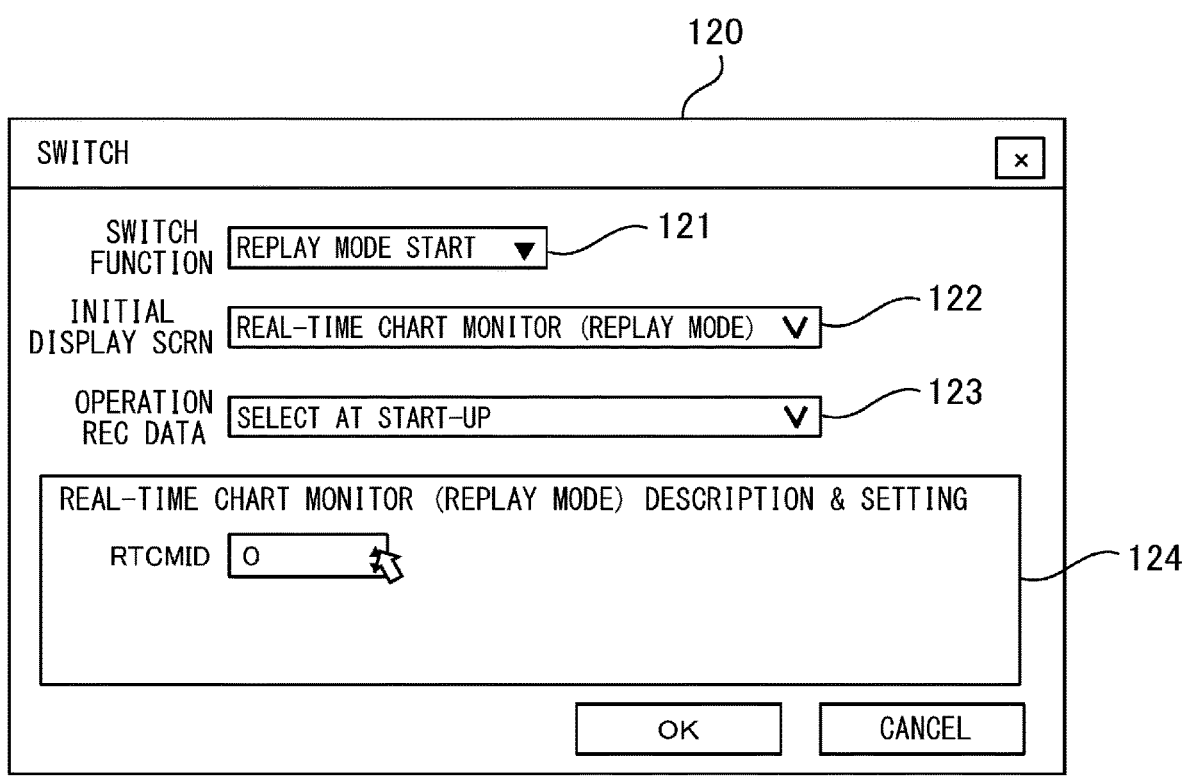
FIG. 15 is a schematic view showing the switch-setting screen of FIG. 14 when "replay mode start" is selected.

A switch function selection box 121 which can assign functions to a switch is provided in the switch setting screen 120 shown in FIG. 14. Examples of the assignable switch functions can be provided by "bit-setting", "page switching", "replay mode start", "real-time chart monitor (replay mode)", "real-time chart monitor (monitoring mode)", and the like. In the example shown in FIG. 14, one of the switch functions can be selected by a drop-down list in the switch function selection box 121. Accordingly, a user can select a desired switch function from a plurality of candidates which are shown in the drop down list. When one of the switch functions is selected in the switch function selection box 121, setting items of the selected switch function is shown on the switch setting screen 120 as shown in FIG. 15. In this example, the "replay mode start" is selected in the switch function selection box 121. Correspondingly, an initial display screen selection box 122, an operation-record-data selection box 123, and a real-time chart monitor (replay mode) description & setting box 124 are shown.

Figure 16:
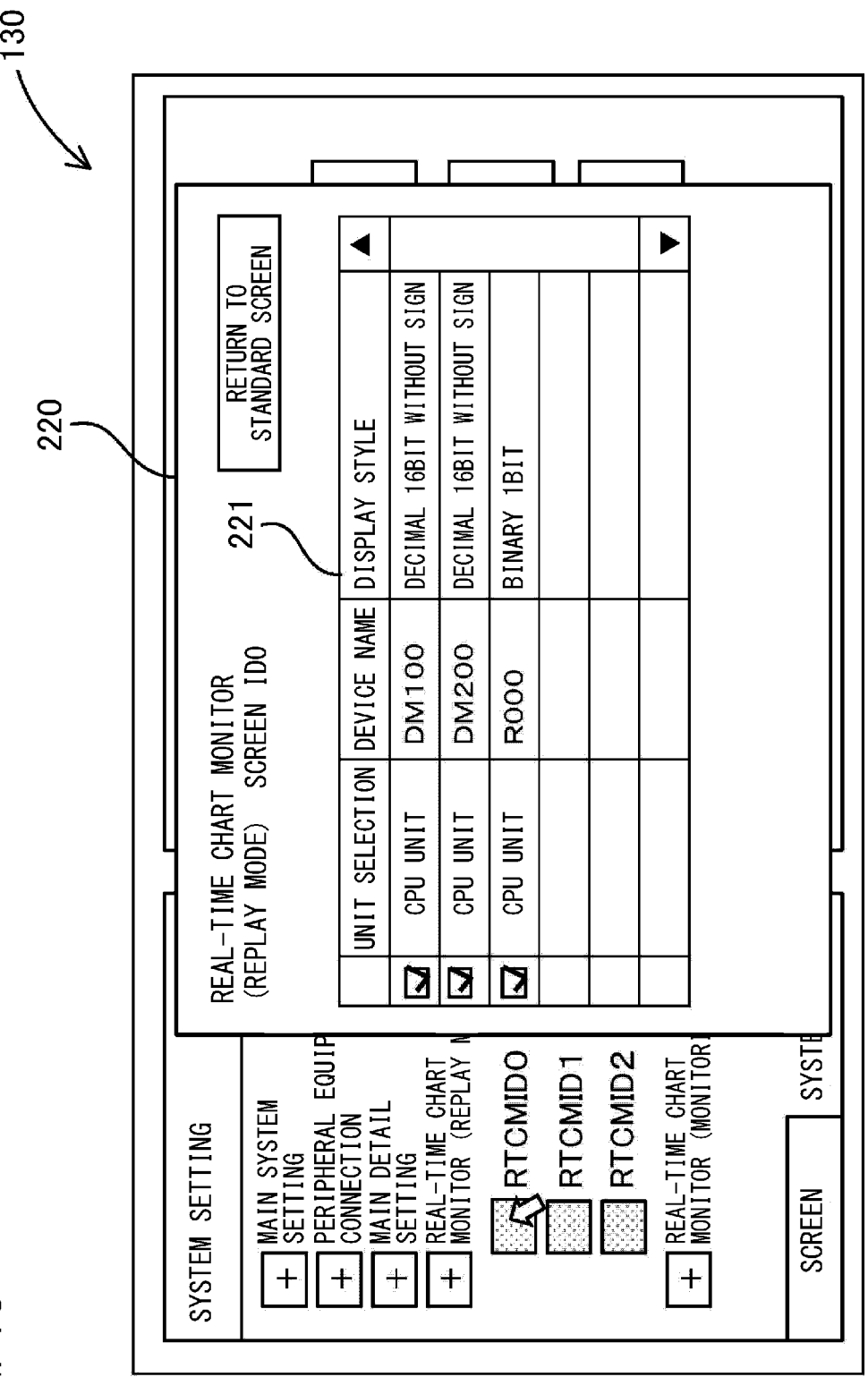
FIG. 16 is a schematic view showing a subject-device-setting screen of the screen data edition device.
Figure 17:
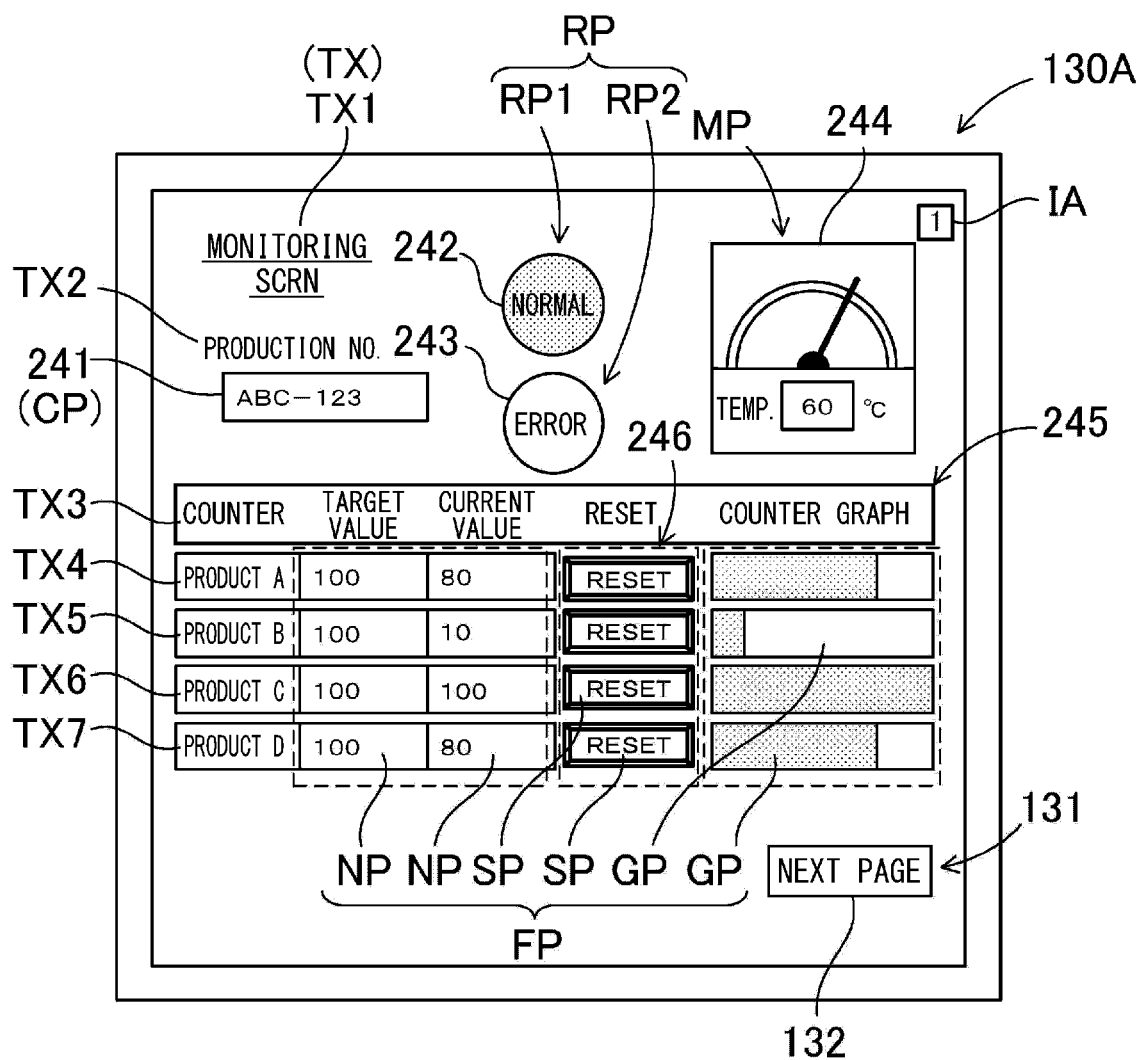
FIG. 17 is a schematic view showing an exemplary display screen in which page-switching components are arranged.
Figure 18:
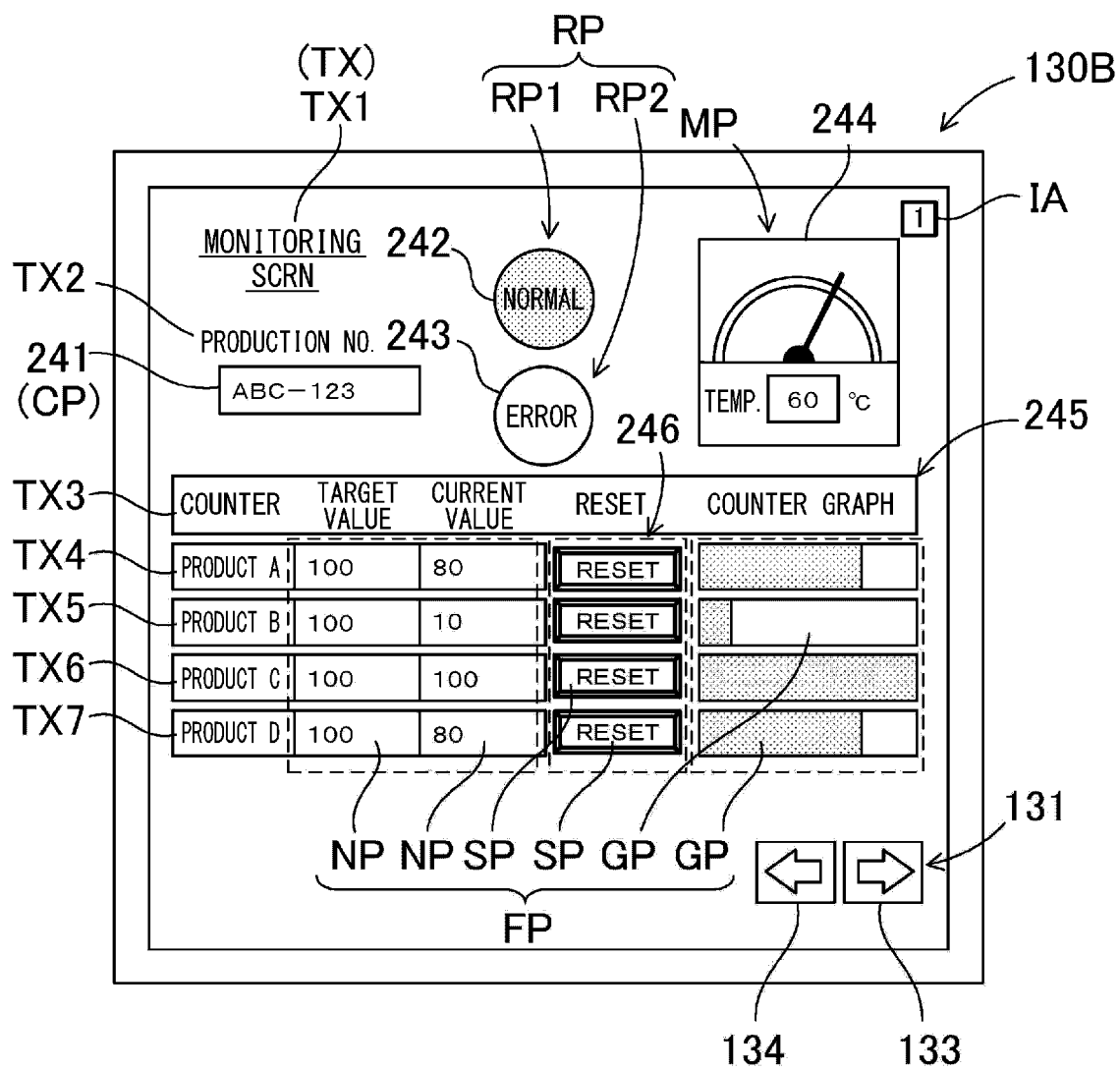
FIG. 18 is a schematic view showing another exemplary display screen in which page-switching components are arranged.
Figure 19:
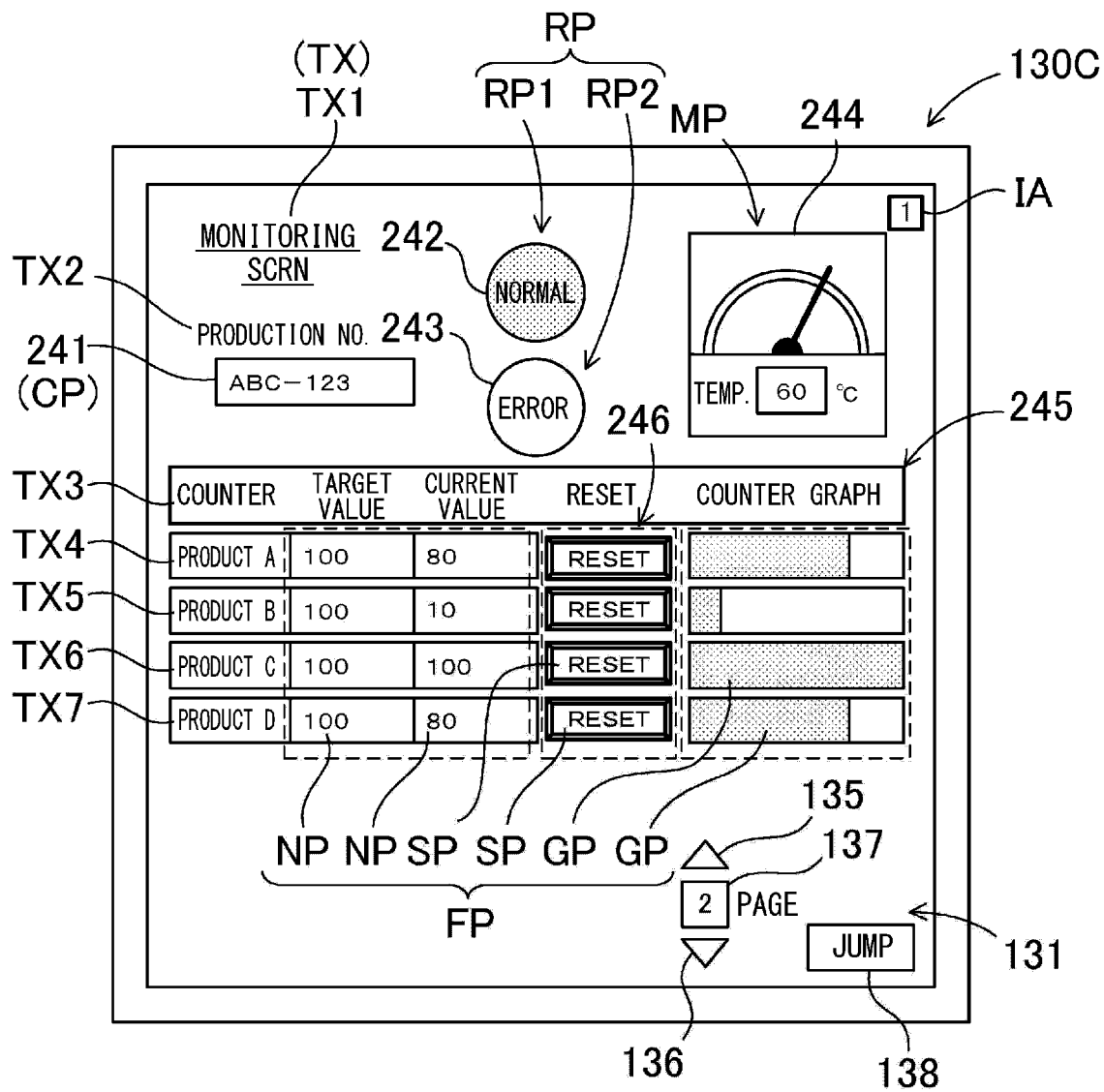
FIG. 19 is a schematic view showing another exemplary display screen in which page-switching components are arranged.
Figure 20:
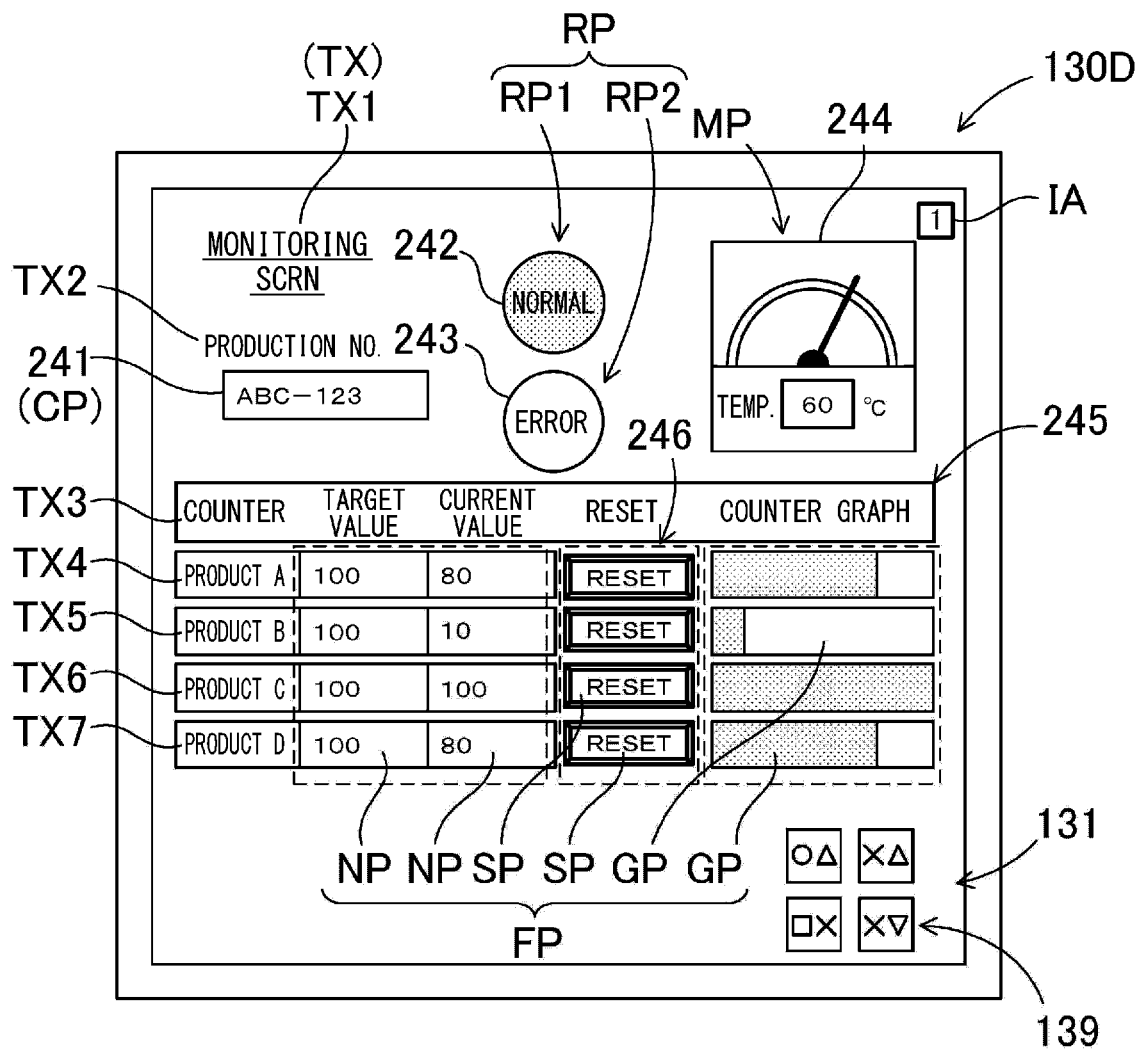
FIG. 20 is a schematic view showing another exemplary display screen in which page-switching components are arranged.

FIG. 16 shows the system setting screen 130. In this system setting screen 130, a subject device setting screen part 220 is shown which can specify subject devices as a device that has a device wave to be displayed in real-time chart monitor (in this example, replay mode). The details will be discussed later.

Screen data that is edited by the screen data edition device 60 is transmitted to the programmable display 50 through the screen data transmission portion 67. When the screen data receiver 57 receives the screen data, the programmable display 50 stores the received screen data into the setting storage 52.

(Component Settings 52a)

The component settings 52a which are saved in the setting storage 52 of the programmable display 50 shown in FIG. 11 includes at least any of settings of wave display components, settings of page switching components 131, real-time display components, and settings of replay display components.

(Wave Display Component)

The wave display components are display components which display the device wave on the screen. A user uses the screen data edition device 60 shown in FIG. 11 to define user screens through the screen data edition portion 61 by manipulating the screen data edition input portion 63. In this embodiment, a user screen to be defined is shown on the screen data edition display portion 65, and the user selects display components from wave display components, the page switching components 131, and the like which are held in the screen data edition storage portion 62 and arranges the selected wave display components, page switching components 131, and the like at desired positions on a page of the user screen. After the user screen is edited, the screen data is sent from the screen data transmission portion 67 to the screen data receiver 57 of the programmable display 50. The programmable display 50 acquires the information required for the screen display (for example, device values that are specified by the subject device settings 52c) from the PLC 1 through the display side communication portion 58 based on the received screen data, and generates display data in the display-data generation portion 51a of the display processor 51. An image is displayed on the display portion 55 based on the generated display data. When the touch detector 53 detects user's touch operation on a display component that is shown on the display screen of the display portion 55, its corresponding processing is performed by the display processor 51. For example, when a wave display component is touched, the device wave display screen 120 of FIG. 12 is displayed.

(Page Switching Component 131)

The page switching components 131 are a component which is arranged in a first page corresponding to a first page identifier to change the display screen from the first page to a second page corresponding to a second page identifier that is different from the first page identifier.

FIGS. 17 to 20 show exemplary user screens which include one or more page switching components 131. In the exemplary user screen 130A shown in FIG. 17, the page switching component 131 is a button 132 indicated as "next page". When a user touches this "next page" button 132 shown on the display screen, the display screen can be turned to a specified page (for example, the next page corresponding to a page number which increments the currently displayed page number). In the exemplary user screen 130B shown in FIG. 18, two buttons (rightward and leftward arrows) 133 and 134 are arranged as page switching components 131. When a user touches the rightward arrow button 133, the display screen can be turned to a next page corresponding to a page number which increments the currently displayed page number. When a user touches the leftward arrow button 134, the display screen can be turned to a previous page corresponding to a page number which decrements the currently displayed page number. In the exemplary user screen 130C shown in FIG. 19, triangle and inverted triangle buttons 135 and 136, and a page number indicator box 137 are arranged as page switching components 131. When a user touches the triangle button 135, the display screen can be turned to a next page corresponding to a page number which increments the page number that is currently shown in the page number indicator box 137. When a user touches the inverted triangle button 136, the display screen can be turned to a previous page corresponding to a page number which decrements the page number that is currently shown in the page number indicator box 137. The page turning can be done at the timing of touch operation on the triangle or inverted triangle buttons 135 or 136 which increments or decrements the current page number. Alternatively, a "jump" button 138 can be additionally arranged. After a desired page number is indicated in the page number indicator box 137 by touching the triangle or inverted triangle buttons 135 or 136, the page turning can be done at the timing of touch operation on the "jump" button 138. In the exemplary user screen 130D shown in FIG. 20, thumbnail icons 139 corresponding to all pages are shown as page switching components 131. When a user touches desired one of the thumbnail icons 139, the display screen can be turned to a page corresponding to a page number corresponding to the touched icon.

(User Interface Screen of Programmable Display 50)

Figure 21:
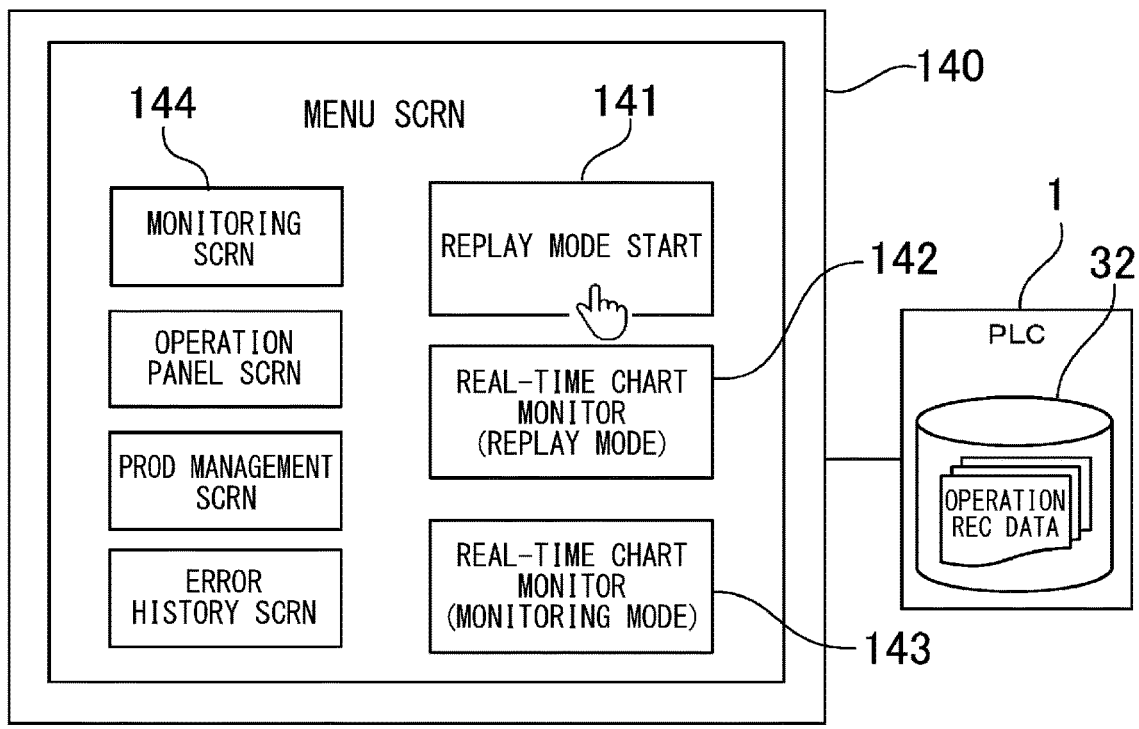
FIG. 21 is a schematic view showing a menu screen of the programmable display.
Figure 22:
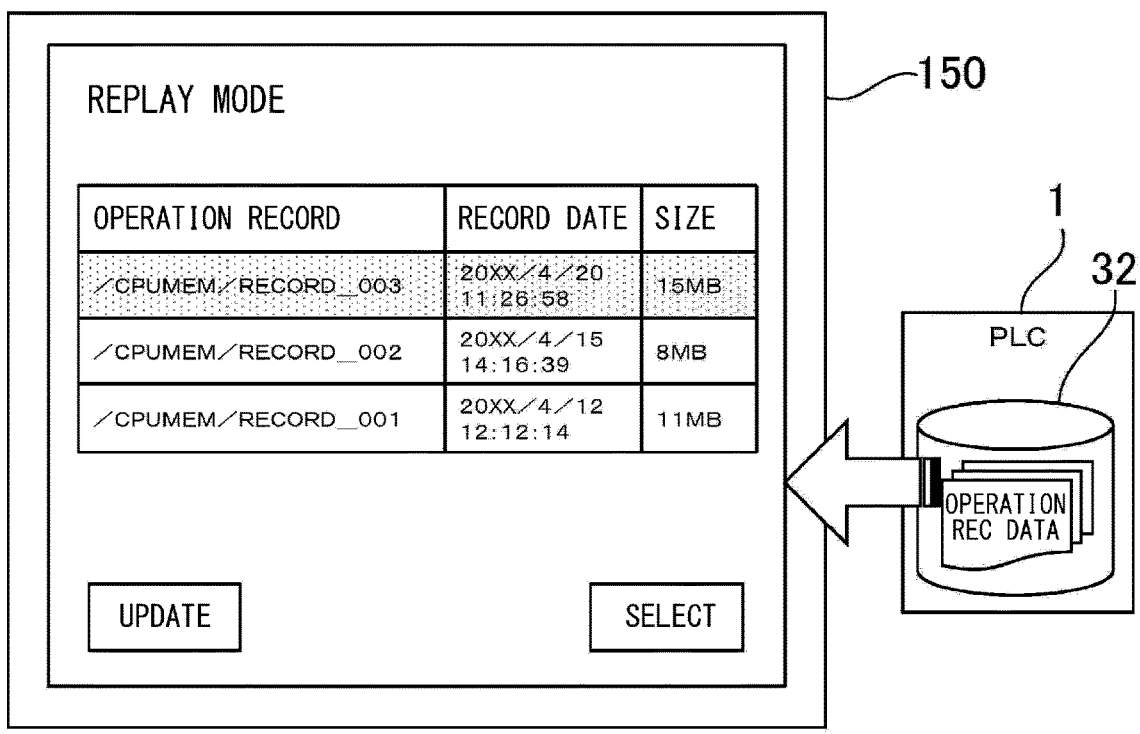
FIG. 22 is a schematic view showing an initial screen in the replay mode.
Figure 23:
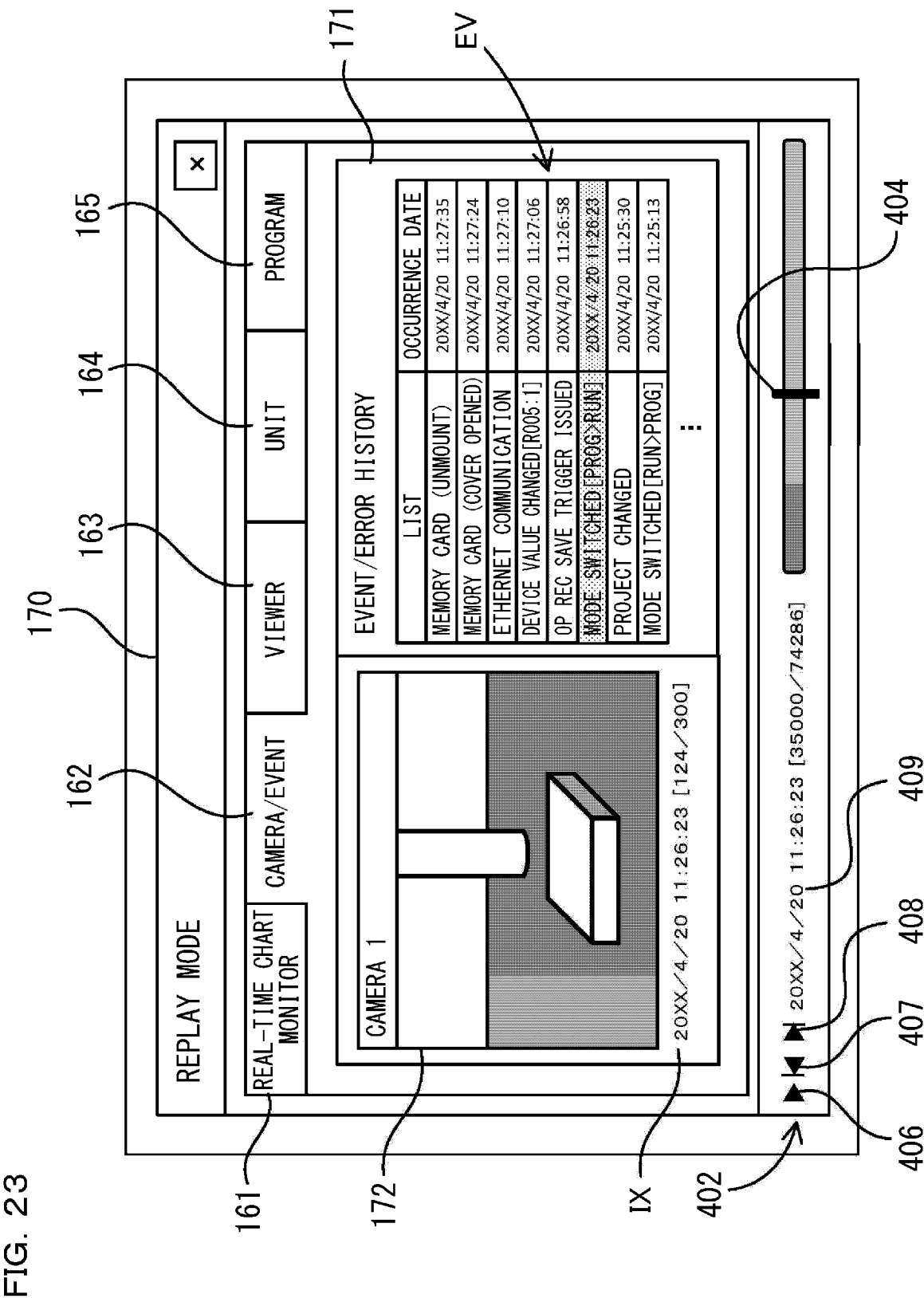
FIG. 23 is a schematic view showing the replay mode screen when a camera/event display screen is selected.
Figure 24:
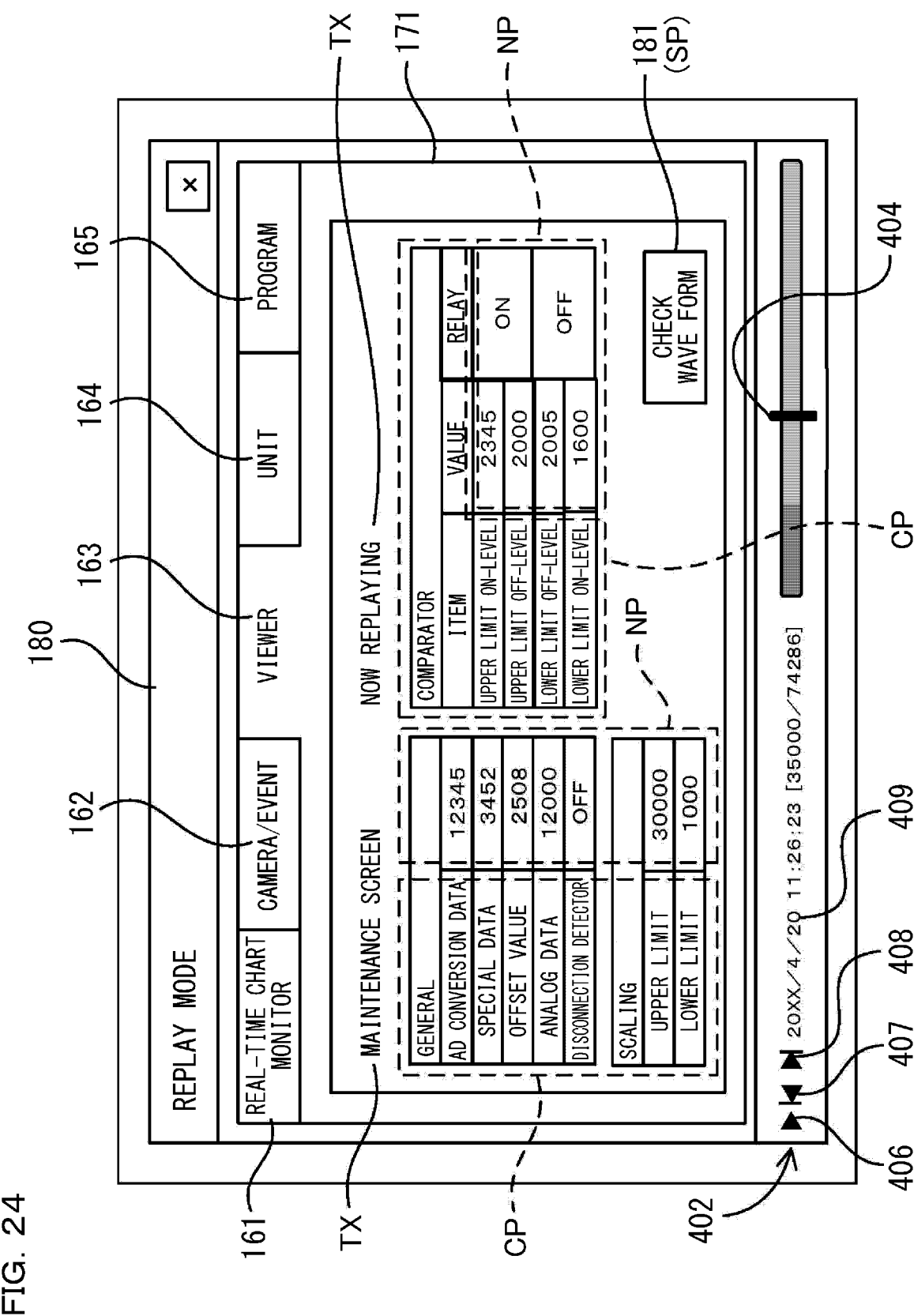
FIG. 24 is a schematic view showing the replay mode screen when a viewer display screen is selected.
Figure 25:
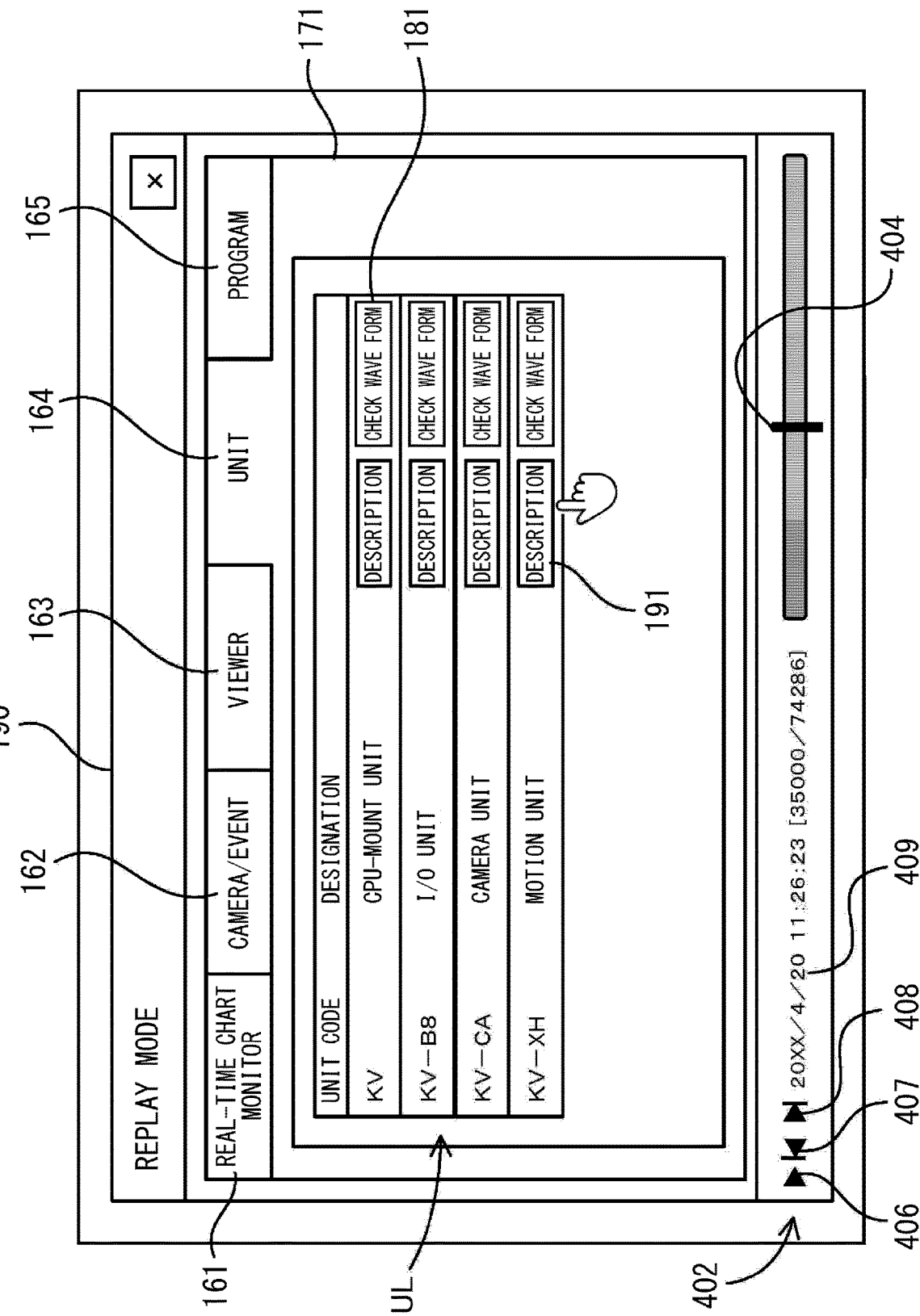
FIG. 25 is a schematic view showing the replay mode screen when a unit display screen is selected.
Figure 26:
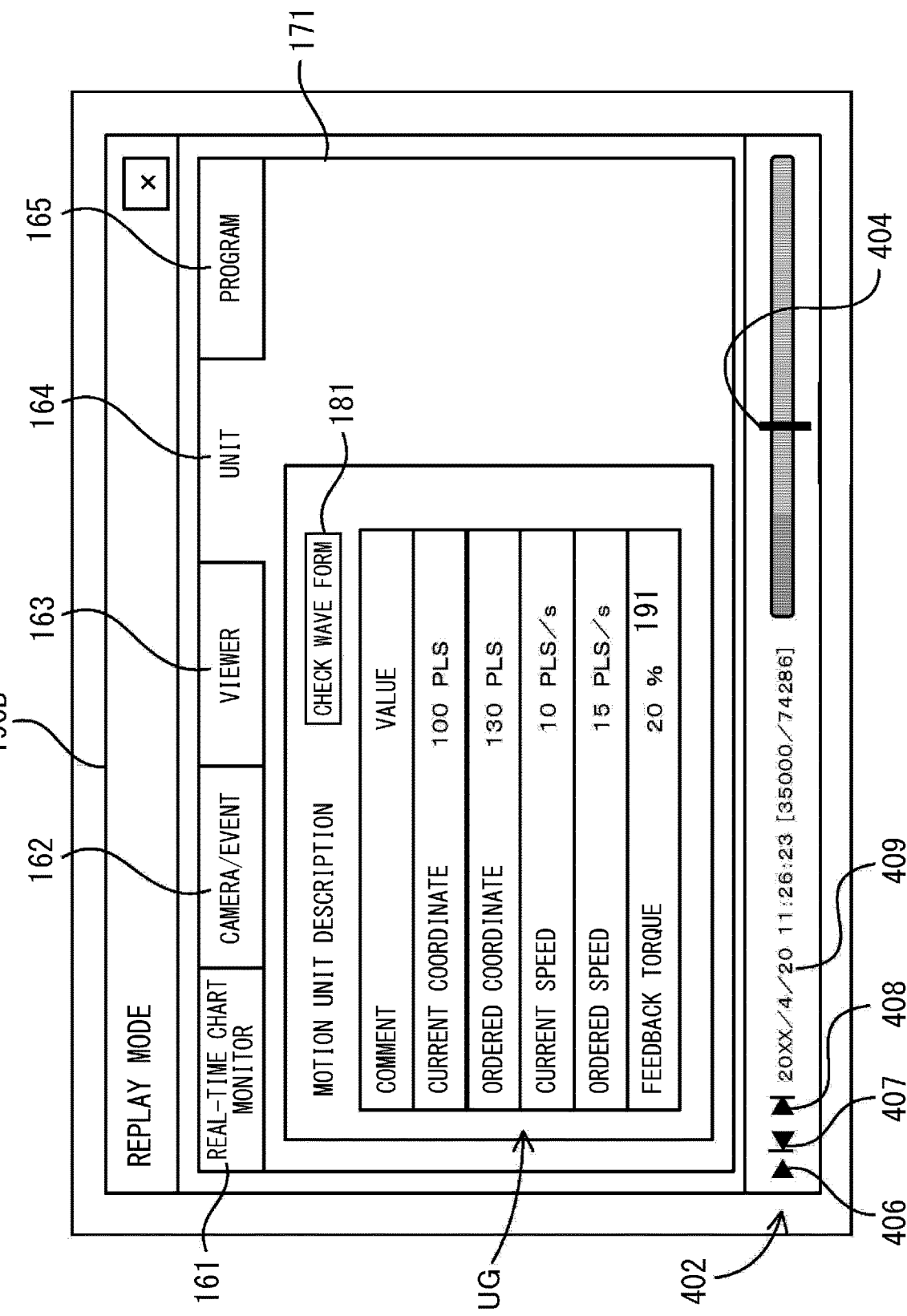
FIG. 26 is a schematic view showing the replay mode screen when the unit display screen is selected.
Figure 27:
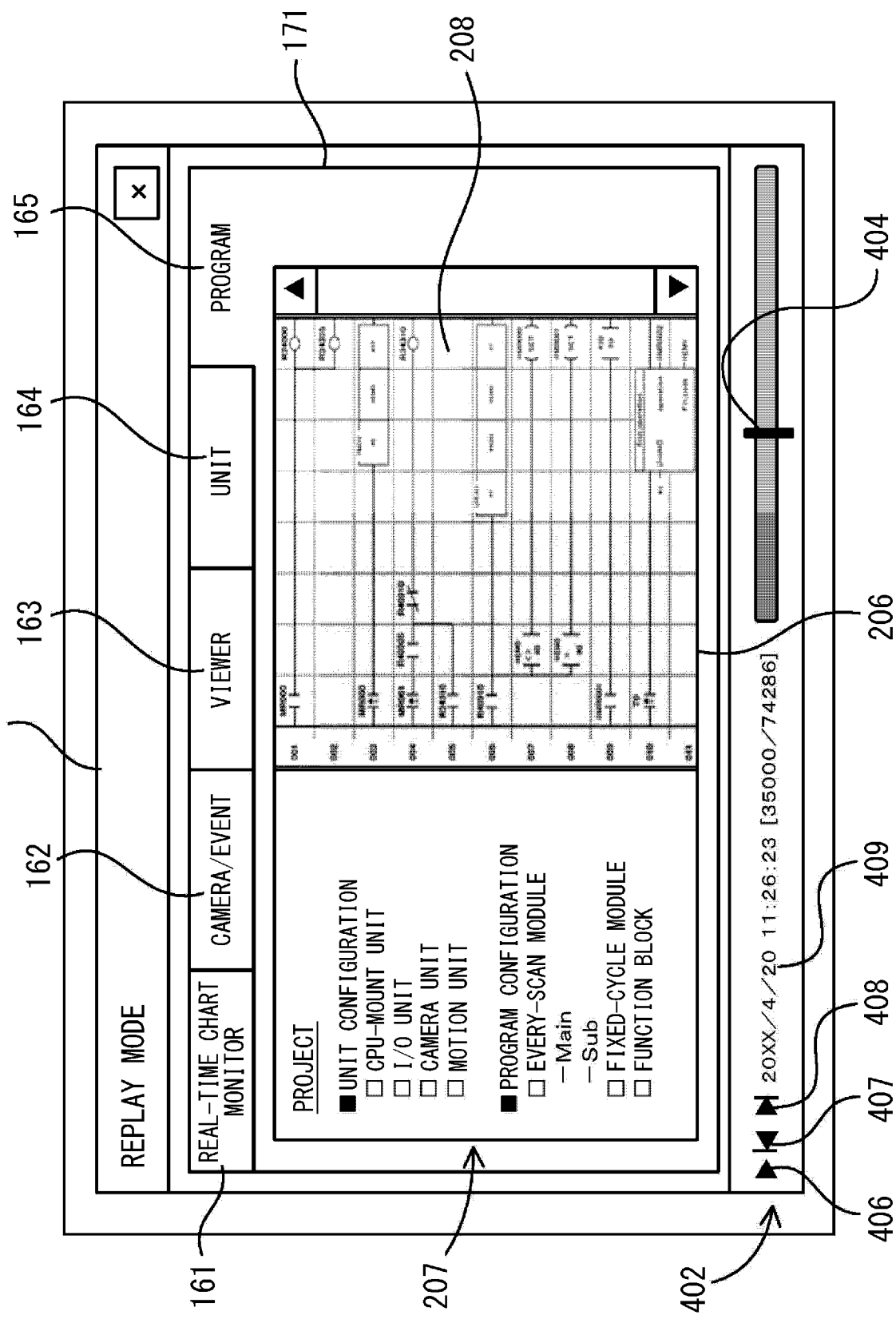
FIG. 27 is a schematic view showing the replay mode screen when a program screen is selected.

FIGS. 12, and 21 to 27 exemplary user interface screens of the programmable display 50. FIG. 21 shows a menu screen 140 of the programmable display 50. FIG. 22 shows an initial screen 150 in the replay mode which is displayed when a user touches a "replay mode start" button 141 in the menu screen 140 of FIG. 21. FIG. 12 shows the device wave display screen 160 which is displayed when a "real-time chart monitor" tab 161 is selected in the replay mode. FIG. 23 shows a camera/event display screen 170 which is displayed when a user selects a "camera/event" tab 162. FIG. 24 shows a viewer display screen 180 which is displayed when a user selects a "viewer" tab 163. FIG. 25 shows a unit display screen 190 which is displayed when a user selects a "unit" tab 164. FIG. 26 shows a unit display screen 190B which is displayed when a user touches a "description" button 191 in the unit display screen 190 of FIG. 25. FIG. 27 shows a program display screen 200 which is displayed when a user selects a "program" tab 165. A user screen such as "maintenance screen" which is displayed when a user touches the "viewer" tab 163 shown in FIG. 24 is edited by users using the programming device 70.

The camera/event display screen 170 shown in FIG. 23 is an example of system screens in this embodiment. The camera/event display screen 170 can be displayed by superposing a camera image that is read from operation record data or an event that is associated with its occurrence time on the system default screen similarly to the aforementioned device wave display screen 160. The camera/event display screen 170 includes a camera image display box 172 in the left side of the screen. In an event/error history box 171, events that are included in operation record data are listed together with their details and occurrence time. In the example of FIG. 23, a row of "mode switching (PROG>RUN)" is highlighted in a group EV of events which are listed in the event/error history box 171. The highlight shows that the system focuses attention on the time when the event of "mode switching (PROG>RUN)" occurred.

In this case, a camera image that is captured at time closest to the time when this event occurred is selected for the camera image that is shown in the camera image display box 172 in the left side from operation record data. Picture information IX including the date and time of capture of the shown camera image, a serial number of the shown camera image in the total number of captured camera images, and the like is shown under the camera image display box 172.

In addition, "20XX/4/20 11:26:23" is indicated in a time stamp area 409. This time corresponds to the event occurrence of the aforementioned "mode switching (PROG>RUN)". That is, in the event/error history box 171, the occurrence time of the event which is selected by user's touch operation is indicated in the time stamp area 409.

When a user touches and selects another event different from "mode switching (PROG>RUN)" in the event/error history box 171, the selected event is highlighted. Correspondingly, the occurrence time of the selected event will be indicated in the time stamp area 409. In addition, the camera image that has been shown in the camera image display box 172 will be changed. Specifically, the camera image will be changed to a camera image that is captured at time closest to the time when the selected event occurred.

A movable time designation cursor 404 which can slide in the horizontal direction is shown on the right of the time stamp area 409. This time designation cursor 404 represents "20XX/4/20 11:26:23" shown in the time stamp area 409. If a user moves the time designation cursor 404 rightward or leftward, the camera image will be changed in accordance with the movement of the cursor 44, and the highlighted part in the event/error history box 171 will be correspondingly changed (correlational display).

Change of camera image, change of highlighted event, and the position of time designation cursor correlate to (are synchronized with) each other. Users can change correlation-base time by sliding the time designation cursor 404 rightward or leftward, or by touching one of the events shown in the event/error history box 171. The correlational display (correlation between change of camera image, change of highlighted event, and the position of time designation cursor) is controlled based on the correlation-base time. The details of correlational display will be discussed later.

The viewer display screen 180 shown in FIG. 24 is an example of system screens in this embodiment. The viewer display screen 180 can be displayed by superposing device values that are read from operation record data on the system default screen similarly to the aforementioned device wave display screen 160. In the viewer display screen 180, the "maintenance screen" which is edited by users in the screen data edition device 60 is incorporated into the system default screen. As discussed in detail with reference to FIG. 2, text components TX such as "maintenance screen" and "now replaying" are arranged in the maintenance screen. In addition, character display components CP such as "general", "AD conversion data", "special data", "offset value", "analog data", "disconnection detector", "scaling", "upper limit", "lower limit", "comparator", "item", "value", "relay", "upper limit on-level", "upper limit off-level", "lower limit off-level", and "lower limit on-level" are arranged. Numerical display components NP (12345, 3452, etc.) or other character display components CP (ON and OFF) are arranged at positions corresponding to some of the aforementioned character display components CP.

Also, the position of the time designation cursor 404 and device values that are indicated by the numerical display components NP correlate to each other in the viewer display screen 180 shown in FIG. 24. That is, numeric values of the numerical display components NP or characters of character display component CP can be changed by sliding the time designation cursor 404 rightward or leftward. For example, in the example of FIG. 24, because "20XX/4/20 11:26:23" is indicated in the time stamp area 409, the numerical display components NP and the character display component CP show the device values at "20XX/4/20 11:26:23."

The viewer display screen 180 shown in FIG. 24 correlates to (is synchronized with) the aforementioned camera/event display screen 170 shown in FIG. 23. As discussed above, "20XX/4/20 11:26:23" is indicated in the time stamp area 409 of the camera/event display screen 170 shown in FIG. 23. In this case, when a user touches the "viewer" tab 163, the viewer display screen 180 (FIG. 24) will be displayed in which "20XX/4/20 11:26:23" is indicated in the time stamp area 409, and device values corresponding to this time are shown in the numerical display components NP and the character display components CP.

A "wave check" button 181 in FIG. 24 is a so-called switch component SP. When a user touches the "wave check" button 181, the real-time chart monitor (replay mode) of a device that has been used in the "maintenance screen" shown in FIG. 24 will be displayed.

The unit display screen 190 shown in FIG. 25 is an example of the system screen in this embodiment, and is displayed by superposing a unit configuration that is read from the operation record data on the system default screen similarly to the aforementioned device wave display screen 160. The "description" buttons 191 and the "wave check" buttons 181 are previously incorporated into the system default screen (not edited by users), and are shown depending on the number of unit configurations. In the example of FIG. 25, it is assumed that the four units "CPU-mounted unit", "I/O unit", "camera unit", and "motion unit" are included as unit configurations UL that are included in operation record data. Correspondingly, four sets of the "description" button 191 and "wave check" buttons 181 are shown. For example, if a user touches one of the "description" buttons 191 corresponding to the "motion unit", the unit display screen shown in FIG. 26 will be displayed.

The unit display screen 190B shown in FIG. 26 is an example of system screens in this embodiment. The unit display screen 190B can be displayed by superposing buffer memories (UG) as devices in the motion unit that are read from operation record data and their device values on the system default screen similarly to the aforementioned device wave display screen 160. In the example of FIG. 26, "current coordinate", "ordered coordinate", "current speed", "ordered speed", and "feedback torque" are shown as examples of UG, and their device values are indicated on the right of the UGs.

In addition, "20XX/4/20 11:26:23" is indicated in the time stamp area 409 in FIG. 26. This time is the same as FIGS. 23 to 25. That is, time that is indicated in the unit display screen 190B shown in FIG. 26 also correlates to (synchronized with) time that is indicated in the aforementioned camera/event display screen 170 shown in FIG. 23 and the viewer display screen 180 shown in FIG. 24. If a user slides the time designation cursor 404 in FIG. 26 rightward or leftward, time is specified by the position of the time designation cursor 404 after slid so that device values corresponding to the specified time are indicated. In other words, device values corresponding to the position of the time designation cursor 404 will be read from operation record data and indicated in accordance with the slider operation of the time designation cursor 404.

When a user touches the "wave check" button 181 shown in FIG. 26, the real-time chart monitor (replay mode) of a device that has been used in the unit display screen 190B shown in FIG. 26 will be displayed.

The program display screen 200 shown in FIG. 27 is an example of the system screen in this embodiment, and is displayed by superposing a unit configuration and a ladder program that are read from the operation record data on the system default screen similarly to the aforementioned device wave display screen 160. In the example of FIG. 27, the unit configuration display box 207 and the ladder program display box 208 are arranged in the left and right sides of the screen, respectively.

In addition, "20XX/4/20 11:26:23" is indicated in the time stamp area 409 in FIG. 26. This time is the same as FIGS. 23 to 26. That is, time that is indicated in the program display screen 200 shown in FIG. 27 also correlates to (synchronized with) time that is indicated in the aforementioned camera/event display screen 170 shown in FIG. 23, the viewer display screen 180 shown in FIG. 24, and the unit display screens 190 and 190B shown in FIGS. 25 and 26. If a user slides the time designation cursor 404 shown in FIG. 27 rightward or leftward, time is specified by the position of the time designation cursor 404 after slid so that device values corresponding to the specified time are superposed on the ladder program shown in the ladder program display box 208. In other words, device values corresponding to the position of the time designation cursor 404 will be read from operation record data and superposed on the ladder program in accordance with the slider operation of the time designation cursor 404.

(Processing of Programmable Display 50)

Processing of the programmable display 50 which displays device waves in the replay mode of FIG. 12 is now described with reference to a flowchart of FIG. 28A. In Step S2801, user's touch operation is first accepted. Subsequently, in Step S2802, it is determined whether this touch operation is done on a wave display component. If the touch operation is not done on a wave display component, the procedure goes to Step S2803 in which it is determined whether the touch operation is done on a switch component. If the touch operation is not done on any component, the procedure ends without any processing. In Step S2803, if the touch operation is done on other component, the procedure goes to Step S2804 in which a function corresponding to the touched component is performed and the procedure then ends.

In Step S2802, if the touch operation is done on a wave display component, the procedure goes to S2806 in which selection of operation record data is accepted. In this step, users are urged to select a wave form to be displayed from operation record data. When a wave form to be displayed is selected from operation record data, a corresponding part of operation record data is read in Step S2807. More specifically, the display-data generation portion 51a of the programmable display 50 acquires a corresponding part of operation record data from the operation record data that is stored in the save memory of the PLC 1 or the operation record data that is previously saved in the data memory 56 of the programmable display 50.

Subsequently, in Step S2808, a subject device that has a device wave to be displayed is specified. In Step S2809, corresponding display data is generated in the display-data generation portion 51a. Finally, in Step S2810, the device wave is displayed on the display portion 55, and the procedure ends.

(Function Corresponding to Touched Component)

Figure 28A:
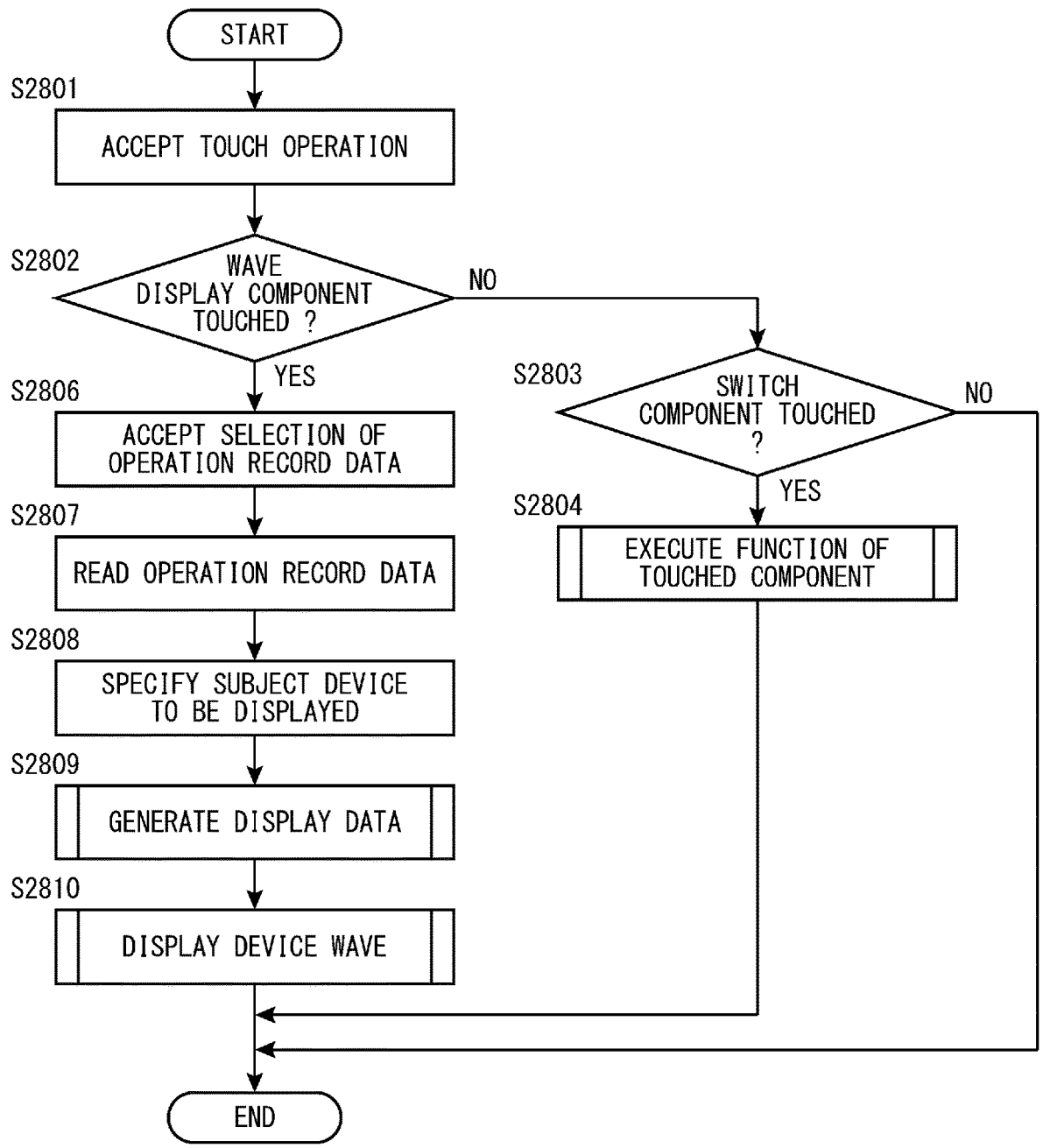
FIG. 28A is a flowchart showing processing of the programmable display.

The details of Step S2804 shown in FIG. 28A are now described with reference to a flowchart of FIG. 28B. The "function corresponding to touched component" will be performed in Step S2803 of FIG. 28A, if a user touches a switch component. Functions of switch components can be classified into two types. One type is the bit-setting function as discussed above with reference to FIG. 2. Another type is page switching function. Particular devices are assigned to switch components that have the bit-setting function. Particular pages (screen IDs) are assigned to switch components that have the page switching function. For example, the RESET switches 246 shown in FIG. 2 have the bit-setting function, and particular devices are assigned to the RESET switches 246. The page switching component 131 shown in FIG. 17 has the page switching function. A page number (screen ID) of switch destination (jump destination) is assigned to the page switching component 131.

Figure 28B:
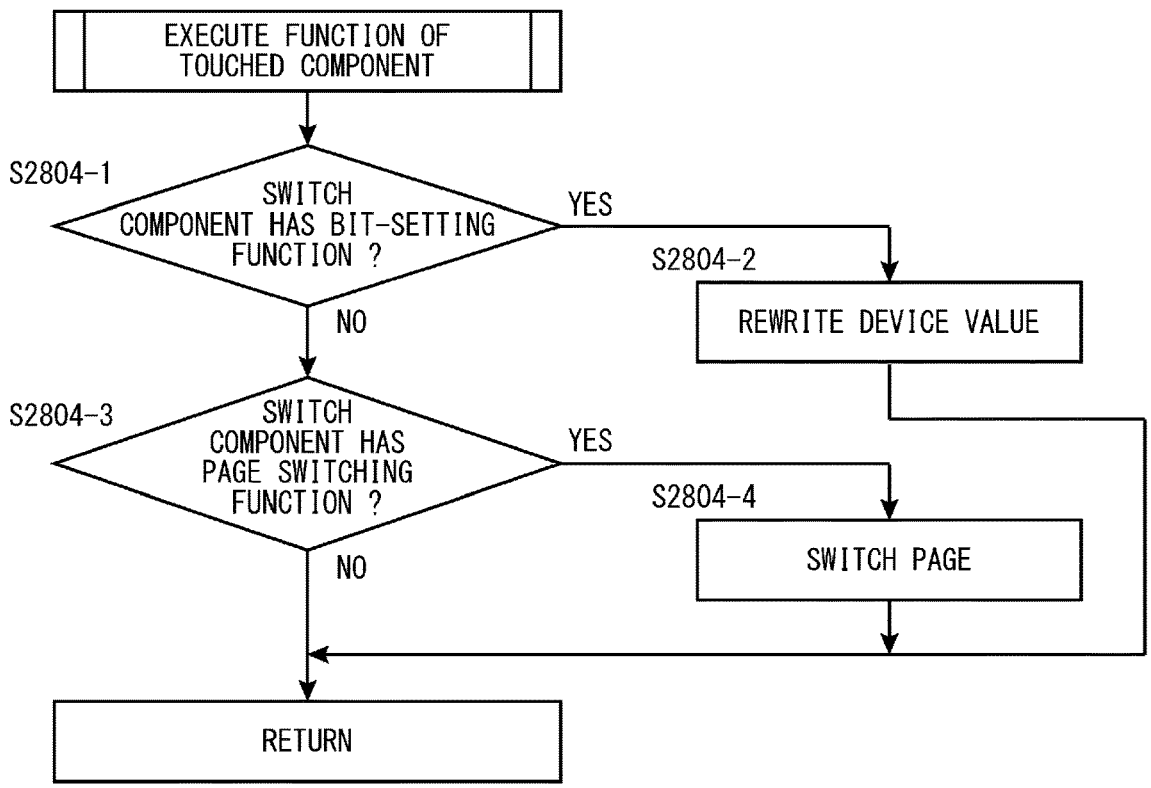
FIG. 28B is a flowchart specifically showing Step S2804 in the flowchart shown FIG. 28A.
Figure 28C:
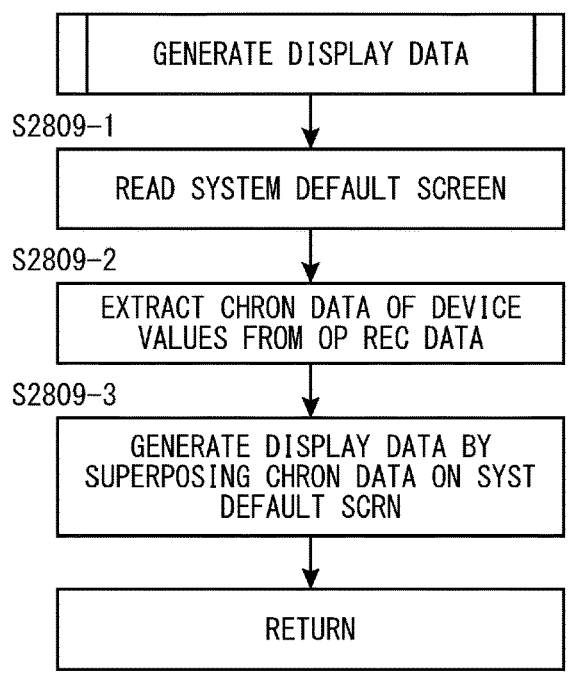
FIG. 28C is a flowchart specifically showing Step S2809 in the flowchart shown FIG. 28A.

In FIG. 28B, it is first determined whether the switch component has the bit-setting function in Step S2804-1. If the switch component has the bit-setting function, the procedure goes to Step S2804-2 in which the device value of the device assigned to the switch component is rewritten in accordance with the touch operation (changed from 1 to 0 or the like). If the switch component does not have the bit-setting function, the procedure goes to Step S2804-3 in which it is determined whether the switch component has the page switching function. If the switch component has the page switching function, the procedure goes to Step S2804-4 in which the page is switched to the page number (screen ID) assigned to the switch component. If the switch component does not have the page switching function, the procedure returns to the flowchart of FIG. 28A (the procedure ends).

(Display-Data Generation)

The details of Step S2809 shown in FIG. 28 are now described with reference to a flowchart of FIG. 28C. Display data is generated in the flowchart of FIG. 28C. The system default screen information 52f for displaying the system default screen is first read in Step S2809-1. The system default screen information 52f is created by system designers of the programmable display 50, and is stored in the setting storage 52 shown in FIG. 11. The display-data generation portion 51a of the programmable display 50 reads the system default screen information 52f from the setting storage 52.

Subsequently, in S2809-2, chronological data of device values is extracted from the operation record data. More specifically, the display-data generation portion 51a of the programmable display 50 extracts chronological data of device values of a device that is specified by Step S2808 from the operation record data that is acquired in Step S2807. Based on the read system default screen information 52f and the extracted chronological data of device values, the display-data generation portion 51a generates display data that is created by superposing the chronological data on the system default screen in S2809-3.

(Device Wave Display)

Figure 28D:
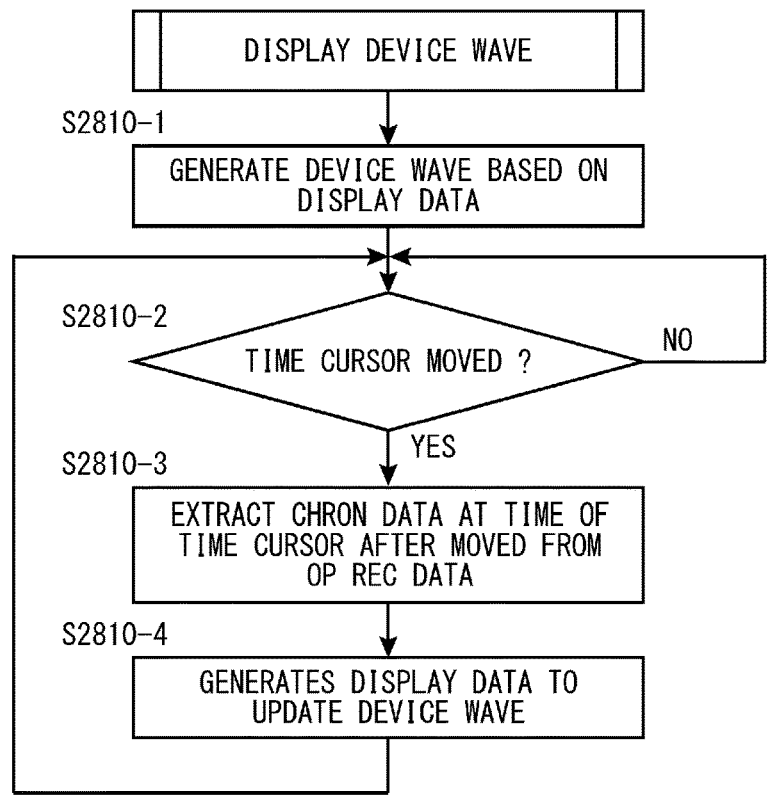
FIG. 28D is a flowchart specifically showing Step S2810 in the flowchart shown FIG. 28A.

The details of Step S2810 shown in FIG. 28A are now described with reference to a flowchart of FIG. 28D. FIG. 28D shows the flow for displaying the device wave. In Step S2810-1, the display processor 51 first displays the device wave based on the display data that is generated by the display-data generation portion 51a in Step S2809.

Subsequently, in Step S2810-2, the display processor 51 determines whether the time designation cursor 404 is moved during the device wave display. If the time designation cursor 404 is not moved, Step S2810-2 is repeated without any processing.

If the time designation cursor 404 is moved, the procedure goes to Step S2810-3 in which the display-data generation portion 51a of the display processor 51 extracts the chronological data corresponding to the time that is defined by the time designation cursor 404 after the movement from the operation record data. The extraction range of chronological data can be a time range that can be displayed in the device wave and centers the time that is defined by the time designation cursor after the movement, for example. In Step S2810-4, the display-data generation portion 51a generates display data based on the extracted chronological data, and updates the device wave.

In the example of FIG. 12, the time designation cursor 404 points time "20XX/4/20 11:26:23" (scan serial number 35000). The case in which a user slides the time designation cursor 404 rightward (the time designation cursor goes forward in time) is now discussed. For example, a user slides the time designation cursor 404 from scan serial number 35000 to scan serial number 40000. In this case, the display-data generation portion 51a of the display processor 51 extracts chronological data corresponding to a predetermined range centering the scan serial number 40000 (from the scan serial number 40000 minus a predetermined scan serial number to the scan serial number 40000 plus the predetermined scan serial number) from the operation record data. The display-data generation portion 51a generates display data that includes an identifying line IL of the scan serial number 40000 based on the extracted chronological data, and updates the device wave.

If a user touches a one-step forward reproduction button 408, the display-data generation portion 51a of the display processor 51 extracts chronological data corresponding to a predetermined range centering a scan serial number that is specified by this touch operation. The display-data generation portion 51a then generates display data based on the extracted chronological data, and updates the device wave. Also, if a user touches a reproduction button 406, the display-data generation portion 51a sequentially extracts chronological data from the operation record data, and sequentially updates the corresponding device wave (scrolls the device wave sideway).

The processing in FIG. 28D has been described in the case in which the time designation cursor is moved during the device wave display. The same goes for processing in the case in which a user touches one of the group EV of events in the event/error history box 171 shown in the camera/event display screen 170 of FIG. 23, for example.

Specifically, in the case in which the camera/event display screen 170 shown in FIG. 23 is displayed, the display-data generation portion 51a of the display processor 51 determines whether a user touches one of the events in the event/error history box 171. If determining user's touch operation, the display-data generation portion 51a switches a currently highlighted event in the event/error history box 171 to the touched event, and additionally specifies the occurrence time of the touched event to be shown in the time stamp area 409. Also, the display-data generation portion 51a changes the position of the time designation cursor 404 in accordance with the occurrence time of the touched event. In addition, the display-data generation portion 51a extracts a camera image that is captured at time closest to the time when the touched event occurred from the operation record data, and shows the extracted camera image in the camera image display box 172.

(Real-Time Chart Monitor)

Figure 29:
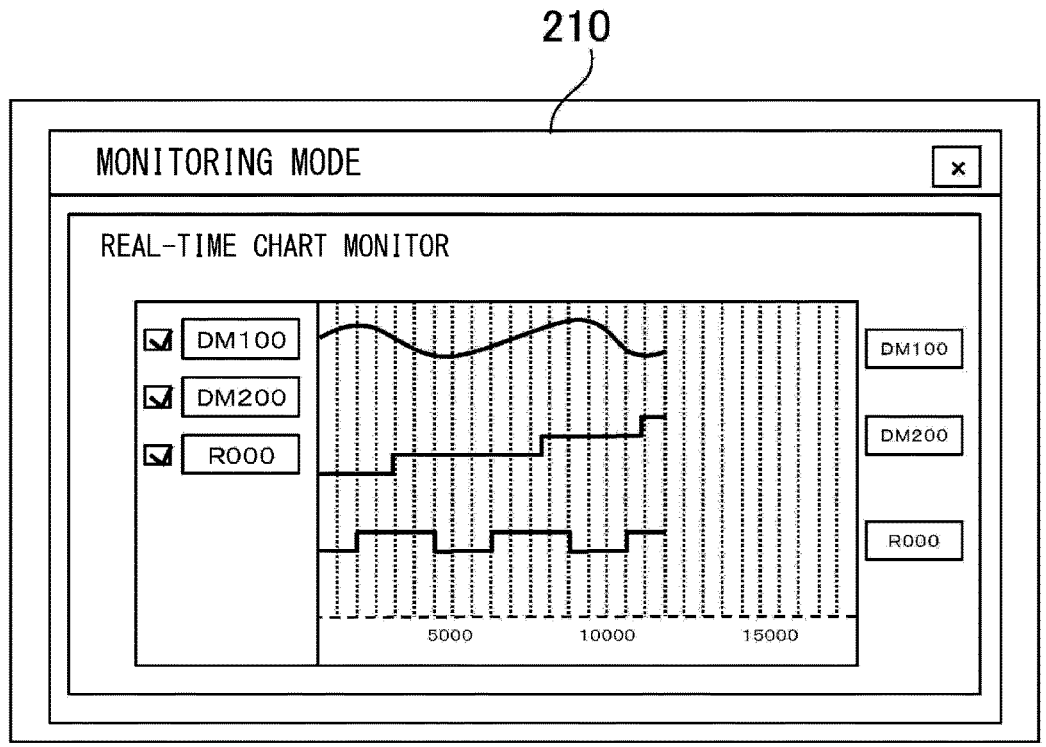
FIG. 29 is a schematic view showing a device wave display screen in a monitoring mode.

The programmable display 50 can receive a device wave through the PLC 1, and display the device wave in real time. The device wave real-time display is realized in the real-time chart monitor in the monitoring mode that is displayed on the programmable display 50. The real-time chart monitor has the monitoring mode for showing present device values that are successively collected in motion video in real time, and a replay mode which reads and displays chronological data that has been acquired in the past. That is, the real-time chart monitor includes the monitoring mode which directly shows the current statuses, and the replay mode which plays back statues at a point in the past. These modes can be switched from one to another by the mode switcher. The mode switcher can be realizable by switching a "real-time chart monitor (replay mode)" button 142 and a "real-time chart monitor (monitoring mode)" button 143 which are display components displayed in the menu screen 140 of FIG. 21, for example. When a user touches the "real-time chart monitor (monitoring mode)" button 143 in the screen of FIG. 21, the programmable display 50 is placed into the monitoring mode of the real-time chart monitor so that the device wave display screen 210 of FIG. 29 is displayed. The device wave display screen 210 of FIG. 29 is displayed in motion video in which the device waves are updated in real time.

(Acquisition Device Settings 52d)

The setting storage 52 of the programmable display 50 shown in FIG. 11 stores the acquisition device settings 52d which specify acquisition devices that have a device wave to be displayed in the real-time chart monitor in the monitoring mode. The PLC 1 temporarily records device values of the devices that are specified by the acquisition device settings 52d in the temporary recording portion 91a as chronological data by the record control portion 39. The programmable display 50 acquires the chronological data through the display-side communication portion 58, and shows the device values in motion video in the device wave display screen 210 shown in FIG. 29 by successively updating the device values.

The setting storage 52 stores the acquisition device settings 52d which specify acquisition devices that provide chronological data of device values to be repeatedly acquired. Also, the setting storage 52 includes settings of the real-time display components for successively showing the chronological data of the acquisition devices.

(Monitoring Mode)

As discussed above, in the real-time chart monitor in the monitoring mode, the programmable display 50 successively shows the chronological data of device values that are temporarily recorded in the temporary recording portion 91a of the PLC 1 on the display portion 55. The programmable display 50 previously makes the acquisition device settings 52d which specify acquisition devices that provide chronological data of device values to be repeatedly acquired and settings of the real-time display components for successively showing the chronological data of the acquisition devices, and saves these settings into the setting storage 52. When a user touches the real-time display component on the user screen, the touch detector 53 detects the touch operation. Based on the chronological data of device values of the acquisition devices that are temporarily recorded in the temporary recording portion 91a of the PLC 1, the display-data generation portion 51a generates display data which sequentially shows the device values on the display screen. In the example of FIG. 21, the real-time display component corresponds to the "real-time chart monitor (monitoring mode)" button 143.

(Subject Device Setting Screen)

Subject devices that provide device waves to be displayed in the monitoring or replay mode in the real-time chart monitor are specified in the subject device setting screen. FIG. 16 shows an example of the subject device setting screen part 220 for specifying subject devices. Subject devices can be specified for each mode, that is, subject devices can be separately specified for the replay and monitoring modes. In addition, in the case in which a plurality of user screens are defined, subject devices can be specified for each user screen, that is, for each RTCMID. In the example of FIG. 16, subject devices to be displayed in RTCMID0 of the replay mode can be specified. Candidates of subject devices are listed in a unit selection box 221. Unit name, device name, and display style are shown for each device. The display style indicates a style to be indicated on the display portion 55 (for example, decimal/binary number, number of bits, with/without sign, etc.). The display styles of devices can be previously defined. Alternatively, users can specify display styles of devices. For example, users can select one of devices and specify a display style of the selected devices through the screen of FIG. 16.

Device waves are displayed in the real-time chart monitor based on the settings that are made in this subject device setting screen part 220. For example, in the example of FIG. 16, DM100, DM200, and R000 are selected as subject devices. Correspondingly, device waves of DM100, DM200 and R000 which are specified as the subject devices for the replay mode of the real-time chart monitor are displayed in the replay mode of the real-time chart monitor of FIG. 12.

(Real-Time Chart Monitor (Monitoring Mode))

The programmable display 50 according to this embodiment can display the real-time chart monitor (monitoring mode). In the real-time chart monitor (monitoring mode), the temporary recording portion 91a (ring buffer) which is separately provided from the PLC-side device portion 34 in the CPU-mounted-unit storage 32 is used in the PLC 1 of FIG. 6.

Figure 30:
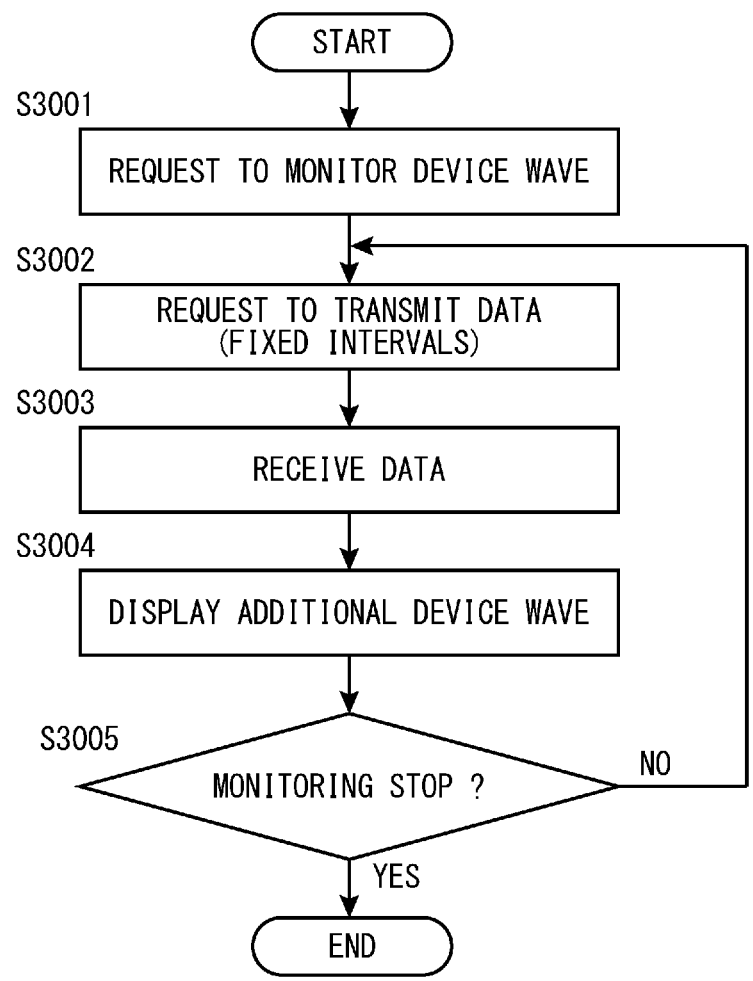
FIG. 30 is a flowchart showing processing of the programmable display when a real-time chart monitor is placed in a monitoring mode.

Processing of the programmable display 50 when a real-time chart monitor is placed in a monitoring mode is now described with reference to a flowchart of FIG. 30. The display processor 51 of the programmable display 50 first requests the PLC 1 to monitor a device wave through the display-side communication portion 58 (Step S3001). When receiving the monitoring request, the CPU-mounted-unit side processor 31 holds device values of a device to be monitored in the ring buffer for a fixed period. Accordingly, chronological data of the device values of the device to be monitored for the fixed period is stored in the ring buffer.

The display processor 51 requests the PLC 1 to transmit the data at fixed intervals through the display-side communication portion 58 (Step S3002). In this data transmission request, the requested data is a predetermined amount of data from the last point of the area which is read in previous data transmission request in the chronological data of device values that are sequentially stored in the ring buffer as the temporary recording portion 91*a* which is provided in the CPU-mounted-unit storage portion 32. Correspondingly, the CPU-mounted-unit side processor 31 transmits the predetermined amount of data from the last point of the area which is read in previous data transmission request in the chronological data of device values that are sequentially stored in the ring buffer to the programmable display 50 (Step S3003). In order to display the device wave (the horizontal axis is a time axis) in the programmable display 50, the CPU-mounted-unit side processor 31 acquires information on time when the device values are held into the ring buffer from an internal clock (time management portion 83*b* of FIG. 8) or the like. The CPU-mounted-unit side processor 31 transmits the chronological data of device values and the information on time when the device values are stored into the ring buffer to the programmable display 50. The display processor 51 receives the data and display the additional part of the device wave based on the information on time (Step S3004). Such additional parts of the device wave are repeatedly added to the device wave (the device wave is updated) until the device wave monitoring stops (Step S3005).

(Example of Monitoring Mode Screen)

An example of the real-time chart monitor (monitoring mode) screen is shown in as the device wave display screen 210 of FIG. 29. Device waves are displayed in graph in the real-time chart monitor in the monitoring mode. In this graph, the time axis indicates the number of scans (scan serial number). The time axis may indicate time instead of scan serial number. Time goes forward from left to right in this graph. In the exemplary device wave display screen 210 of FIG. 29, the device waves of the devices DM100, DM200, and R000 are displayed. The right ends of device waves indicate the latest device values. The display processor 51 adds additional parts of chronological data of the device values that are received from the PLC to the right end of the device waves. Accordingly, the device waves will extend rightward. If the device waves arrive at the right end of the real-time chart monitor box, the monitoring screen which includes the graph will scrolls the device wave leftward so that device values that are positioned on the left end of the device wave sequentially are removed from the monitoring screen.

The real-time chart monitor (monitoring mode) shown in FIG. 29 can be displayed on the display portion 55 of the programmable display 50 by the following settings. The "real-time chart monitor (monitoring mode)" as switch function is first assigned to the switch component of "real-time chart monitor (monitoring mode)" in the screen data edition device 60. RTCMID is specified to be displayed in the "real-time chart monitor (monitoring mode)", and the type and number of devices to be displayed in device wave on the screen corresponding to the selected RTCMID in the subject device setting screen part 220 in the system setting screen 130 shown in FIG. 16. The type and number of devices to be displayed in device wave may be commonly specified to the aforementioned "real-time chart monitor (replay mode)". The edited screen data is transmitted to the programmable display 50 from the screen data edition device 60. When a user touches the "real-time chart monitor (monitoring mode)" button 143 in the menu screen 140 of FIG. 21, chronological data (device wave) of the desired type and number of devices can be displayed on the system screen of the programmable display 50.

(Replay Display Component)

If switching the screen to the replay mode furthermore, a user touches the replay display component. Two replay display components the "real-time chart monitor (replay mode)" button 142 and the "replay mode start" button 141 are prepared in the aforementioned example of the menu screen 140 of FIG. 21. When the "replay mode start" button 141 is touched, the replay mode screen (e.g., FIGS. 12, and 23 to 27, etc.) is displayed based on previously specified settings. A user can make various types of settings relating to the replay mode or selects a desired screen in the replay mode screen. Specifically, a user can select a desired screen by touching one of the tabs which are arranged in the upper area of the screen. For example, when a user selects the "real-time chart monitor" tab 161, the device wave display screen 160 of FIG. 12 is displayed. When a user selects the "camera/event" tab 162, the camera/event display screen 170 of FIG. 23 is displayed. For example, when a user selects the "viewer" tab 163, the viewer display screen 180 of FIG. 24 is displayed. When a user selects the "unit" tab 164, the unit display screen 190 or 190B of FIG. 25 or 26 is displayed. Also, when a user selects the "program" tab 165, the program display screen 200 of FIG. 27 is displayed.

Figure 31:
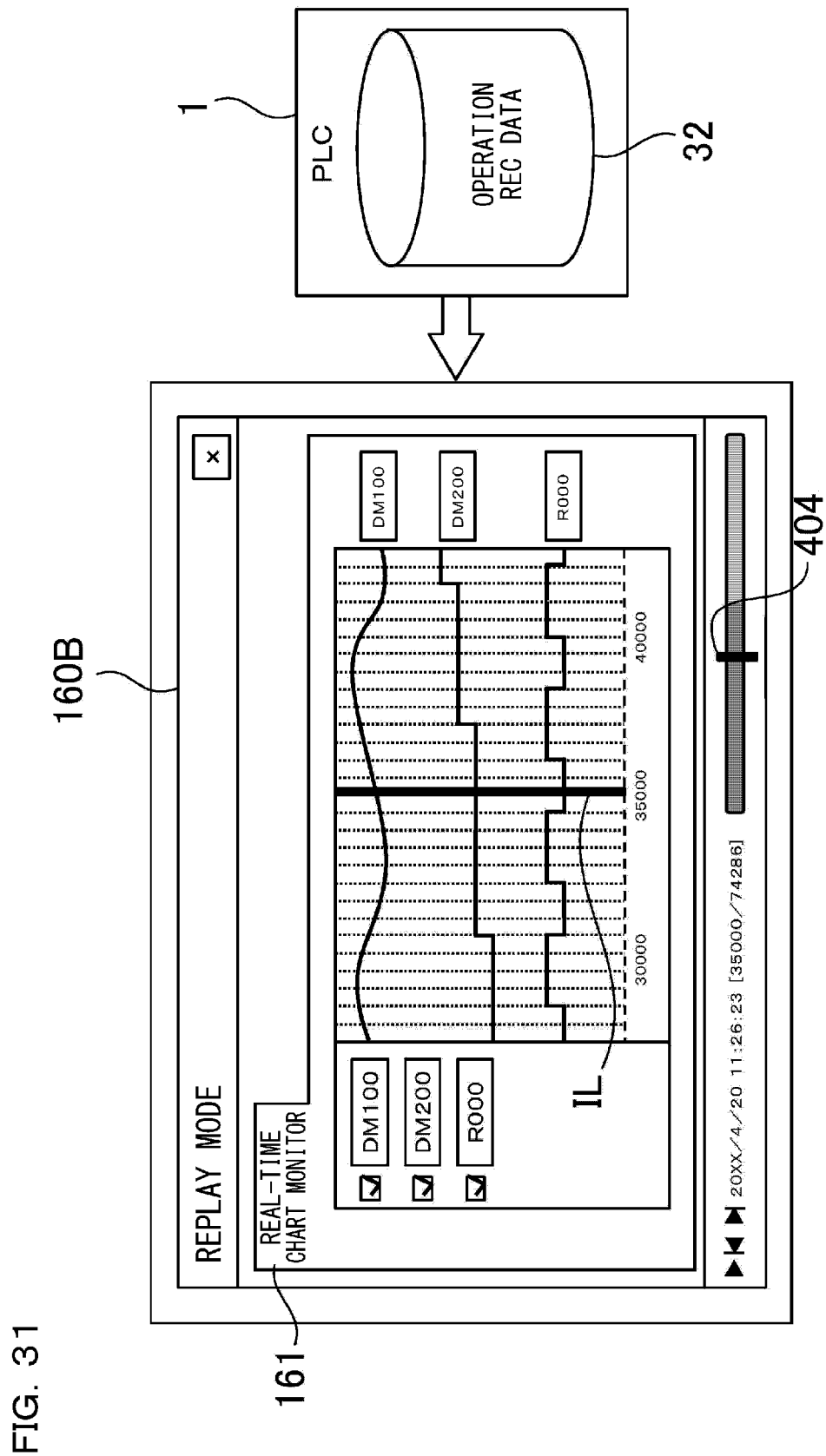
FIG. 31 is a schematic view showing only the device wave display screen in the replay mode.

When a user selects the "real-time chart monitor (replay mode)" button 142, a device wave display screen 160B of FIG. 31 is displayed. On this screen, a plurality of tabs as shown in FIGS. 12, and 23 to 27 are not shown, but only the device wave display screen is displayed. The "real-time chart monitor (replay mode)" button 142 allows users to directly display only device waves in real time without verbose settings.

(Initial Display Screen Setting Portion)

Figure 32:
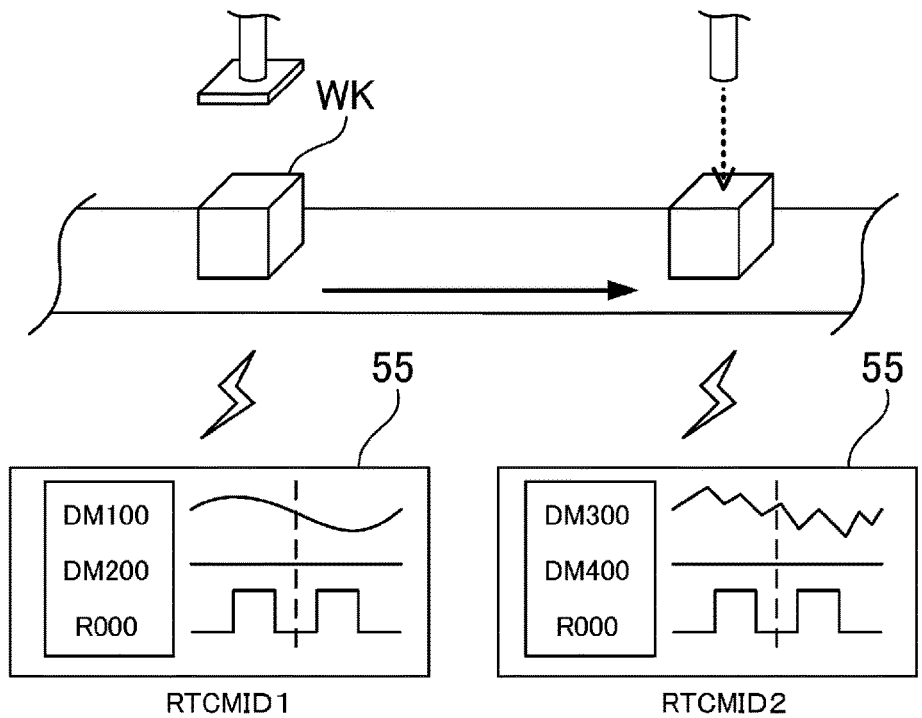
FIG. 32 is a schematic view showing selection of device waves to be displayed depending on save conditions.

An initial display screen which is first displayed in the replay mode is defined by the screen data edition device 60. Subject devices to be displayed in device wave in the initial display screen can be selected by the screen data edition device 60. Subject devices to be first displayed in the initial display screen may be changed depending on conditions. If a trouble occurs, the replay mode will be used to diagnose the cause of the trouble. In such a case, devices that are considered to be the cause will often depend on the type of trouble. For this reason, it will be useful to diagnose the cause of a trouble that subject devices to be first displayed in the initial display screen are changed depending on the type of the trouble or saved conditions. That is because users can immediately check statuses of the subject devices. To achieve this, the screen data edition device 60 previously makes settings to change device waves to be displayed on the programmable display 50 in the replay mode depending on types of troubles as shown in in FIG. 32, for example. Accordingly, if a trouble occurs in actual operation of an FA system, device waves of devices that are likely to relate to the cause of the trouble are selectively displayed. That is, the programmable display 50 can show useful information to diagnose the cause of the trouble. As a result, the programmable display 50 can be useful to quickly recover the system. The programmable display can display a setting screen which allows selection of one or more subject devices and representation styles of the one or more subject devices when the device wave is displayed on the display screen.

Figure 33:
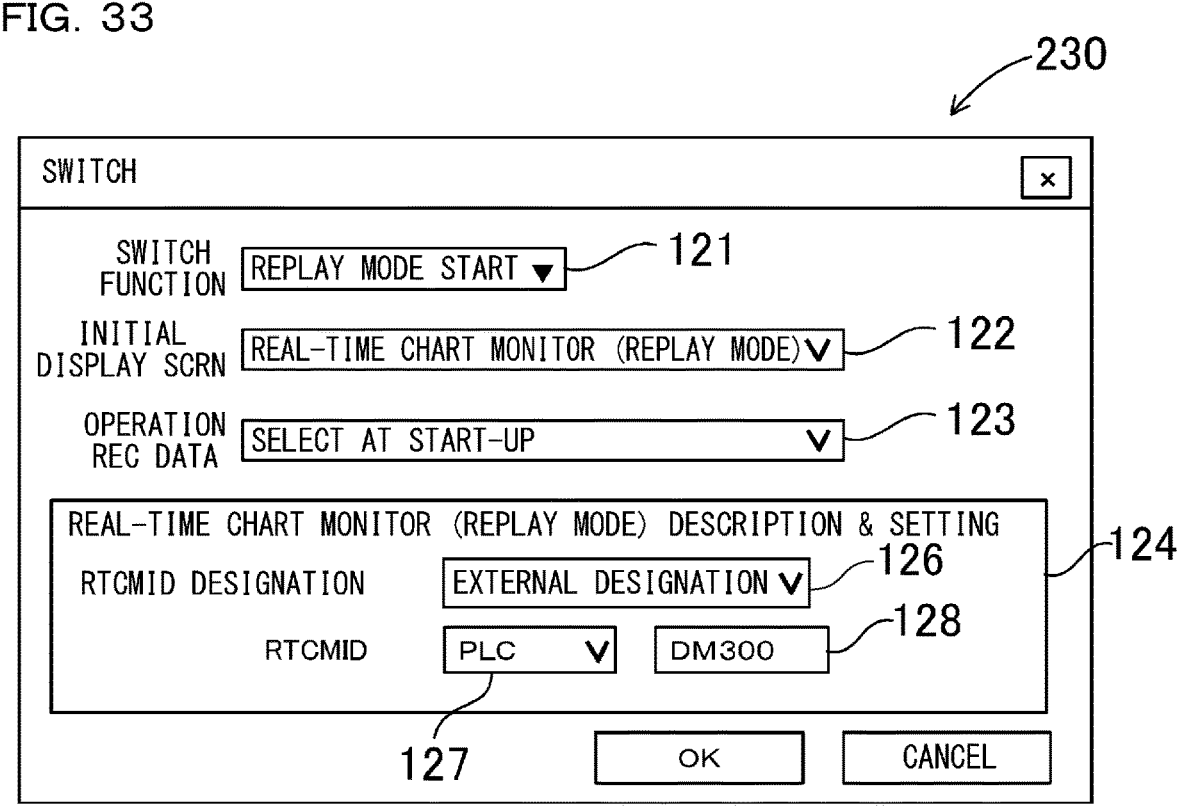
FIG. 33 is a schematic view showing a user interface screen of the screen data edition device to assign an alarm in trouble occurrence to display data.

Such settings can be made in an initial display screen setting portion 230 of the screen data edition device 60 as shown in FIG. 33. The illustrated initial display screen setting portion 230 is similar to the switch setting screen 120 shown in FIG. 15, and its description is omitted. An "RTCMID designation" box 126 is arranged in the real-time chart monitor (replay mode) description & setting box 124. External designation can be selected for the RTCMID designation. In the case of external designation, the place and device name of a subject device are designated in a place designation box 127 and a device name designation box 128, respectively. In the example of FIG. 33, "PLC1" and the device value "DM300" are designated as the place and device name for the RTCMID, respectively. In this case, if a device value of DM300 is 0, RTCMID=0 is designated. If a device value of DM300 is 1, RTCMID=1 is designated. This assignment of a device to RTCMID as RTCMID designation can dynamically change RTCMID of the real-time chart monitor (replay mode) which is displayed on the programmable display 50 if troubles occur. RTCMID designation can be selected from "external designation" and "internal designation" in the "RTCMID designation" box 126. In the case in which RTCMID is designated fixed as discussed above, "internal designation" is selected.

(Data Structure)

Figure 34A:
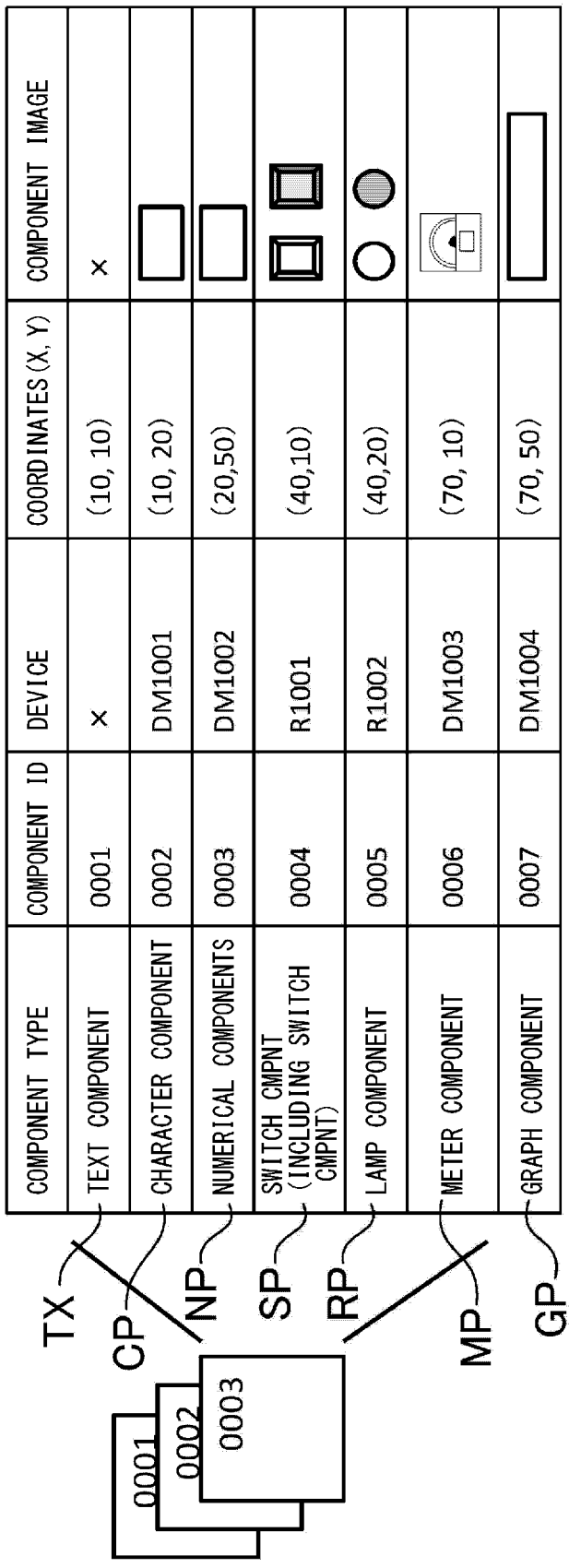
FIG. 34A is a schematic diagram showing data structure of screen data of the user screen.
Figure 34C:
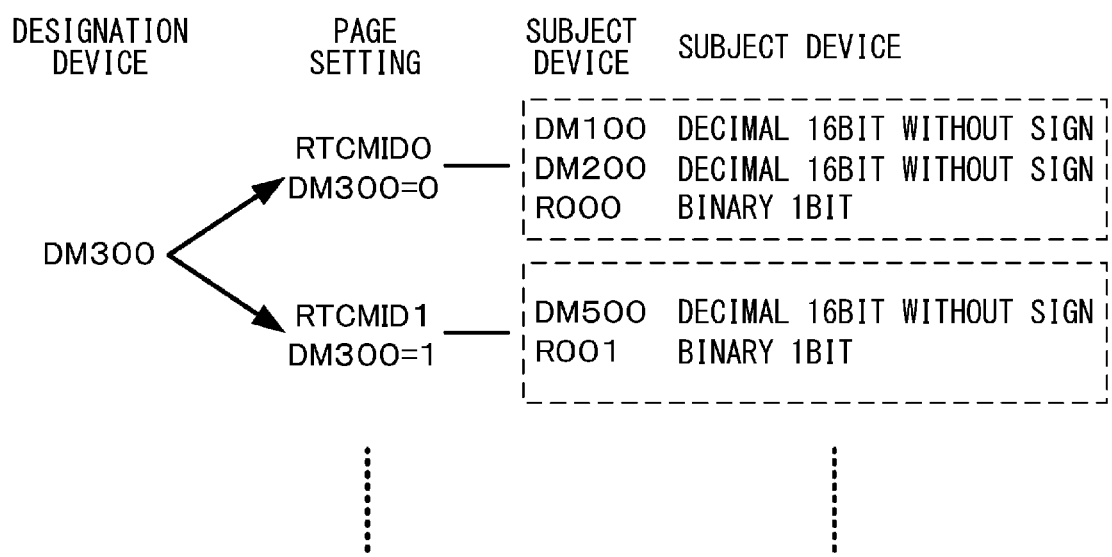
FIG. 34C is a schematic diagram of the data structure after RTCMIDs are assigned to devices.

FIG. 34A shows the data structure of screen data of user screens that are edited in the screen data edition device 60 according to this embodiment. FIG. 34B shows the data structure of a system screen that is previously incorporated by system engineers of the programmable display 50. FIG. 34C is a schematic diagram of the data structure in which the aforementioned RTCMIDs are assigned to devices.

As shown in FIG. 34A, the data structure of screen data that is edited by a user includes page settings of pages that are managed by their screen IDs (e.g., 0001 to 0003), and component settings of various types of components that are arranged in their corresponding page. As discussed above with reference to FIG. 2, the types of components that are arranged in their corresponding page can include text components TX, character display components CP, numerical display components NP, switch components SP (including page switching components), lamp components RP, meter components MP, graph components GP, and the like. In addition, component IDs are assigned to these components in order to distinguish two or more components of the same type from each other. For example, in the case in which two text components are includes, different component IDs are assigned to the two text components.

Devices are assigned to components other than text components TX. In the example of FIG. 34A, a device DM1001 is assigned to a character display component CP of component ID0002. A device DM1002 is assigned to a numerical display components NP of component ID0003. A device R1001 is assigned to a switch component SP of component ID0004. A device R1002 is assigned to a lamp component RP of component ID0005. A device DM1003 is assigned to a meter component MP of component ID0006. A device DM1004 is assigned to a graph component GP of component ID0007.

The components have XY coordinates which indicate their position to be arranged in their corresponding page. For example, in the example of FIG. 34A, the text component has its coordinates (10, 10) which indicate its position to be arranged in its corresponding page. The same goes for the other components.

Components other than text components have one or more component icon/images. In for example, in the example of FIG. 34A, the character display component CP and the numerical display component NP have component images of frame that surrounds characters and numerical values to be displayed inside. Users can select the thickness and color of the frame. The same goes for the other components.

Information on the system default screen shown in FIG. 34B (system default screen information 52f) is previously designed by system engineers of the programmable display 50 and stored in the setting storage 52 (alternatively in data memory 56 or other system memory). As discussed with reference to FIG. 28A, the display-data generation portion 51a of the programmable display 50 reads the system default screen information 52f and extracts chronological data of required device values and the like from operation record data to generate display data DP by superposing the chronological data of device values on the system default screen. The display processor 51 displays the image corresponding to the display data DP which is generated by the display-data generation portion 51a. Although the data structure for displaying the device wave display screen 160 shown in FIG. 12 is described with reference to FIG. 34B, the same goes for the data structure for displaying the screens shown in FIGS. 23 to 27.

As shown in FIG. 34C, a designation device is designated to the RTCMID(s), and subject devices to be displayed in the real-time chart monitor replay mode are assigned to the RTCMIDs.

Accordingly, an alarm and display data can be correlated with each other if a trouble occurs. For example, if a user touches the "replay mode start" button 141 in the system screen of FIG. 21, a user screen in accordance with to a device value of the designated subject device (DM300) will be displayed based on the settings shown in FIG. 33. As discussed above, if the device value of DM300 is 0, the page of RTCMID0 is selected, while if the device value of DM300 is 1, the page of RTCMID1 is selected as the initial screen 150 (FIG. 22) in the replay mode. As a result, a suitable user screen (in which suitable devices are displayed) can be selectively initially displayed depending on troubles. In other words, because devices are previously associated to troubles which are closely correlated with the devices, such an initial screen can be useful to eliminate the troubles.

(Ladder Monitor)

The programmable display 50 can include a ladder monitoring function which displays a ladder program as shown in the program display screen 200 of FIG. 27 in the replay mode of the real-time chart monitor. Specifically, if the save conditions are satisfied, the PLC 1 associates a user program that is currently executed by the program-execution portion 40 at the satisfaction of the save conditions with operation record data, and saves the user program associated with the operation record data into the save memory 36. The programmable display 50 acquires the operation record data that is saved in the save memory 36 of the PLC 1, and displays the user program on the display portion 55 based on information on the acquisition time included in the operation record data. In this case, the device value corresponding to the acquisition time is shown on the user program (e.g., ladder program) that is included in the operation record data. As shown in FIG. 27, device values are indicated on their corresponding device shown in a ladder diagram display box 206.

(Event Monitor)

The programmable display 50 can include an event monitoring function on which shows events. The event collection portion 92b of the PLC 1 collects event data relating to a plurality of events which occur in the PLC 1 or controlled devices which are controlled by the PLC 1. The collection portion 92b associates device values with their corresponding occurrence time of the events, and stores the device values which are associated with their corresponding occurrence time of the events in the temporary recording portion 91a in chronological order. If the save conditions are satisfied, the event data that is stored in the event collection portion 92b is associated with operation record data so that the event data is included in the operation record data is saved into the save memory 36.

The programmable display 50 acquires the operation record data that is saved in the save memory 36, and displays an event corresponding to the event data that is included in the operation record data on the display portion 55 based on the information on the occurrence time that is included in the operation record data. FIG. 23 shows the event monitoring function which is executed in the replay mode of the real-time chart monitor. In this example, the event/error history box 171 and the camera image display box 172 are arranged in the left and right sided of the camera/event display screen 170, respectively. In the event/error history box 171, events that are included in operation record data are listed together with their details and occurrence time. If one of the events is selected in the event/error history box 171, a camera image that is captured by the camera corresponding to the selected event is displayed in the camera image display box 172.

(Reproduction Control Row 402)

Furthermore, a reproduction control row 402 is arranged in the bottom side of the camera/event display screen 170 to control reproduction of log data such as saved device values. The time designation cursor 404 shown in a slider form can be moved leftward and rightward. The time designation cursor 404 is correlated with time information included in operation record data. Time goes forward from left to right in the slider. When the time designation cursor 404 is moved by tapping, an event at time corresponding to the time designation cursor 404 is selected in the event/error history box 171, and the camera image of the camera image display box 172 is switched to a camera image corresponding to the event. The currently selected time information is shown in the time stamp area 409.

The reproduction button 406 is a button for showing device values in chronological order. If the reproduction button 406 is tapped, the event changes with time so that the camera image in the camera image display box 172 will be displayed as in motion video. A one-step reverse reproduction button 407 is a button for showing device values in chronological order when the selected time go back (rewound) by one step. The one-step forward reproduction button 408 is a button for showing device values in chronological order when the selected time go forward by one step.

(Functional Block Diagram of PLC 1)

Figure 35:
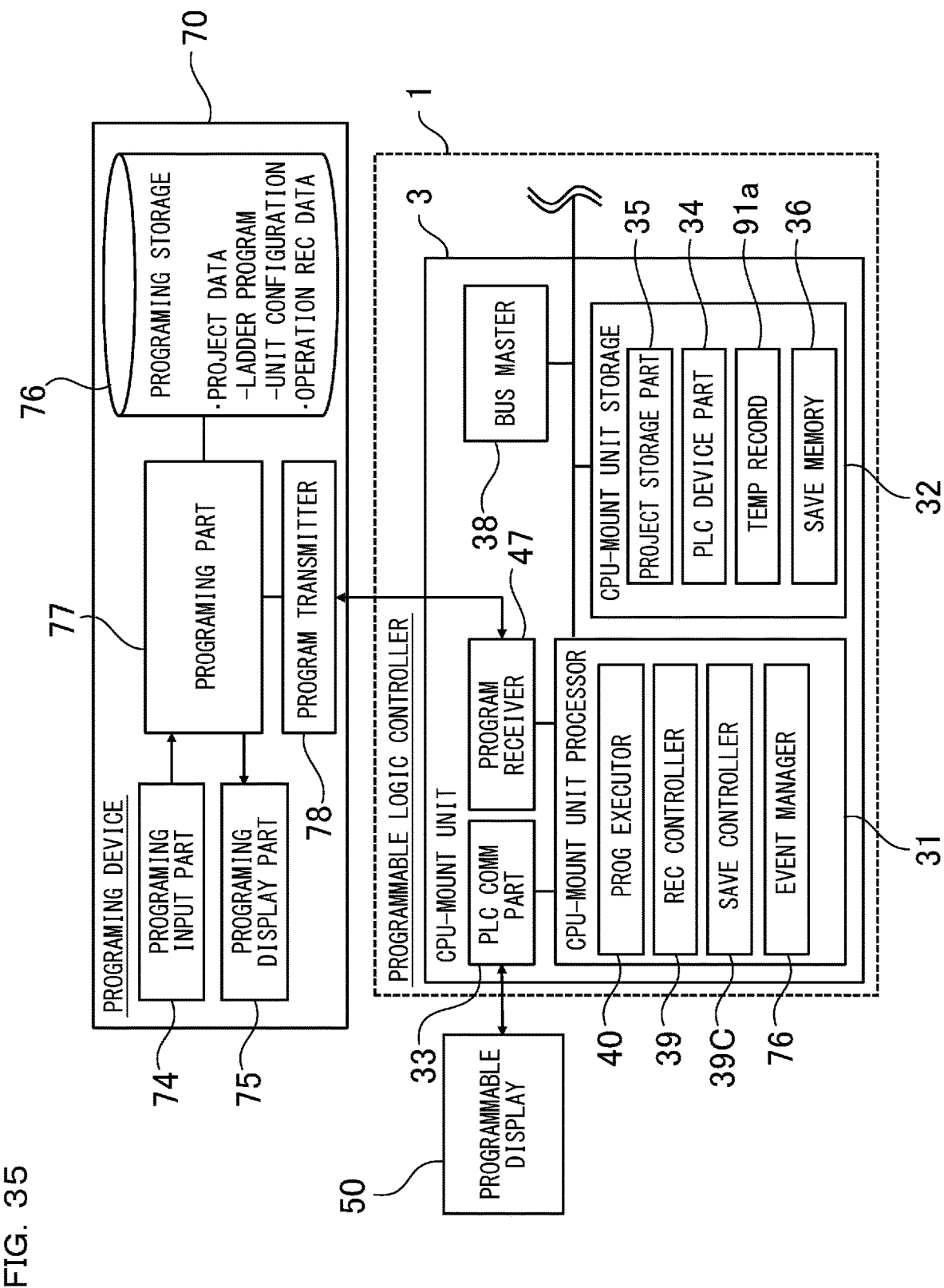
FIG. 35 is a functional block diagram of the programmable logic controller.

User programs such as ladder programs to be executed by the aforementioned PLC 1 are created by the programming device 70. The user program created by the programming device 70 is transmitted to the PLC 1. FIG. 35 is a functional block diagram of the PLC 1 which is connected to the programming device 70. The PLC 1 shown in FIG. 35 includes a CPU-mounted-unit storage 32, a CPU-mounted-unit processor 31, a bus master 38, a PLC-side communication portion 33, and a program reception portion 47. The CPU-mounted-unit storage 32 includes a project storage portion 35, a PLC-side device portion 34, a temporary recording portion 91a, and a save memory 36.

The project storage portion 35 stores project data that is provided from the programming device 70 and includes a ladder program. The PLC-side device portion 34 includes bit and word devices. Each device stores a device value. The PLC-side device portion 34 serves as a device memory which stores device values of the devices. The PLC-side device portion 34 serves a storage area to be referred based on the user program. The temporary recording portion 91a records the device values stored in the PLC-side device portion 34 in chronological order in each scan. The temporary recording portion 91a can be constructed of a ring buffer, or the like. The save memory 36 saves chronological data of the device values that are stored in the temporary recording portion 91a, if predetermined save conditions are satisfied. The save memory 36 is constructed of an internal memory, a removable memory card, or the like.

The CPU-mounted-unit side processor 31 includes a program-execution portion 40, a record control portion 39, a save control portion 39C, and an event management portion 76. The program-execution portion 40 is an execution engine of the ladder program. The record control portion 39 collects device values of previously defined devices if recording trigger conditions for starting recording into the temporary recording portion 91a are satisfied. The record control portion 39 associates the device values with information on acquisition time of the device values (time and date, or scan serial number of ladder program), and records the device values associated with the information into the temporary recording portion 91a. The recording trigger conditions can be the condition in which the PLC 1 is placed to a RUN mode from a setting mode. However, the recording trigger conditions are not limited to this condition. Other conditions can be applied to the recording trigger conditions. The save control portion 39C saves the device values that are temporarily recorded in the record control portion 39 as log data together with the information on acquision time, if the save trigger conditions for saving the device values into the save memory 36 are satisfied. The event management portion 76 detects events. The details of the event management portion 76 will be discussed later.

The bus master 38 controls communication of a unit-to-unit bus which connects the CPU-mounted unit 3 to the expansion unit 4. Input/output refresh is performed by the bus master 38. The input/output refresh, the ladder program execution, and the END processing form one cycle (one scan). The CPU-mounted unit 3 repeatedly executes the scan with speed. As a result, the device of the CPU-mounted unit 3 and the device of the expansion unit 4 are synchronized with each other by input/output refresh. Results that are obtained by execution of the ladder program by the program-execution portion 40 are reflected in devices of the expansion unit 4 by input/output refreshment. Peripheral services such as error checking of the system, and data communication with the programmable display 50 by the PLC-side communication portion 33 are performed in the END processing. The PLC-side communication portion 33 serves to repeatedly provide communication between the PLC 1 and the programmable display 50 at a predetermined period. The program reception portion 47 receives the project data including the ladder program which is transmitted from the programming device 70.

(Functional Block Diagram of Programming Device 70)

The programming device 70 shown in FIG. 35 includes a programing-side input portion 74, a programing-side display portion 75, a programing-side storage 76, a programing portion 77, and the program transmission portion 78. A PC which is installed with the screen data edition device 60 software can be also used for the programming device 70. A mouse, keyboard, and the like can be uses as the programming-side input portion 74. Users can enter edition data on ladder programs, and make settings of unit configuration through the programming side input portion 74. The programming side display portion 75 is a display or the like which is connected to the PC.

The programing portion 77 creates ladder programs based on user's data entry the user through the programming side input portion 74. In addition, the programing portion 77 makes settings of unit configurations. The project data includes the ladder programs and the unit configurations. The programming side storage 76 stores project data that is created by the programing portion 77. The programming side storage portion 76 also stores operation record data of the PLC 1. The program transmission portion 78 transmits the project data including the ladder program stored by the programming-side storage portion 76 to the PLC 1.

(Operation Record Data)

Figure 36:
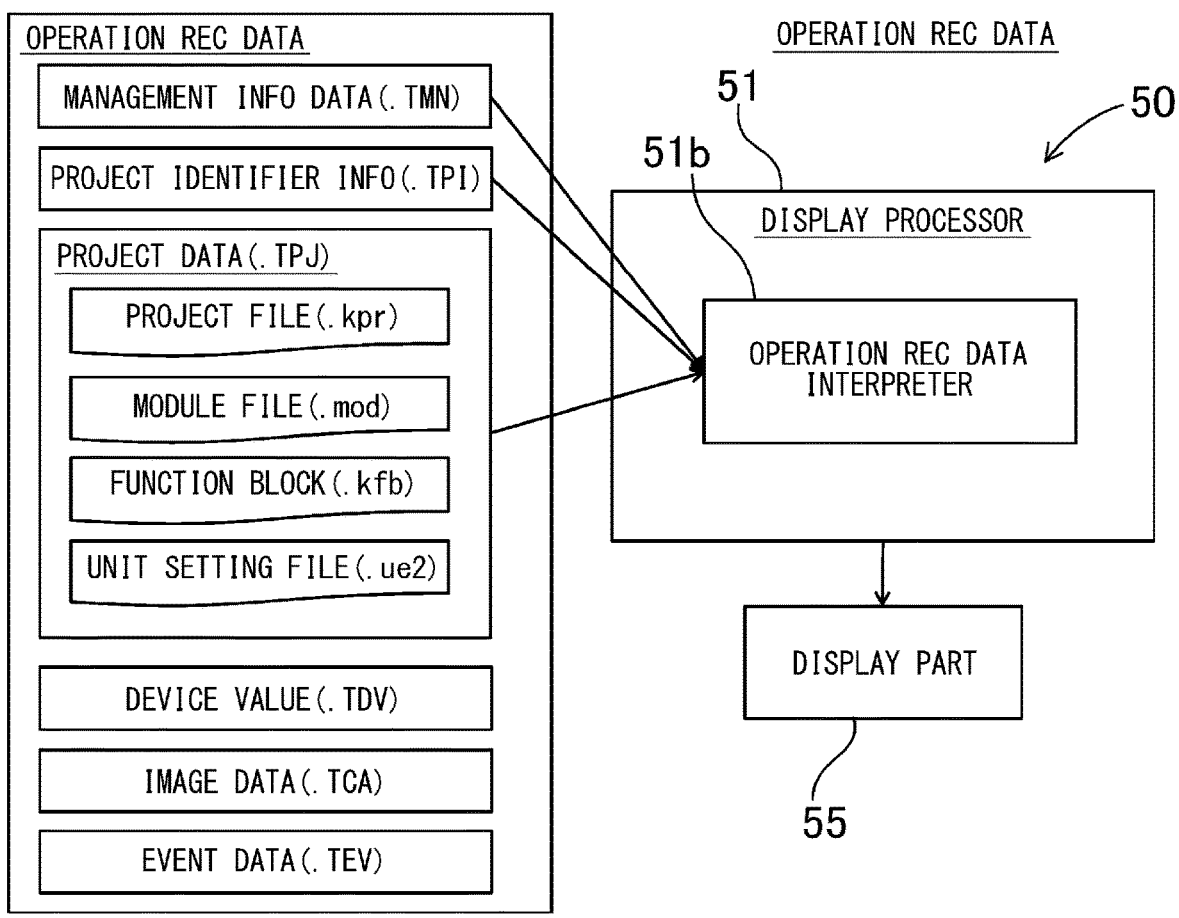
FIG. 36 is a schematic diagram showing a mechanism of the programmable display for displaying operation record data.

Operation record data that is saved in the save memory 36 is now described in detail. The operation record data includes project data and log data. FIG. 36 shows an exemplary structure of operation record data. The project data that is included in the operation record data is project data that is executed by the program-execution portion 40 when save trigger conditions are satisfied. The log data the chronological data of device values that are associated with information on collection time, chronological image data captured by the camera unit 4c, event data, and the like. The image data and event data are also associated with information on acquisition time of the image data and occurrence time of the event data. The details of the association will be discussed later.

A plurality of files which include management information data and project identification information are packaged as the operation record data. The management information data is information on types of data that are included in the operation record data. Its extension can be TMN, for example. The identifier of the project data included in the operation record data can be TPJ, for example. The project identification information is information on identification of project data when the operation record data is saved. Its extension can be TPI, for example. The extension of the chronological data of the device values can be TDV, for example. The extension of the chronological image data can be TCA, for example. The extension of the event data is can be TEV, for example. These extensions are for illustrative purpose only. Any sets of alphabets/numerals and the like can be used for their extensions.

The project data (extension TPJ) includes a project file, a module file, a function block, a unit configuration file, and the like. The project file includes information on settings of a project, and its extension can be kpr, for example. The module file is so-called ladder program information, and its extension can be mod, for example. The function block is information on componentized ladder program, and its extension can be kfb, for example. The unit configuration file is configuration information on a unit, and its extension can be ue2. Only a part of their information may be included in the project data. Alternatively, other information may be added to the project data. The programing portion 77 in FIG. 35 can interpret the management information data included in the operation record data, and can display the contents of the operation record data on the programming-side display portion 75.

(Operation-Record-Data Interpretation Portion 51b)

As discussed above, not only the PLC 1 but also the programmable display 50 can display the contents of operation record data. To achieve this, the programmable display 50 includes an operation-record-data interpretation portion 51b. The contents of operation record data to be displayed by the programmable display 50 are now described with reference to FIG. 36. The display processor 51 of the illustrated programmable display 50 includes the operation-record-data interpretation portion 51b. The operation-record-data interpretation portion 51b reads management information data in the operation record data, and determines types of data that are included in the operation record data. Also, the operation-record-data interpretation portion 51b reads project data corresponding to project identification information, and then imports its project file, module file, function block, unit configuration file, and the like which are included in the project data. Accordingly, the display processor 51 can display various user interfaces in synchronization with each other (correlational display) in the replay mode.

(Synchronous Display (Correlational Display) of Operation Record Data)

Figure 37:
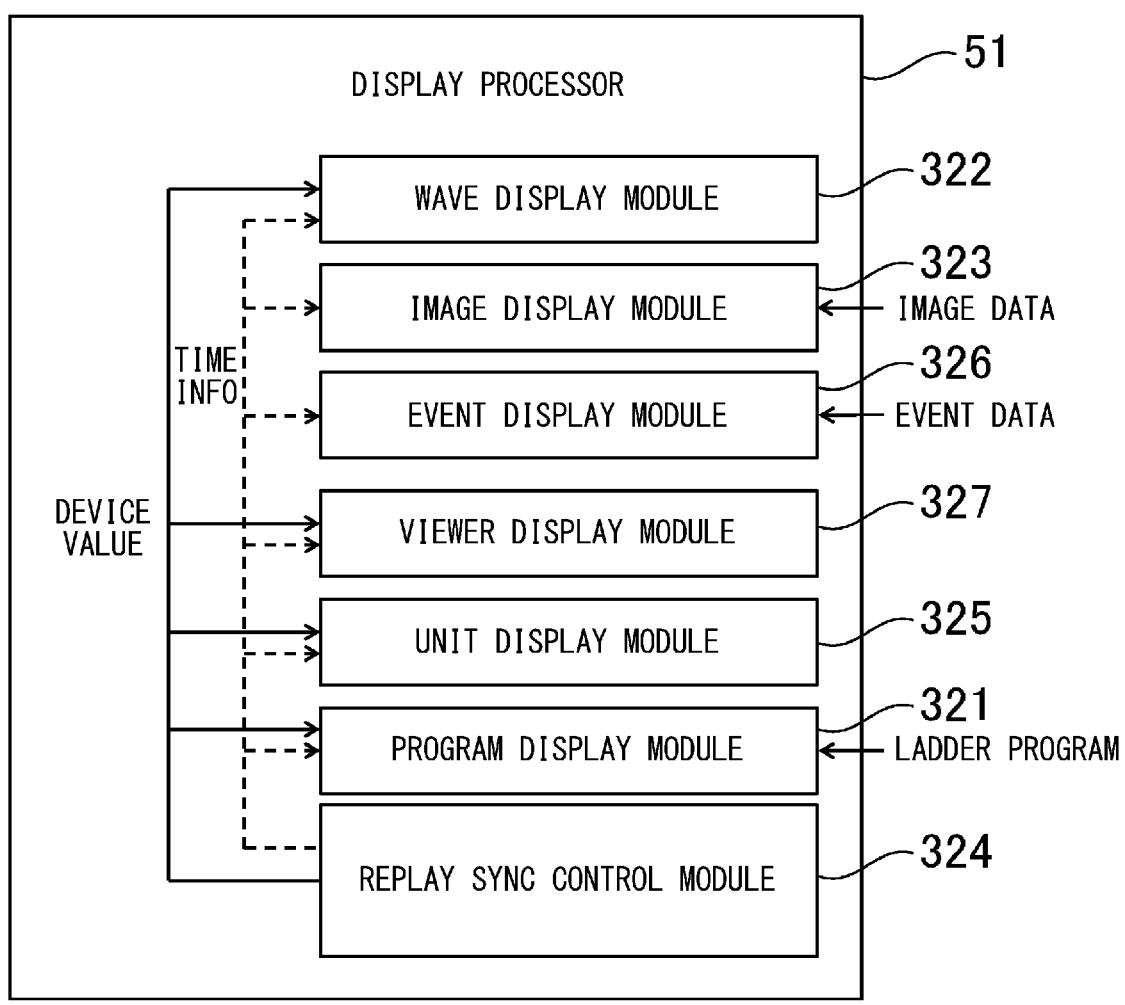
FIG. 37 is a functional block diagram of a display processor.

FIG. 37 is a functional block diagram of the display processor 51 of the programmable display 50. As shown in FIG. 37, the display processor 51 includes a wave display module 322, an image display module 323, an event display module 326, a viewer display module 327, a unit display module 325, a program display module 321, and a replay synchronization control module 324. The wave display module 322 is a module for displaying chronological data of device values that are included in log data in device wave on the display portion 55.

In the device wave display screen 160 shown in FIG. 12, if the time designation cursor 404 is dragged leftward or rightward, the device waves correspondingly move leftward or rightward. A thick vertical line as the identifying line IL is shown at the center (position corresponding to scam number 35000) of the device wave display screen 160. The device waves can move leftward or rightward so that the identifying line IL overlies the time (scan serial number) that is specified by the time designation cursor 404. For example, if the time designation cursor 404 is moved rightward from the position shown in FIG. 12 to scan serial number 40000, the device waves correspondingly move leftward so that the points of the device waves corresponding to scan time 40000 agree with the identifying line IL. In addition, device values of the device waves that agree with the identifying line IL may be shown on the screen.

The image display module 323, the event display module 326, the viewer display module 327, the unit display module 325, and the program display module 321 are now described in detail with reference to FIGS. 37 to 40.

The display processor 51 shown in FIG. 37 includes the program display module 321. The program display module 321 is a module for displaying device values that are included in the log data 73 together with the user program that is included in the project data 71 on the display portion 55. In addition to the user program, the program display module 321 may display various types of information which allows users to check setting information of the project data 71 such as program configuration information, a plurality of program parts, a unit configuration, function settings of units, and the like that are included in the project data 71. The image display module 323 displays chronological image data that is included in the log data 73 on the display portion 55.

The wave display module 322 is a module for displaying chronological data of device values that are included in log data 73 in wave shape on the display portion 55. The replay synchronization control module 324 brings information that is displayed by the program display module 321 into synchronization with information that is displayed by the wave display module 322. Device waves can be replayed on the device wave display screen 160 of FIG. 12 by the replay synchronization control module 324. The event display module 326 extracts events in chronological order from operation record data, as shown in FIG. 23, and lists the events in the event/error history box 171. The viewer display module 327 extracts information on maintenance from the operation record data, and displays a maintenance screen or the like as shown in FIG. 24.

These modules can be called engineering software. The image display module 323 may be realized as one function (image display portion) of the program display module 321 or one function (image display section) of the wave display module 322.

(Program Display Module 321)

Figure 38:
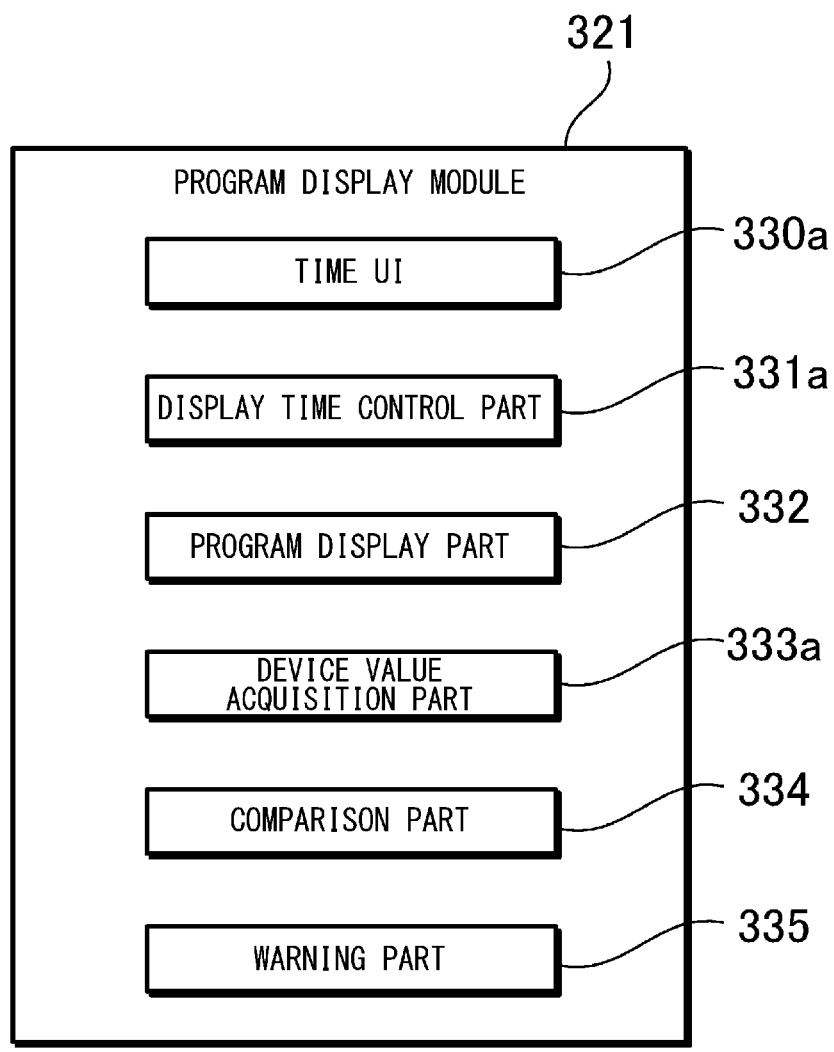
FIG. 38 is a diagram illustrating a program display module.

FIG. 38 shows the details of the program display module 321. A time UI 330a provides a UI (e.g., slide bar, cursor, etc.) for operating acquisition time (display time) of a device to be displayed together with the user program. The display time control portion 331a sends the display time that is designated by the time UI 330a to the replay synchronization control module 324, and provides the display time that is received from the replay synchronization control module 324 to the time UI 330a. The program display portion 332 displays the project data 71 on the display portion 55, or reads the project data 71 corresponding to identification information from the PC-side memory 22 to display the read project data 71 on the display portion 55. Also, the program display portion 332 associates device values that are acquired by a device value acquisition portion 333a with devices that are used or described in the user program, and displays the device values associated with the devices. The device value acquisition portion 333a includes a real-time reproduction mode and a history reproduction mode (log reproduction mode). In the real-time reproduction mode, the device value acquisition portion 333a accesses the real-time-transmission portion of the PLC 1 to acquire device values, and transfers the acquired device values to the program display portion 332. In the log reproduction mode, the device value acquisition portion 333a accesses the replay synchronization control module 324 shown in FIG. 37 to acquire display time and corresponding device values, and transfers the acquired display time and device values to the program display portion 332.

Figure 39:
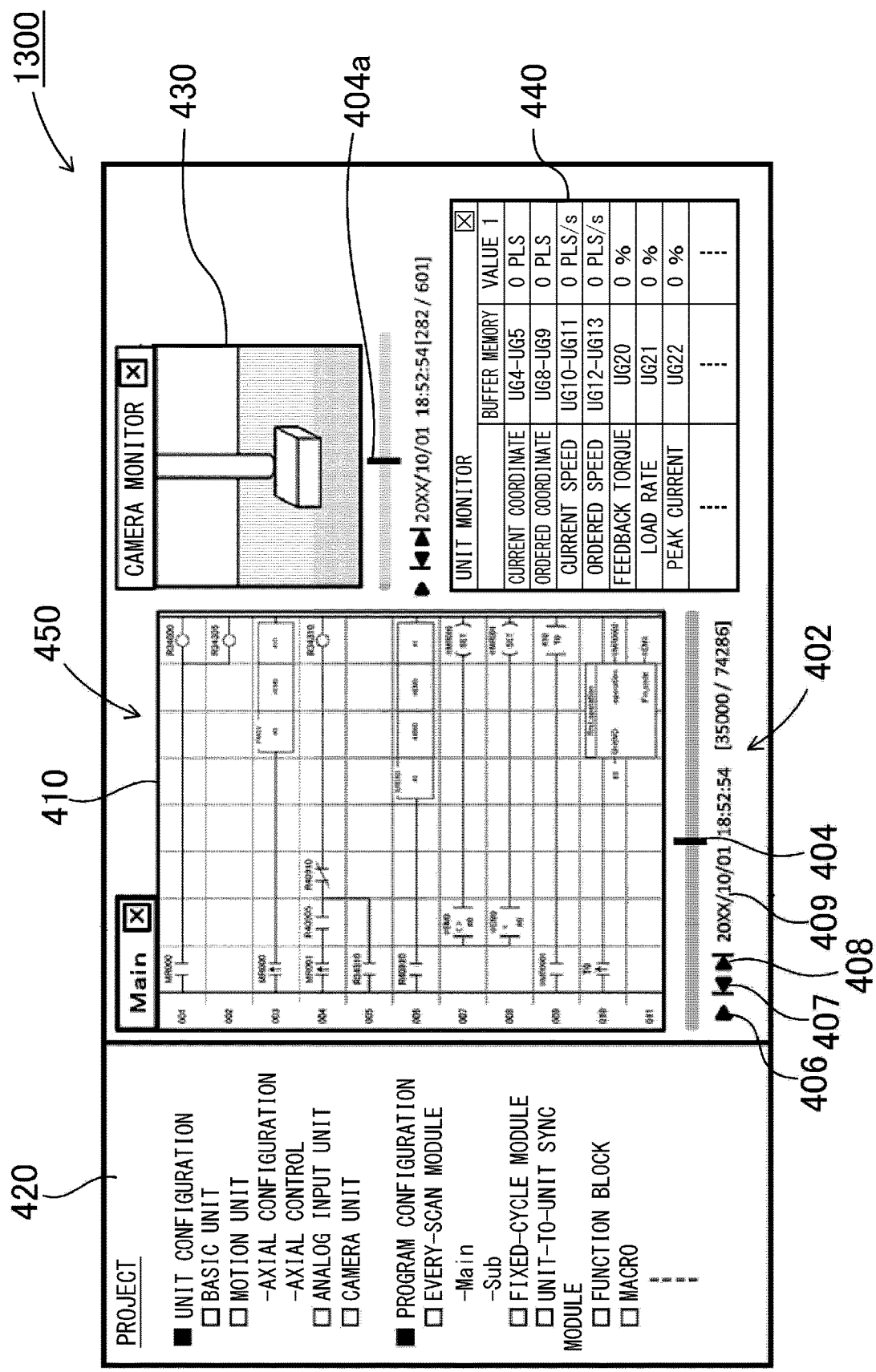
FIG. 39 is a diagram illustrating a user interface screen displayed on the programmable display.

FIG. 39 is a schematic view showing an exemplary user interface screen 1300 which is displayed on the display portion 55 of the programmable display 50 by the program display portion 332 or the like. In FIG. 39, various types of information that are included in the project data 71 are displayed on a project display area 420 in the left side of the screen. Unit configuration (CPU-mounted unit 3, motion unit 4d, analog input unit, and camera unit 4c) and program configuration (every-scan module, fixed-cycle module, unit-to-unit sync module, function block, and macro) are displayed in this order from the top. Configuration parameters such as axial configuration and axial control are shown as function settings under the motion unit 4d. When double-clicking on the axial configuration or axial control on the user interface screen 1300 shown in FIG. 39, a user can check currently specified settings of the configuration parameter. Main and Sub are shown under the every-scan module in the project viewing area 420. When a user clicks on Main, Main program is displayed in a program display area 410 of a central ladder monitor 450.

The program display module 321 shown in FIG. 37 reads the project data 71 from the memory card 36A to show various types of information in the project display area 420 or a desired program in the program display area 410.

The program display area 410 is a part of the so-called ladder monitors 450. The program display area 410 can solely operate in the real-time reproduction mode. The ladder monitor 450 can be hidden by clicking its corresponding cross symbol. In the log reproduction mode, the program display portion 332 can reproduce a ladder program that is included in the project when operation record is saved. Also, in the log reproduction mode, the program display portion 332 associates device values that are included in the log data 73 through the device value acquisition portion 333a with devices that are described in Main program, and displays the device values associated with the devices. The device values to be displayed are device values corresponding to the time designated by the time designation cursor 404.

In the case of FIG. 39, device values corresponding to date and time 20XX/10/01 18:52:54, which is shown in the time stamp area 409, are associated with devices that are described in Main program and displayed. [35000/74286] which is shown on the right of the date and time represents currently shown scan serial number 35000 in the total scan number 74286. If a user drags the time designation cursor 404, the display time and scan serial number are correspondingly updated, and their corresponding device values are also updated. For example, after the display time is updated, the location of a relay device that is switched ON is indicated by ON representation (e.g., solid filled with a certain color, etc.), and the location of a relay device that is switched OFF is indicated by OFF representation (e.g., solid filled with white or black, etc.).

An image display area of a camera monitor 430 is arranged in the upper right part of the screen of FIG. 39. The image display module 323 reads image data corresponding to display time that is indicated on the ladder monitor 450 by the program display module 321 from the log data 73, and displays the read image data on the image display area of the camera monitor 430. In the case of FIG. 39, image data corresponding to the display time 20XX/10/01 18:52:54 is displayed on the camera monitor 430. In addition, although displayed on the right side of time as the display time Also, 282/601 is indicated on the right of this display. This represents that the serial number (282) of currently displayed image data in the total number of captured images 601. If a user drags the time designation cursor 404a on the camera monitor 430, the display time and the serial number of an image data to be displayed can be changed.

In this case, the aforementioned time designation cursor 404 in the ladder monitor 450 will be moved in accordance with the movement of the time designation cursor 404a. For example, if the time designation cursor 404a is moved to display time 20XX/10/01 19:00:00, the time designation cursor 404 in the ladder monitor 450 follows this movement and is moved to the point of display time 20XX/10/01 19:00:00. The device values in the ladder monitor 450 are correspondingly updated in accordance with the movement of the time designation cursor 404. Although the time designation cursor 404a is illustratively moved by a user, the time designation cursor 404a will be linked to the movement of the time designation cursor 404. That is, if the time designation cursor 404 in the ladder monitor 450 is moved, the time designation cursor 404a in the camera monitor 430 will be correspondingly moved. Such linkage can be achieved by synchronous control between the program display module 321 and the image display module 323 by the replay synchronization control module 324 based on the display time.

A unit monitor 440 is displayed on the lower right part of the screen shown in FIG. 39. For example, the unit monitor 440 shows device values of buffer memories (UG) in the motion unit 4d. More specifically, when receiving display time to be reproduced from the replay synchronous control module 324, the unit display module 325 of the display processor 51 reads device values corresponding to the received time from the memory card 36A, and shows the read device values on the unit monitor 440. In the case of FIG. 39, device values corresponding to the display time 20XX/10/01 18:52:54 are listed on the unit monitor 440.

Figure 40:
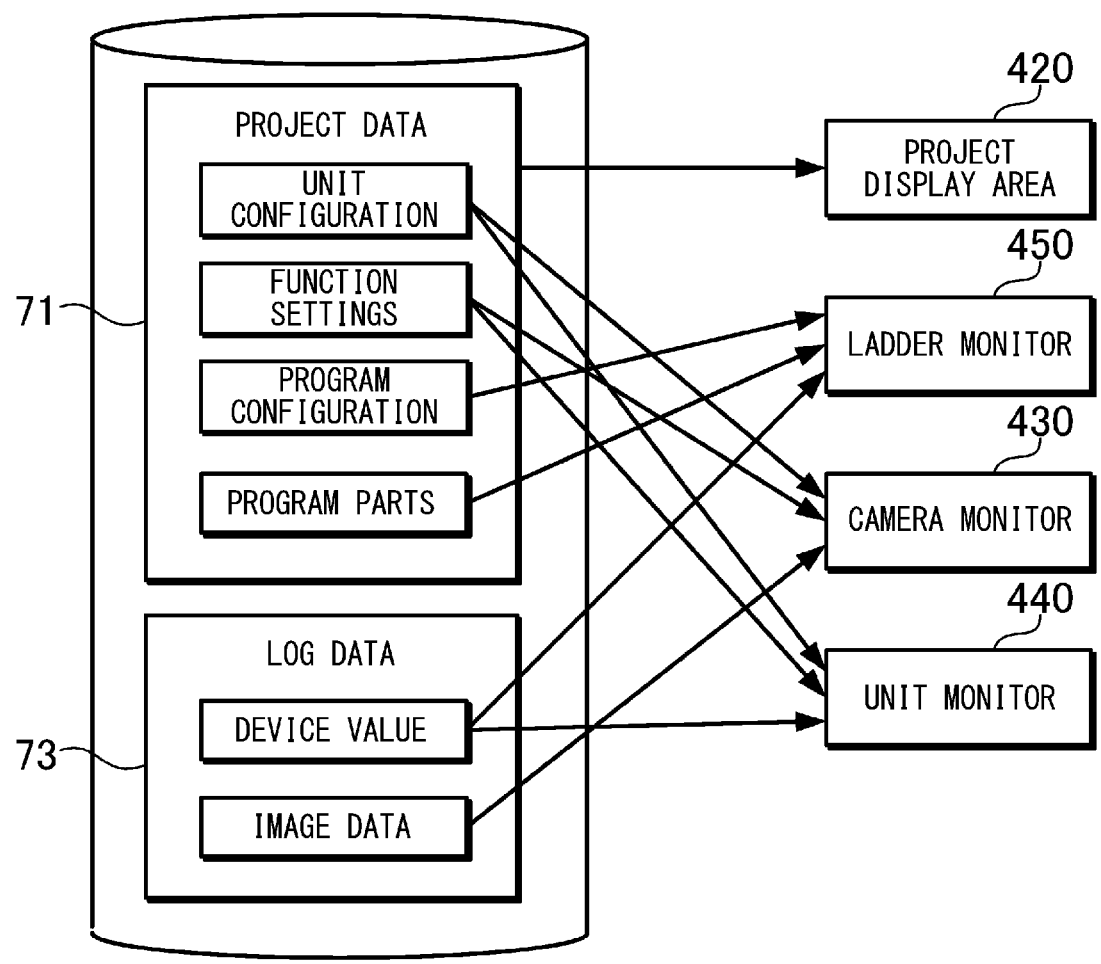
FIG. 40 is a diagram illustrating a display module of project data and log data.

FIG. 40 is a schematic diagram schematically showing a data source for displaying the user interface screen in the log reproduction mode. As shown in FIG. 40, the project display area 420 reads a unit configuration, function settings, a program configuration, and program parts that are included in the project data 71 from the memory, and displays them in tree form. The ladder monitor 450 reads the program configuration (types of program components included in the program) and program parts from the memory to display program parts that are specified by users, and read device values corresponding to the display time from the log data 73 to display the read device values. The camera monitor 430 reads image data corresponding to the display time from the log data 73 based on information including the unit configuration (whether camera monitor is included or not), function settings (function of camera monitor such as number of ports (if two or more ports are included), capturing cycle, gain setting, etc.), and the like. The unit monitor 440 reads device values corresponding to the display time from the log data 73 based on information including the unit configuration (types of unit), function settings (axial configuration, axial control, etc. in the case of the motion unit 4d), and the like, and displays the read device values.

As seen from FIGS. 39 and 40, the program display module 321, the image display module 323, and the unit display module 325 can be linked to each other by synchronization control executed by the function of the replay synchronization control module 324. Linkage of the wave display module 322 will be discussed in more detail later.

In this embodiment, it can be determined whether the present project data is the same as the project data 71 at actual trouble occurrence. More specifically, a comparison portion 334 of the program display modules 321 shown in FIG. 38 compares identification information of project data 71 (user program) that is provided from the PLC 1 with identification information of project data 71 (user program) that is stored by the PC-side memory 22, and provides the comparison result is to a warning portion 335. If the identification information of project data 71 (user program) that is provided from the PLC 1 and is information when operation record is saved is not same as the identification information of project data (user program) that is stored by the PC-side memory 22, the warning portion 335 shows a warning on the display portion 55.

In this embodiment, it has been illustratively described to determine whether the current project data and the stored project data are the same as each other or not based on the comparison between the identification information of the current project data and the identification information of the stored project data. More specifically, in this embodiment, identification information items are added to function settings of a program configuration, a plurality of program parts, a unit configuration, and units that are included in project data. It is determined whether the current project data and the stored project data are the same as each other or not based on whether all the identification information items of the current project data and the stored project data are the same as each other or not. However, the present invention is not limited to this. It may be determined whether the current project data and the stored project data are the same as each other or not based on whether the identification information items of user programs of the current project data and the stored project data which include a plurality of program parts are the same as each other or not.

In addition to device values in operating record saving and image data of the camera 98, log data includes user programs such as ladder programs included in project data in the operating record saving and setting files of the units. For example, log data includes information such as image data captured by camera 98, the statuses of units, the angles and coordinates of motion units 4d, and the like in trouble occurrence. Accordingly, past statuses and connection conditions of the devices, past information on units, and the like can be saved in log data. Therefore, past states can be reproduced by saving the log data. That is, since what setting are made and what output are provided can be confirmed, it is useful to determine the cause of a trouble. By reading such log data by using the programming device 70, the settings and the like which are saved in the log data can be analyzed, and the states can be reproduced and displayed.

Figure 41:
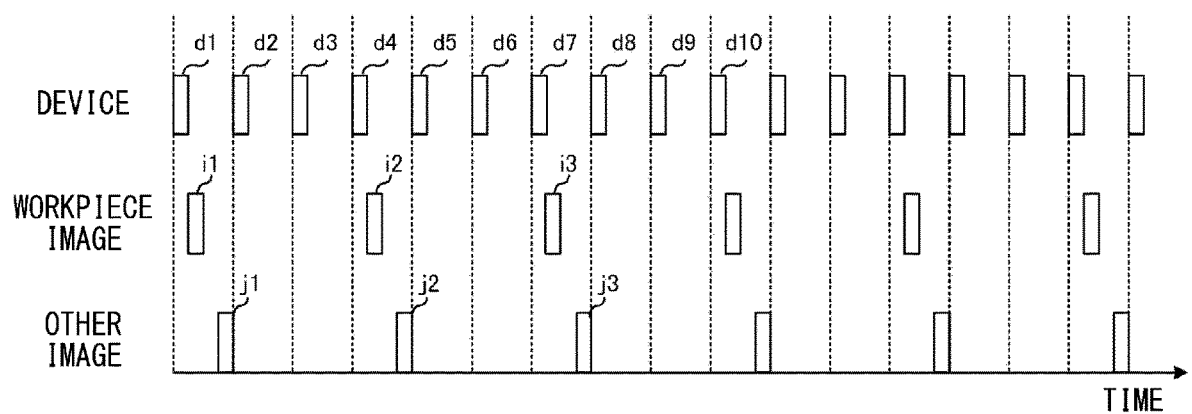
FIG. 41 is a schematic diagram showing acquisition timing of device values, work images, and other images.

FIG. 41 shows an example of log data 73. This example represents the acquisition timing of device values d1 to d10, workpiece images i1 to i3 acquired by the camera 98a, and other images j1 to j3 acquired by the camera 98b. The device values d1 to d10 are acquired at every scanning cycle. The workpiece images i1 to i3 are captured when trigger signals are generated. The workpiece images j1 to j3 are captured when trigger signals are generated. The horizontal positions of data indicate time information. As shown in FIG. 41, the acquisition times or acquisition cycles of the data do not agree with each other. For this reason, the display processor 51 adjusts the display timing of the data based on the time information of the data.

Figure 42:
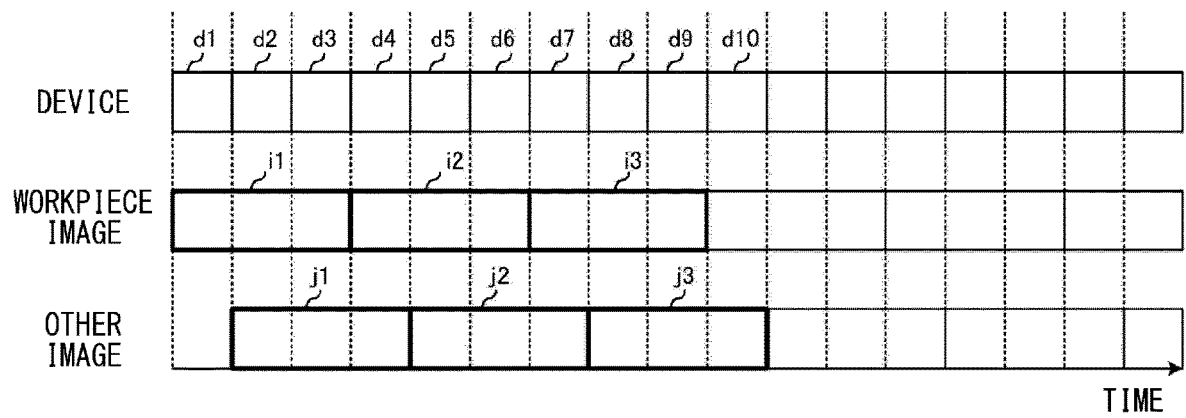
FIG. 42 is a schematic diagram illustrating display timing and display duration of the log data.

FIG. 42 is a diagram illustrating the display timing and display duration of the log data 73. The display processor 51 displays device values on the display portion 55 based on the time information of the device values. For example, the display processor 51 determines the display duration of the device value d1 by calculating the time difference between the time information of the device value d1 and the time information of the device value d2. When the display duration elapses after the display of the device value d1 starts, the display processor 51 starts display of the device value d2. After that, display durations are similarly calculated, and displayed device value is changed from one after another in accordance with the time information and the display durations.

As already shown in FIG. 41, the acquisition time of the device value d1 does not agree with the acquisition time of the workpiece image i1. For this reason, the display processor 51 compares the acquisition time of the workpiece image i1 with the acquisition times of the device values d1 to d10, and selects the time-closest device value dx which is the closest to the acquisition time of the workpiece image i1. In this example, the time-closest device value which is the closest to the capture time of the workpiece image i1 is the acquisition time of the device value d1. Accordingly, the display processor 51 simultaneously starts displaying the workpiece image i1 with the device value d1. Subsequently, the display processor 51 determines the time-closest device value dx which corresponds to the closest acquisition time to the acquisition time of the workpiece image i2. In this example, the acquisition time of the device value d4 is the closest to the acquisition time of the workpiece image i2. Accordingly, when the time to display the device value d4 arrives, the display processor 51 simultaneously starts displaying the device value d4 and the workpiece image i2. Also, the display processor 51 determines the time-closest device value dx which corresponds to the closest acquisition time to the acquisition time of another image j1. In this example, the time-closest device value which is the closest to the acquisition time of the another image j1 is the acquisition time of the device value d2. Accordingly, when the time to display the device value d2 arrives, the display processor 51 simultaneously starts displaying the device value d2 and the another image j1.

The display timing of data items can be adjusted on the basis of the data item which has the shortest logging cycle in the data items which are included in the log data 73 as discussed above.

(Exemplary Assignment of Image Data to Acquisition Time)

In this embodiment, as discussed above, image data that is captured by the camera can be displayed in synchronization with events. On the "camera/event" tab 162 in the replay mode, if a user selects one of the events, camera image is displayed based on image data that is captured at time corresponding to the selected event, and the time designation cursor is also moved to the corresponding reproduction time. In addition, if the play button is pressed, the motion video is reproduced in the camera monitor box, and the selected event will be changed in accordance with elapsed time. Correspondingly, device values of the ladder program in the "program" tab 165 are also updated. Such synchronous display can be achieved by the assignment of image data to its acquisition time when the image data is stored. The assignment of image data to its acquisition time and device values is described below with reference to FIGS. 41 and 42.

(Exemplary Log Data (Device Value and Image Data))

FIG. 41 shows logging timing of the camera unit 4c shown in FIG. 1 which collects device values and images. Two cameras can be connected to the camera unit 4c at the maximum. Cameras can capture images from different angles.

FIG. 41 represents the acquisition timing of device values d1 to d10, workpiece images i1 to i3 acquired by the camera 1, and other images j1 to j3 acquired by the camera 2. The device values d1 to d10 are acquired at every scanning cycle. The workpiece images i1 to i3 are captured when trigger signals (image acquisition signals) are generated. The workpiece images j1 to j3 are captured when other trigger signals are generated. The horizontal positions of data indicate time information. As shown in FIG. 41, the acquisition times or acquisition cycles of the data do not generally agree with each other. For this reason, the display processor 51 of the programmable display 50 adjusts the display timing of the data based on the time information of the data.

(Explanation of Display Timing and Display Duration of Log Data)

FIG. 42 shows display timing and display duration of log data. The display processor 51 displays device values on the display portion 55 based on the time information of the device values. For example, the display processor 51 determines the display duration of the device value d1 by calculating the time difference between the time information of the device value d1 and the time information of the device value d2. When the display duration elapses after the display of the device value d1 starts, the display processor 51 starts display of the device value d2. After that, display durations are similarly calculated, and displayed device value is changed from one after another in accordance with the time information and the display durations.

As discussed above, the acquisition time of the device value d1 does not agree with the acquisition time of the workpiece image i1. For this reason, the display processor 51 compares the acquisition time of the workpiece image i1 with the acquisition times of the device values d1 to d10, and selects the time-closest device value dx which is the closest to the acquisition time of the workpiece image i1. In this example, the time-closest device value which is the closest to the capture time of the workpiece image i1 is the acquisition time of the device value d1. Accordingly, the display processor 51 simultaneously starts displaying the workpiece image i1 with the device value d1. Subsequently, the display processor 51 determines the time-closest device value dx which corresponds to the closest acquisition time to the acquisition time of the workpiece image i2. In this example, the acquisition time of the device value d4 is the closest to the acquisition time of the workpiece image i2. Accordingly, when the time to display the device value d4 arrives, the display processor 51 simultaneously starts displaying the device value d4 and the workpiece image i2. Also, the display processor 51 determines the time-closest device value dx which corresponds to the closest acquisition time to the acquisition time of another image j1. In this example, the time-closest device value which is the closest to the acquisition time of the another image j1 is the acquisition time of the device value d2. Accordingly, when the time to display the device value d2 arrives, the display processor 51 simultaneously starts displaying the device value d2 and the another image j1. The display timing of data items is adjusted on the basis of the data item which has the shortest logging cycle in the data items which are included in the log data as discussed above.

(Linkage between Image Data and Time Information)

Figure 43:
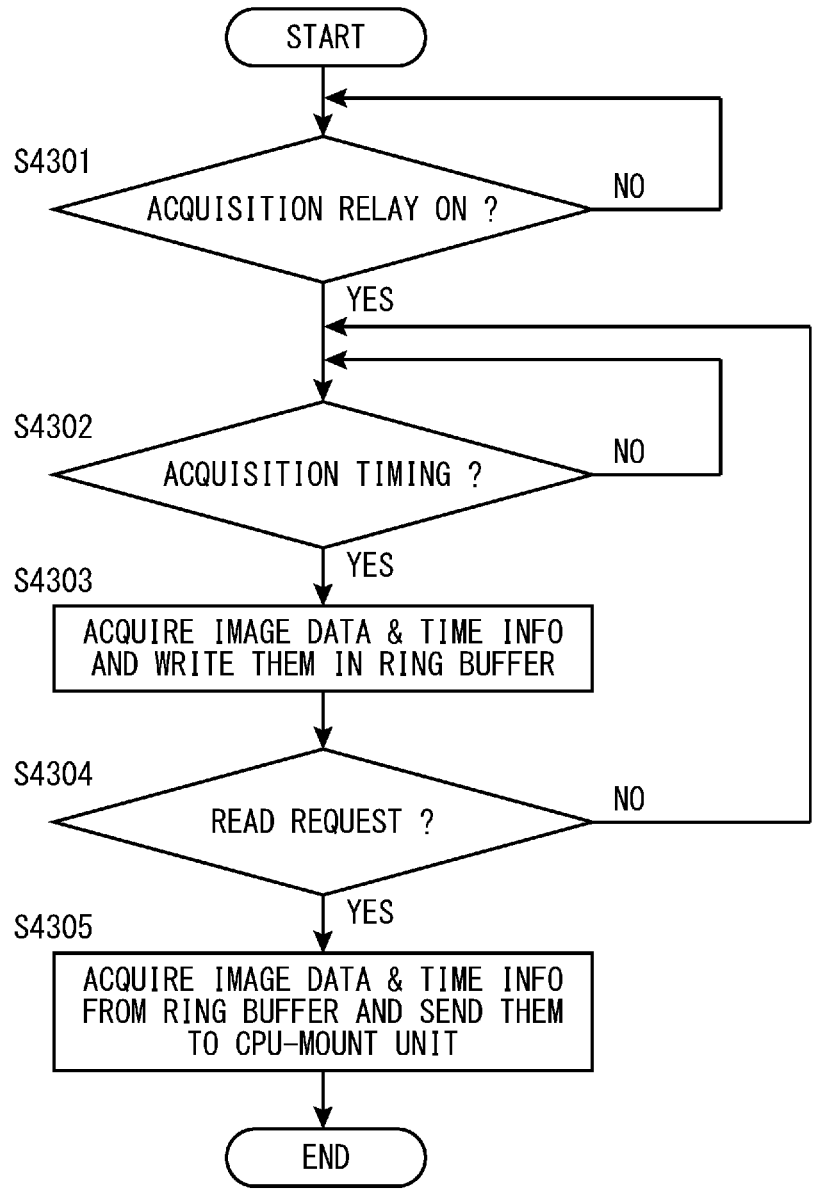
FIG. 43 is a flowchart illustrating assignment of image data to its time information.

Image data and time information are displayed in synchronization with each other in the camera/event display screen 170 of FIG. 23. The procedure of linkage between image data and time information is now described with reference to a flowchart of FIG. 43. The flowchart shows the procedure of logging using the ring buffer 91b in the camera unit 4c shown in FIG. 10. In Step S4301, it is first determined whether an acquisition relay is ON. Specifically, the camera unit processor 41c (CPU etc.) of the camera unit 4c determines whether image data acquisition conditions are satisfied (for example, whether the PLC 1 is switched from a PROG mode (setting mode) to a RUN mode (execution mode), and the acquisition relay is turned ON). If the acquisition relay is not ON, the procedure returns to Step S4301 and repeats this routine.

If the acquisition relay is turned to ON, the procedure goes to Step S4302 in which it is determined whether the time to acquire image data (image data acquisition timing or not). Specifically, the camera unit processor 41c determines whether the time to acquire image data arrives. The acquisition timing can be defined by a capture cycle (internal control period) that is previously defined in the camera unit 4c, for example. If it is not acquisition timing, the procedure returns to Step S4302 and repeats this routine.

If it is acquisition timing, the procedure goes to Step S4303 in which image data and time information are acquired and written into the ring buffer. Specifically, a capture instruction is sent to the camera so that image data is captured by the camera. To assign the image data to its captured time, the current time information is read from the time management portion such as internal timer so that the image data associated with its time information is written into the ring buffer.

Subsequently, it is determined whether a read request occurs in Step S4304. Specifically, the camera unit processor 41c determines whether the CPU-mounted unit 3 issues a read request (read instruction) to the ring buffer of the camera unit 4c. If the read request is not issued, the procedure returns to Step S4302.

If the read request is received, the procedure goes to Step S4305 in which the image data and its time information are acquired from the ring buffer, and transmitted to the CPU-mounted unit 3. The CPU-mounted unit 3 adds the image data and its time information as log data to operation record data. Accordingly, the image data is assigned to its time information in the operation record data.

(Assignment of Motion Data to Time Information)

Motion data can be also assigned to its time information similar to assignment of image data that is captured by the camera to its time information as described above with reference to FIG. 43. Specifically, the motion unit 4d stores a program which defines operations of the motion unit 4d and setting information of parameters (parameter of axial configuration, axial control, etc.). The motion unit 4d shown in FIG. 1 includes a motion unit processor 41d. The motion unit processor 41d transmits operating instruction values such as target coordinates and speed to an electric motor (motor amplifier) that is connected the outside based on the setting information. Motion data including current coordinates, current speed, and the like is received through encoders from the electric motor amplifier. The control period at which the motion data including current coordinates, current speed, and the like are received is shorter than the scan cycle of the ladder program, and is not synchronized with the ladder program. The motion unit processor 41d collects motion data at a predetermined period. The motion unit processor 41d assigns information on receipt time at which the motion data is received, this motion data, and time information (read from time management portion such as internal timer) with each other, and writes them into its own ring buffer. Subsequently, similar to the case of the camera unit 4c described with reference to FIG. 43, the motion unit 4d acquires motion data (current coordinates, current speed, etc.) and its time information from the ring buffer, and transmit them to the CPU-mounted unit 3 at saving timing. The CPU-mounted unit 3 adds the motion data and its time information as log data to operation record data. Accordingly, the motion data is assigned to its time information in the operation record data.

(Linkage between Event Data and Time Information)

Figure 44:
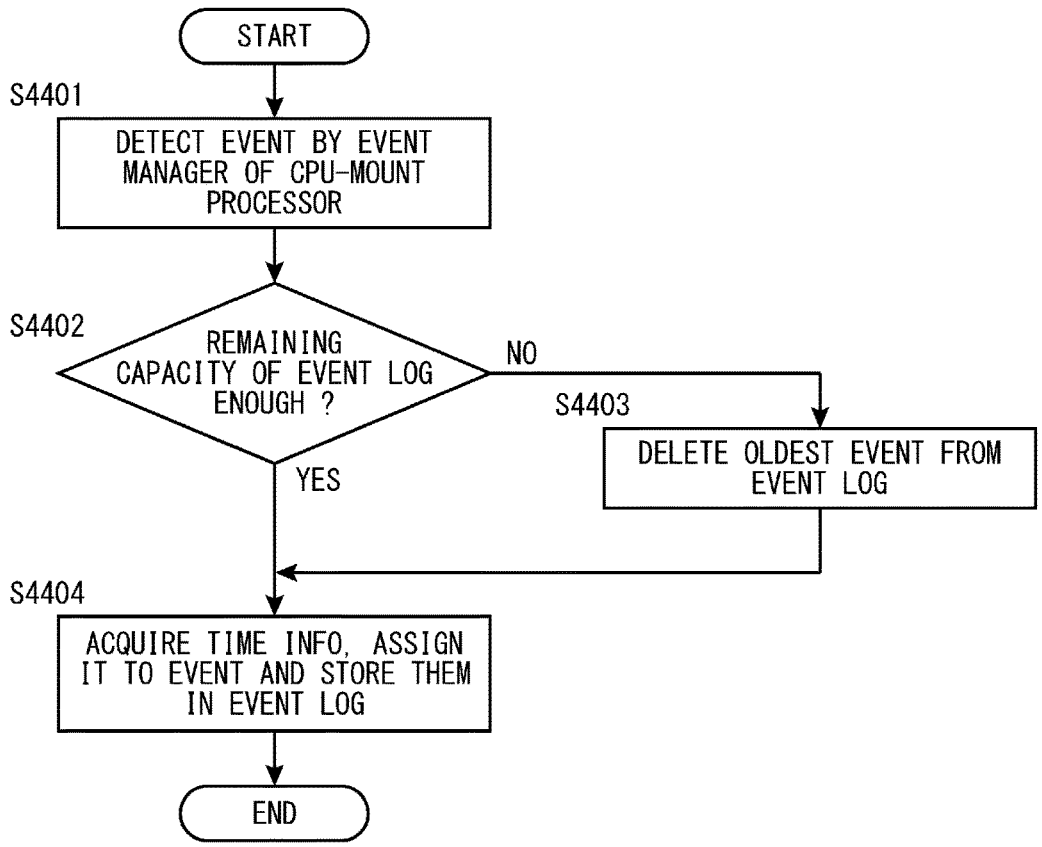
FIG. 44 is a flowchart illustrating assignment of an event to its time information.

The procedure of linkage between event data and time information in the camera/event display screen 170 of FIG. 23 is now described with reference to a flowchart of FIG. 44. In Step S4401, the event management portion of the CPU-mounted-unit side processor 31 first detects an event. Various types of event can be this event to be detected. Examples of event to be detected can be provided by rewriting of project data which includes user programs of the PLC 1 and unit configuration information on units, power supply ON/OFF switching of input/output devices, mode switching between setting modes which make settings of the PLC 1 or operation modes which run (operate) the PLC 1, clearing of various types of histories, insertion/removal of memories (memory card etc.), insertion/removal of Ethernet cable for communication with other devices, device rewrite signal that is required by the programmable display 50 connected to the PLC 1, motion error of the motion unit in the PLC 1, and the like.

Events that occur in the expansion unit 4 such as motion unit can be detected as follows. The motion unit processor 41d transmits a message communication command which includes an event to the CPU-mounted unit 3 through the unit-to-unit bus. The CPU-mounted-unit side processor 31 uses an interrupt to receive the message communication command which includes the event. The CPU-mounted-unit side processor 31 extracts the event from the received message communication command. Accordingly, the CPU-mounted-unit side processor 31 can recognize various types of events which occur in the motion unit at proper timing.

Subsequently, in Step S4402, the event management portion of the CPU-mounted unit 3 checks the remaining capacity of its event log. In this embodiment, a predetermined storage area of the temporary recording portion 91a is used as an event log memory. Needless to say, an event log memory can be separately provided from the temporary recording portion 91a. If the remaining capacity of the event log is not enough, the procedure goes to Step S4403 in which the oldest event is deleted from the event log memory. If the remaining capacity of the event log is enough, the procedure goes to Step S4404 in which time information in microsecond order is acquired and is assigned to the event so that the assigned time information and event are stored into the event log memory.

(Device Monitoring by Programmable Display 50)

Figure 45:
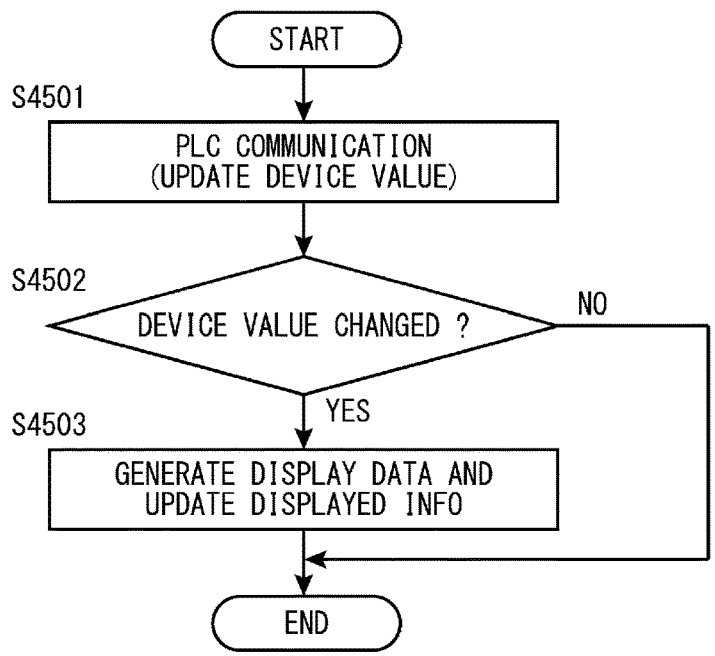
FIG. 45 is a flowchart illustrating basic processing of the programmable display for monitoring a device.

Basic processing of the programmable display 50 when monitoring a device is now described with reference to a flowchart of FIG. 45. The programmable display 50 monitors devices of the PLC 1. The PLC 1 cannot grasp devices that are displayed on the programmable display 50. For this reason, the display side communication portion 58 of the programmable display 50 accesses the PLC 1 at fixed intervals (e.g., 10 ms), and reads device values of devices that can be used for the display data (Step S4501). The read device values are stored in the data memory 56 of the programmable display 50.

The display processor 51 of the programmable display 50 determines whether any of the read device values changed from their corresponding current device values (Step S4502). If no device value is changed, the procedure ends without any processing because the currently displayed screen is maintained. If any of the read device values changed, display data is generated based on the read device values so that the screen is updated to a screen corresponding to the read device values (Step S4503).

The basic processing has been described. The described basic processing focuses on device value reading. However, device values are written in communication between the programmable display 50 and the PLC 1 upon touch operation on a switch component or the like. That is, when recognizing that a device value of a device is changed in the data memory 56, the programmable display 50 informs the PLC 1 that a device value of the device has been changed in communication with the PLC 1 so that the CPU-mounted-unit side processor 31 writes the changed value device of the device in the PLC-side device portion 34 of the CPU-mounted-unit storage 32.

FIG. 2 shows a user interface screen of a monitoring screen 240. If a user touches a "monitoring screen" button 144 in the aforementioned menu screen 140 of FIG. 21, the monitoring screen 240 of FIG. 2 can be displayed. Some types of components such as switch, meter, and lamp are arranged on the monitoring screen 240. "ABC-123" is indicated in the numerical display box 241 for production number. A device of the PLC 1 is assigned to the numerical display box 241. Lamps 242 and 243 which indicate normal and error are arranged on the left of the numerical display box 241. In the example of FIG. 2, the normal lamp 242 is in light-on, and the error lamp 243 is in light-off. Component labels (component identification numbers) are assigned to the normal and error lamps 242 and 243. Also, devices and component icons are assigned to the normal and error lamps 242 and 243. The display style of the components will be changed depending on statuses of their corresponding devices. Specifically, two component icons (light-on and light-off icons) are given to the normal lamp 242. One of the component icons is shown depending on a status of its corresponding device based on the previously defined setting. A temperature meter 244 is arranged on the right of the lamps 242 and 243, and indicates 60° C. Also, a component label is given to the temperature meter 244. In addition, a device and a component image are given to the temperature meter 244. The needle of the meter 244 can swing in accordance with a device value of its corresponding device.

A progress management box 245 for the products A to D is displayed in the lower part of FIG. 2. Target values and current values are indicated in numerical display boxes of their corresponding products. The RESET switches 246 are arranged on the right of the current values. Also, component labels are given to the RESET switches 246. In addition, devices and component image are given to the RESET switches 246. The component images include an image when the RESET switch 246 is touched, and an image the RESET switch 246 is not touched. The aforementioned counter graphs are arranged on the right of the RESET switches 246. As discussed above, component labels, device, and component images are given to various types of components.

Second Embodiment

The screen has been described to be switched to the device wave display screen by a touch operation on the system screen as a predetermined page that is provided by the programmable display 50 in the foregoing first embodiment. That is, the touch detector 53 detects a touch operation on the wave display component that is arranged on the system screen so that a device wave of the subject device is displayed based on its corresponding chronological data that is saved in the PLC 1. Specifically, when a user touches the "replay mode start" button 141 or the "real-time chart monitor (replay mode)" which correspond to wave display components on the menu screen 140 shown in FIG. 21, the device wave display screen 160 (real-time chart monitor display) shown in FIG. 12 is displayed so that operation record data that is recorded in the past is displayed in the replay mode.

Figure 46:
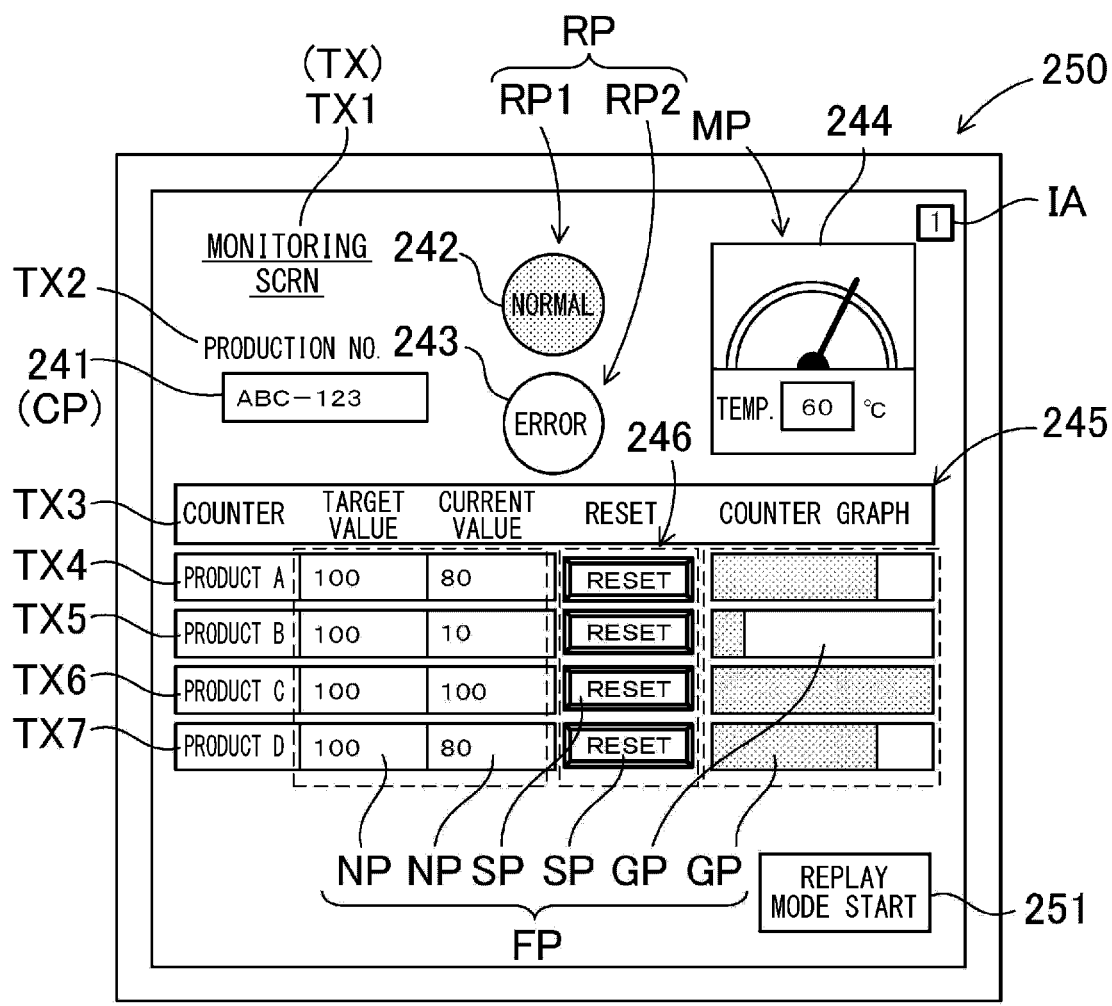
FIG. 46 is a schematic view showing a user screen of a programmable display according to a second embodiment.

However, the present invention is not limited to an activation structure which calls the device wave display screen from a previously defined page such as the system screen. For example, a wave display component which switches the screen to the device wave display screen may be arranged on a user screen which is created by users. FIG. 46 shows such a user screen of a programmable display 250 according to a second embodiment. In this illustrated user screen 250, various types of display components which created by users are arranged. When a user touches a "replay mode start" button 251 as a wave display component that is arranged at the lower right part of the user screen 250, the device wave display screen 160 shown in FIG. 12 will be displayed. In this case, the screen can be immediately switched to the device wave display screen 160 not only in the system screen but also in the user screen which is created by users. As a result, users can easily get information useful to eliminate a trouble. That is, users can easily start to recover the system. Therefore, this can facilitate user convenience.

Third Embodiment

In the foregoing first and second embodiments, the touch detector 53 has been described to detect a touch operation on the wave display component that is arranged on the system screen and the user screen so that a device wave of the subject device is displayed based on its corresponding chronological data that is saved in the PLC 1.

Figure 47:
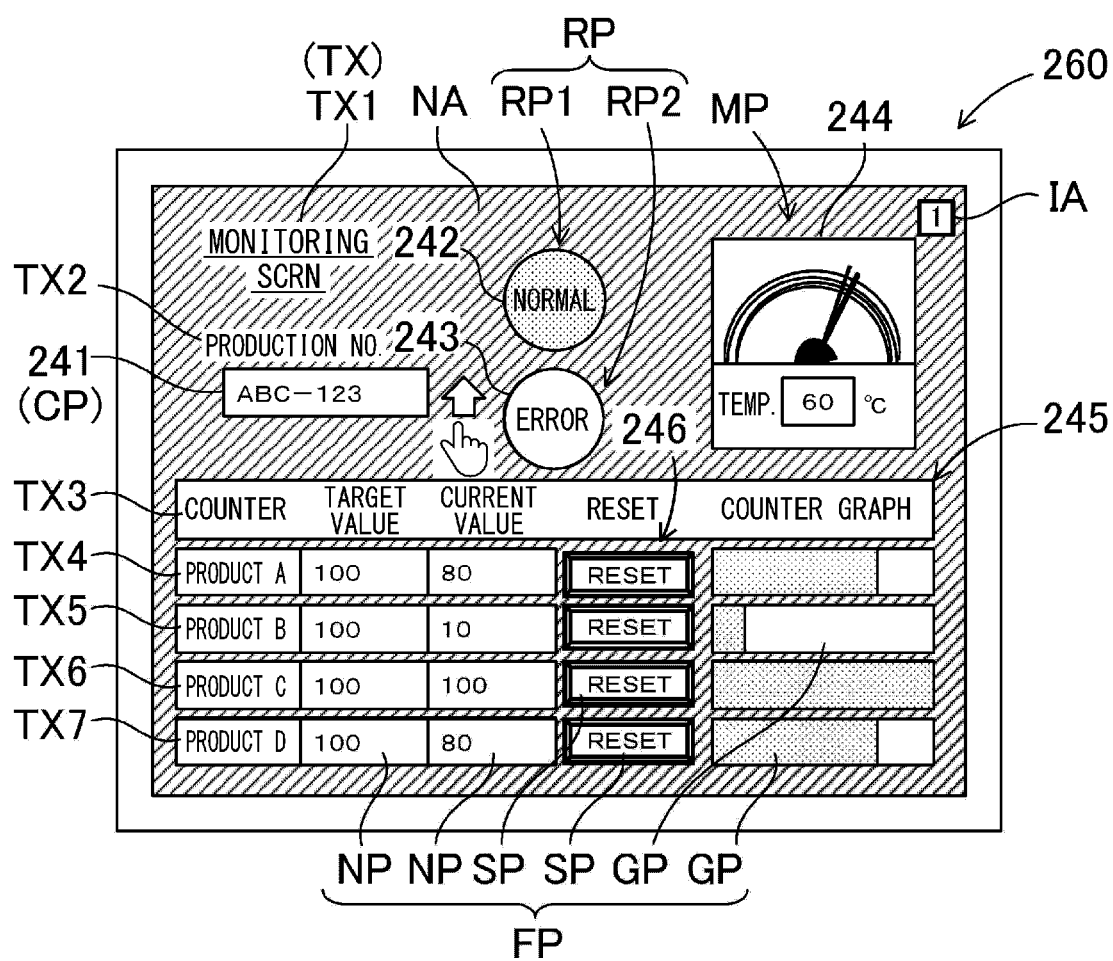
FIG. 47 is a schematic view showing a user screen of a programmable display according to a third embodiment.

However, the present invention is not limited to this. Device waves can be displayed when a particular touch operation is detected which is previously defined to display the device waves. FIG. 47 shows such a user screen 260 of a programmable display according to a third embodiment. The programmable display displays a user screen 260 which is created by users on the display portion. In the user screen 260, when a user touches a non-component-arrangement section NA (diagonally shaded section in FIG. 47) in which no display component is arranged in the page and makes the particular touch operation, the device wave display screen 160 can be called. The particular operation can be long press, flick, pinch-in, and pinch-out on the non-component-arrangement section NA, for example. In the case of FIG. 47, when a user flicks a point on the non-component-arrangement section NA upward, the screen can be switched to the device wave display screen 160 of FIG. 12. If a user wants the screen to rerun to this page, the screen can be switched back to the screen of FIG. 47 by flicking any point on the display screen of FIG. 12 downward. Also, the screen may be switched to different pages depending on the directions of flicking on the display screen. For example, the screen is switched to the device wave display screen 160 by flicking on any point upward on any page, and switched back to the previous page by flicking on any point downward on the device wave display screen 160.

Also, the screen may be switched by a leftward or rightward flick. For example, the screen can be switched to a page corresponding to a screen ID incremented by one (next page) by rightward flick, and to a page corresponding to a screen ID decremented by one (previous page) by leftward flick. In this case, because the screen can be switched to different pages depending on the directions of flicking on the display screen, users can intuitively switches the screen by easy operation. Therefore, this can facilitate user convenience.

Although it has been described that such touch operations only on the non-component-arrangement section switch the screen to the device wave display screen in the aforementioned example, the present invention is not limited to this. The screen can be switched to the device wave display screen by such touch operations on areas including parts where display components are arranged. For example, if a user will flick a point on the display screen, even when the user touches a part where a display component is arranged, the flicking operation is not assumed to be done on this display component. As a result, such a flicking operation can be distinguished from intentional selection operations on a display component such as ordinary tapping and long press.

Fourth Embodiment

Figure 48:
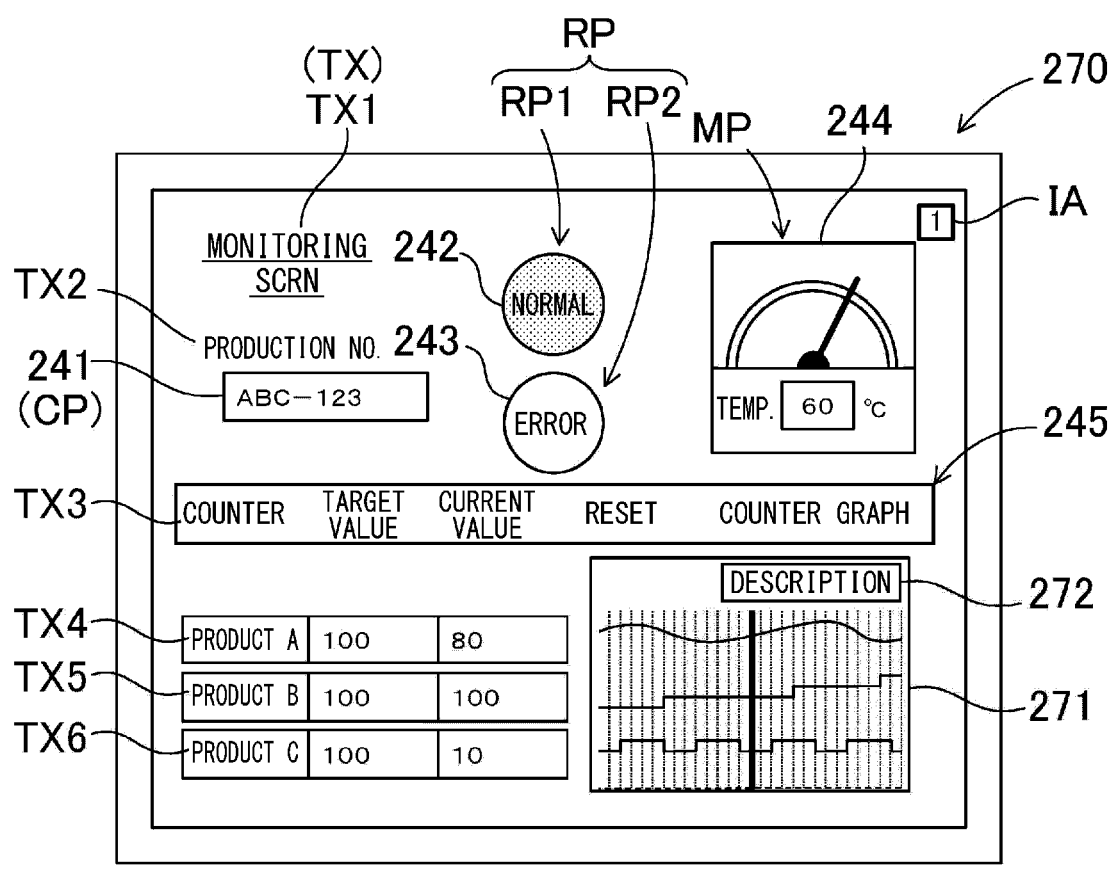
FIG. 48 is a schematic view showing a user screen of a programmable display according to a fourth embodiment.

It has been described that the screen of the display portion 55 is switched to the device wave display screen 160 in the foregoing first to third embodiments. However, the present invention is not limited to this. The device waves can be displayed on a system screen or a user screen without switching to the dedicated device wave display screen. FIG. 48 shows such a user screen of a programmable display 270 according to a fourth embodiment. In this embodiment, a waveform area display component 271 which include a wave display area for displaying the device waves is provided as one of display components which can be selected and arranged by users. The wave area display component 271 is displayed in the lower right part of the exemplary user screen in FIG. 48. The wave area display component 271 is a relatively large display component serving as a wave display area which allows users to surely see the device waves. The display-data generation portion 51a displays operation record data that is acquired from the PLC 1 as the device waves in the wave display area of the wave area display component 271. The device waves which are displayed in the wave area display component 271 can also be displayed in motion video or as a still image in a specified time range.

The wave area display component 271 can have functions to select devices to be displayed in device waves and to specify time their display time. For example, in the example of FIG. 48, a "description" button 272 is included in the wave area display component 271. A device selection menu or a slider-shaped operation bar which represent the time axis can be shown when a user touches the "description" button 272. Alternatively, the real-time chart monitor in the replay mode shown in FIG. 12 can be displayed when a user touches the "description" button 272.

Because device waves when a trouble occurs can be easily checked on the programmable display 50, without asking system engineers who designs the FA system to analyze the trouble, on-site engineers can try to eliminate the trouble if the trouble can be resolved on the FA site. Accordingly, time required to recover the FA system can be reduced. Also, because device waves of devices required to diagnose the cause of the trouble can be selectively displayed, such selective displaying of device waves is useful to diagnosis of the trouble.

Fifth Embodiment

Figure 49:
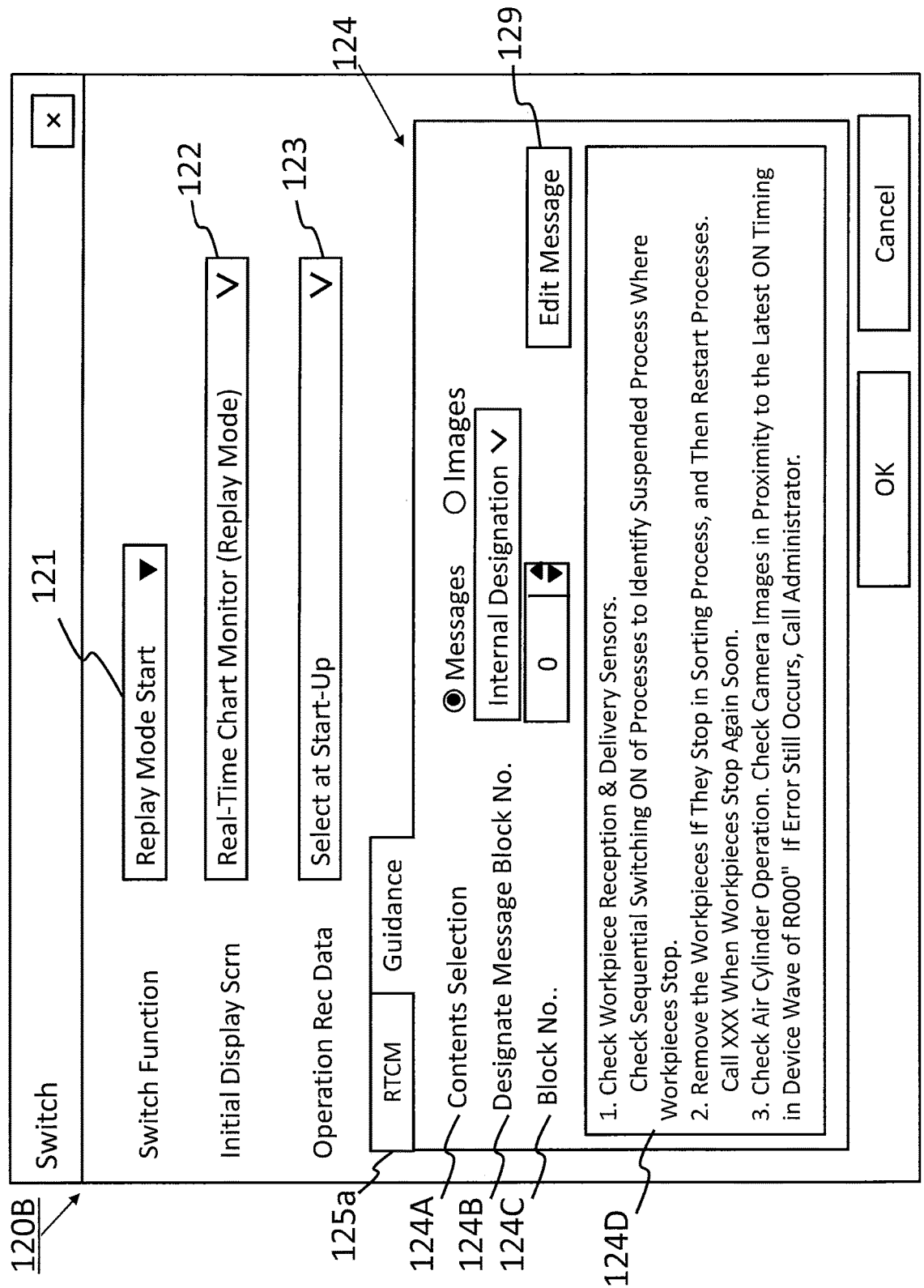
FIG. 49 is a schematic view showing a switch-setting screen of the screen data edition device of a programmable logic controller system according to a fifth embodiment.

A programmable display according to the present invention can show how to eliminate a trouble when the trouble occurs. For example, a guidance display screen is prepared, and is displayed to show how to eliminate such a trouble. This type of programmable display according to a fifth embodiment is now described with reference to FIG. 49. FIG. 49 is a schematic view showing a switch setting screen 120B which is displayed on the screen data edition device included in the programmable logic controller system. The switch setting screen 120B shown in FIG. 49 can be displayed when the "replay mode start" is selected in the switch function selection box 121 in the switch setting screen 120 of the screen data edition device shown in FIG. 14.

When an "RTCM" tab 125a is clicked in the real-time chart monitor (replay mode) description & setting box 124 in the switch setting screen 120B shown in FIG. 49, the switch-setting screen shown in FIG. 15 will be displayed. When a "guidance" tab 125b is clicked in the real-time chart monitor (replay mode) description & setting box 124, the switch-setting screen shown in FIG. 50 will be displayed.

Contents selection radio buttons 124A, a message block No. designation box 124B, and a block No. box 124C are provided in the real-time chart monitor (replay mode) description & setting box 124 shown in FIG. 49. A message button or image button is selected in the contents selection radio buttons 124A. In an exemplary screen shown in FIG. 49, the message button is selected. In the message block No. designation box 124B, internal or external designation is selected. In an exemplary screen shown in FIG. 49, the internal designation is selected. In the block No. box 124C. 0 (zero) is selected for block No. to be used when internal designation is selected. Guidance messages are then displayed on a guidance message display box 124D which is provided in a lower area of the real-time chart monitor (replay mode) description & setting box 124. When a message edition button 129 is clicked, the guidance messages to be displayed in the programmable display 50 can be edited.

Figure 50:
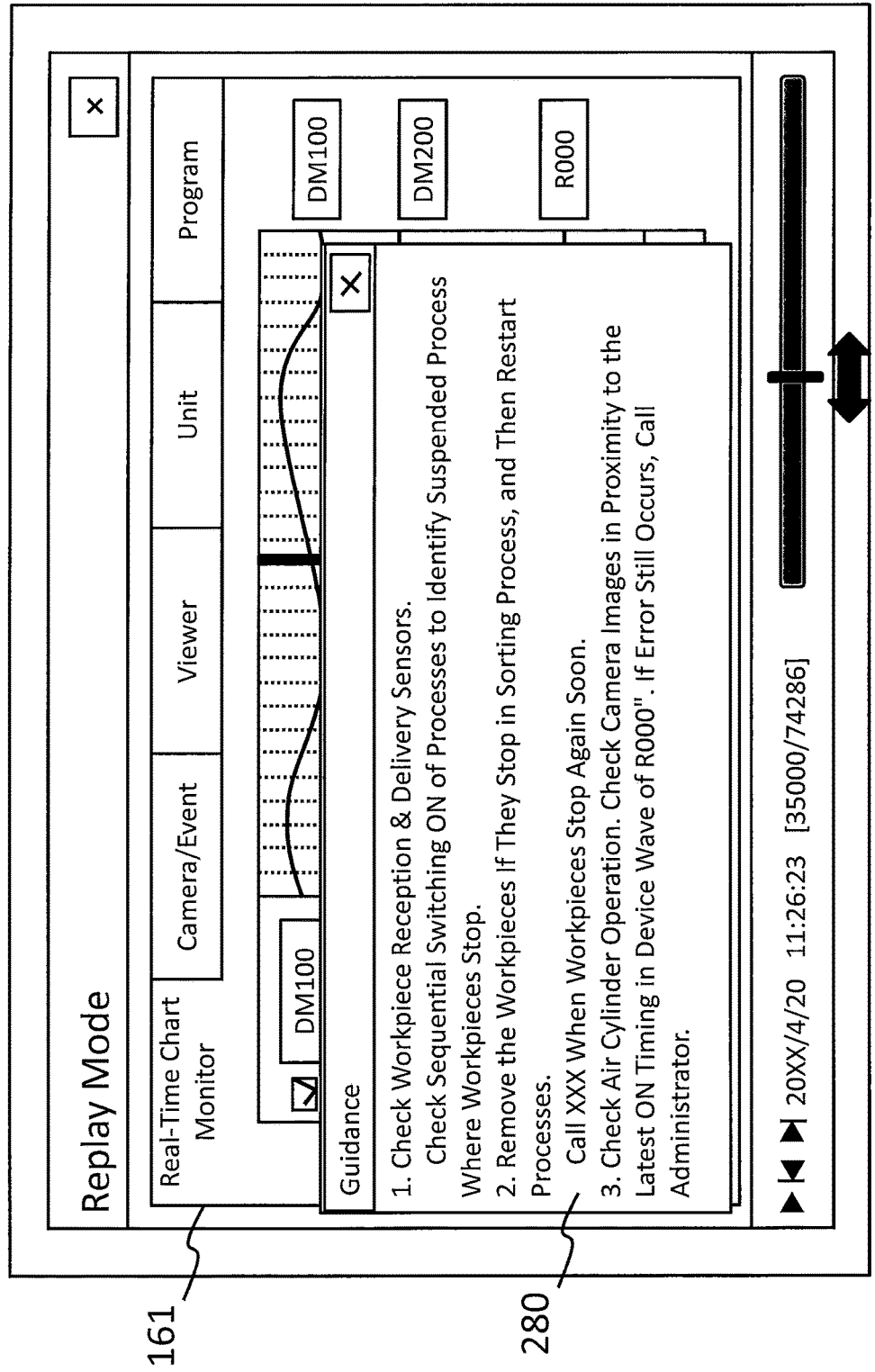
FIG. 50 is a schematic view showing a device wave display screen in a replay mode according to a modified embodiment.

In the case in which guidance messages are previously associated with the "replay mode start" button 141b which is provided in the menu screen displayed in the screen-display box 112 shown in FIG. 13 as discussed above, a pop-up image (floating window image) 280 appears in the foreground of the replay mode screen image shown in FIG. 12 in a device wave display screen 160C on the programmable display 50 as shown in FIG. 50. In other words, the guidance messages are exemplary guidance information which shows how to eliminate an error event which occurs when the save conditions are satisfied. Guidance information is associated with the devices (DM100, DM200, R000) which are previously defined to show their device values as the device wave shown in FIG. 16, for example. When the "replay mode start" button 141b is clicked in FIG. 13, display data for displaying the guidance information is created. As a result, the guidance message will be shown on the device wave display screen 160C shown in FIG. 50 together with the device waves.

FIG. 50 is a schematic view showing the device wave display screen in the replay mode according to a modified embodiment. As shown FIG. 50, the guidance messages which are created in the switch setting screen 120B shown FIG. 49 appear in the foreground of the device wave display screen 160C (popped up). The guidance messages are shown in the foreground of the device wave screen in FIG. 50, after the "real-time chart monitor" tab 161 is selected. More specifically, for example, in the guidance messages which are shown in a pop-up image 280 in FIG. 50, a third message (3.) "Check camera images in proximity to the latest ON timing in the device wave of R000" is indicated. After reading the message, on-site engineers will check camera images in proximity to the latest ON timing in the device wave of R000 and can try to eliminate a trouble.

Also, in the case in which the image button is selected from the contents selection radio buttons 124A in FIG. 49, a file No. designation box will be indicated instead of the message block No. designation box 124B. Users can designate a particular image file or particular image files through the file No. designation box. Users can designate a particular image file or particular image files by specifying its image file name in a particular directory or their identifier which identifies the particular image files through the file No. designation box. Alternatively, users can designate particular image files by specifying a particular pass which represents a place in which the image files are located. In this case, an image or images which are designated through the file No. designation box are popped up instead of the guidance messages in the pop-up image 280 shown in FIG. 50. Such image files can be previously created by users, and can include messages like the messages shown in the pop-up image 280 of FIG. 49 and illustrations showing how to eliminate troubles.

Also, for example, in the message block No. designation box 124B shown in FIG. 49, in the case in which external designation is selected, device values of a particular device in the PLC are referred, and the message block No. can be dynamically designated based on the device values under operation. This designation is similar to the external designation described in the RTCMID designation in the "RTCMID designation" box 126 shown in FIG. 33.

In the case in which messages or images are designated FIG. 49, the message block No. is assigned to (correlated with) a device similar to the aforementioned data structure shown in FIG. 34C in which the RTCMIDs are assigned to devices. More specifically, for example, a message block No.=0, which is discussed with reference to FIG. 49, is assigned together with RTCMID=0 to the designation device DM300=0. In the case in which messages or images are designated in the contents selection, the file No. is similarly assigned to (correlated with) a device.

In addition, a selection box or selection buttons which switch between ON and OFF of the guidance display may be provided in the switch setting screen 120B shown in FIG. 49. In this case, if users select not to display guidance, the guidance messages in the pop-up image 280 shown in FIG. 50 are not displayed.

If the save conditions are satisfied in the PLC 1, the programmable display 50 acquires the operation record data that is saved in the save memory 36 of the PLC 1 in the foregoing embodiment. When the operation record data is acquired, an e-mail which notifies the acquisition of the operation record data may be automatically sent to a predetermined e-mail address (so-called e-mail notification). According to this e-mail notification, on-site engineers can be informed of occurrence of an error on the production line, for example. In addition, when the e-mail is sent to the outside, the operation record data may be automatically attached to this e-mail. If the data volume of the operation record data is large, the operation record data can be divided into a plurality of portions so that the operation record data portions may be attached to a plurality of e-mails and be sent to the predetermined e-mail address by the e-mails. Also, image data of images that are captured relating to the error may be attached to an e-mail and be sent to the predetermined e-mail address by the e-mail. In this case, for example, on-site engineers can be not only informed of occurrence of an error but also can receive the operation record data and analyze the cause of the error.

A programmable display and a programmable logic controller system including the programmable display can be suitably used for diagnosis of troubles in FA systems, that is, for so-called troubleshooting.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A programmable display to be connected to a programmable logic controller that saves chronological data relating to device values of devices as storage areas to be referred by a user program based on previously-defined save conditions, the programmable display comprising:
a setting storage that stores
component settings that assign the devices to their corresponding one of a plurality of components which are arranged on one screen of image as page to monitor or change a status of the device of the programmable logic controller,
page settings that manage the component settings page by page by using a page identifier which identifies a plurality of pages, and
subject device settings that specify a subject device that has a device value to be stored in the programmable logic controller as chronological data to be shown in a wave form as device wave;
a display data generator that generates display data for the pages corresponding to the page identifier page by page based on the component settings and the page settings which are stored in the setting storage;
a display portion that includes a display screen, and displays a page corresponding to the page identifier on the display screen based on the display data that is generated by the display data generator; and
a touch detector that detects touch operations on the display screen of the display portion,
wherein the display data generator generates display data that changes image of the display screen from a current page to another page based on the page settings when the touch detection portion detects a predetermined first touch operation and generates display data for displaying the device wave of the device that is specified by the subject device settings based on the chronological data, which is stored in the programmable logic controller, when the touch detector detects a predetermined second touch operation on the display screen, and
wherein the display portion displays the another page or the device wave on the display screen based on the display data that is generated by the display data generator.

2. The programmable display according to claim 1, wherein the setting storage stores default screen information representing a previously defined default screen that has a format to display the device wave, and
wherein the display data generator superposes the chronological data on the default screen based on the default screen information and the chronological data to generate the display data for displaying the device wave of the device that is specified by the subject device settings when the touch detector detects the predetermined second touch operation on the display screen.

3. The programmable display according to claim 2, wherein when the display portion displays the device wave on the display screen and the touch detector detects a change operation for changing the display part of the device wave that has been displayed, the display data generator extracts a part of the chronological data that corresponds to a display part of the device wave that is requested by the change operation and generates new display data for displaying the requested display part of the device wave.

4. The programmable display according to claim 1, wherein the component settings, which are stored in the setting storage, further include setting of a wave display component for displaying the device wave, and
wherein the second touch operation is a touch operation on the wave display component which is arranged on the first page displayed on the display screen.

5. The programmable display according to claim 1, wherein the second touch operation is a particular touch operation on a non-component-arrangement section in which no display component is arranged on the first page displayed on the display screen.

6. The programmable display according to claim 5, wherein the particular operation is any one of long press, flick, pinch-in, and pinch-out on the non-component-arrangement section.

7. The programmable display according to claim 1,
wherein the component settings, which are stored in the setting storage, further include
setting of an acquisition device that repeatedly acquires chronological data of the device values that are temporarily recorded in a temporary recording portion of the programmable logic controller, and
setting of a real-time display component for successively displaying the chronological data of the acquisition device, and
wherein when the touch operation on the real-time display component is detected, based on the chronological data of the device values of the acquisition device that are temporarily recorded in the temporary recording portion of the programmable logic controller, the display data generator generates display data for sequentially displaying the device values on the display screen.

8. The programmable display according to claim 1,
wherein the programmable logic controller can associate image data that is provided from an external camera, which can be connected to the programmable logic controller, with information on acquisition time of capture of the image data, and temporarily store the image data which is associated with the information on acquisition time when previously defined save conditions are satisfied, and
wherein the programmable display requests the programmable logic controller system to send the operation record data, and displays images corresponding to the image data included in the operation record data on the display portion based on the information on the acquisition time that is included in the operation record data.

9. The programmable display according to claim 1,
wherein when the previously defined save conditions are satisfied, the programmable logic controller can associate the operation record data with the user program which is executed at the satisfaction of the previously defined save conditions, and saves the user program which is associated with the operation record data, and
wherein the programmable display requests the programmable logic controller to send the saved operation record data, and, based on information on the acquisition time included in the operation record data, superposes the device values that are acquired at the acquisition time on the user program that is included the operation record data on the display portion.

10. The programmable display according to claim 1,
wherein in the case the programmable logic controller collects event data corresponding to a plurality of events which occur in the programmable logic controller or a controlled device to be controlled by the programmable logic controller, and associates the event data with occurrence time of the events and stores the event data which is associated with the occurrence time of the events in chronological order, when the previously defined save conditions are satisfied, the programmable logic controller can saves the stored event data in the operation record data so that the stored event data can be associated with the operation record data, and
wherein the programmable display requests the programmable logic controller to send the stored operation record data, and displays the events corresponding to the event data included in the operation record data on the display portion based on the occurrence time included in the operation record data.

11. The programmable display according to claim 1, wherein the programmable display displays a selection screen which allows selection of the subject device as an initial display image when the device wave is displayed on the display screen.

12. The programmable display according to claim 1, wherein when the device wave is displayed on the display screen, based on identification information for specifying one or more subject devices that have their device values to be shown as the device wave, the programmable display displays the one or more subject devices.

13. The programmable display according to claim 1, wherein the programmable display displays a setting screen which allows selection of one or more subject devices and representation styles of the one or more subject devices when their device waves are displayed on the display screen.

14. The programmable display according to claim 1 further comprising a display-side communication portion that can communicate with the programmable logic controller.

15. The programmable display according to claim 14 further comprising a display-side device portion that communicates with the programmable logic controller through the display-side communication portion, and holds device values that are synchronized with the device values of the programmable logic controller.

16. The programmable display according to claim 1 further comprising a guidance information storage that stores guidance information which is associated with the device that is specified by the subject device settings and shows how to eliminate an error event which occurs when the save conditions are satisfied,
wherein the display data generator generates display data for displaying the guidance information which is stored in the guidance information storage and is associated with the device that is specified by the subject device settings when the touch detection portion detects the predetermined second touch operation on the display screen.

17. A programmable logic controller system comprising:
a programmable logic controller that saves chronological data relating to device values of a device as a storage area to be referred by a user program based on previously defined save conditions; and
a programmable display that is connected to the programmable logic controller,
wherein the programmable logic controller comprises:
a program-execution portion that repeatedly executes the user program;
a device portion that includes a device as a storage area to be referred by the program-execution portion;
a temporary recording portion that collects device values of the device that are stored in the device portion, and associates the device values with information on collection time of the device values and temporarily records the device values associated with the information on collection time in chronological order in the temporary recording portion; and
a save memory that saves the chronological data relating to the device values that are temporarily recorded in the temporary recording portion as operation record data, when the previously defined save conditions are satisfied, wherein the programmable display comprises:

a setting storage that stores component settings that assign the devices to their corresponding one of a plurality of components which are arranged on one screen of image as page to monitor or change a status of the device of the programmable logic controller, page settings that manage the component settings page by page by using a page identifier which identifies a plurality of pages, and subject device settings that specify a subject device that has a device value to be stored in the programmable logic controller as chronological data to be shown in a wave form as device wave;

a display data generator that generates display data for the pages corresponding to the page identifier page by page based on the component settings and the page settings which are stored in the setting storage; a display portion that includes a display screen, and displays a page corresponding to the page identifier on the display screen based on the display data that is generated by the display data generator; and a touch detector that detects touch operations on the display screen of the display portion, wherein the display data generator generates display data that changes image of the display screen from a current page to another page based on the page settings when the touch detection portion detects a predetermined first touch operation, and generates display data for displaying the device wave of the device that is specified by the subject device settings based on the chronological data, which is stored in the programmable logic controller, when the touch detector detects a predetermined second touch operation on the display screen, and wherein the display portion displays the another page or the device wave on the display screen based on the display data that is generated by the display data generator.

* * * * *